United States Patent
Iwai et al.

(10) Patent No.: US 7,525,493 B2
(45) Date of Patent: Apr. 28, 2009

(54) ADAPTIVE ANTENNA APPARATUS INCLUDING A PLURALITY SETS OF PARTIAL ARRAY ANTENNAS HAVING DIFFERENT DIRECTIVITIES

(75) Inventors: Hiroshi Iwai, Osaka (JP); Atsushi Yamamoto, Kyoto (JP); Tsutomu Sakata, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 11/896,252

(22) Filed: Aug. 30, 2007

(65) Prior Publication Data

US 2008/0068271 A1 Mar. 20, 2008

(30) Foreign Application Priority Data

Aug. 31, 2006 (JP) ............... 2006-235386

(51) Int. Cl.
*H01Q 1/24* (2006.01)
(52) U.S. Cl. .................. 343/702; 343/853; 343/876; 455/132
(58) Field of Classification Search ............. 343/702, 343/876, 853; 455/132
See application file for complete search history.

(56) References Cited

U.S. PATENT DOCUMENTS

| 3,922,685 | A | 11/1975 | Opas |
| 4,123,759 | A | 10/1978 | Hines et al. |
| 5,280,637 | A | 1/1994 | Larosa et al. |

FOREIGN PATENT DOCUMENTS

| EP | 1 530 255 | 5/2005 |
| JP | 6-502981 | 3/1994 |
| JP | 6-132940 | 5/1994 |
| JP | 7-74687 | 3/1995 |
| JP | 9-214409 | 8/1997 |
| JP | 10-242739 | 9/1998 |
| JP | 11-284424 | 10/1999 |
| WO | 93/06668 | 4/1993 |
| WO | 94/28595 | 12/1994 |
| WO | 03/065500 | 8/2003 |
| WO | 03/090312 | 10/2003 |
| WO | 2006/062101 | 6/2006 |
| WO | 2006/070644 | 7/2006 |

OTHER PUBLICATIONS

European Search Report issued Dec. 27, 2007 in European Application No. EP 07 11 5422.

*Primary Examiner*—Trinh V Dinh
*Assistant Examiner*—Dieu Hien T Duong
(74) *Attorney, Agent, or Firm*—Wenderoth, Lind & Ponack, L.L.P.

(57) ABSTRACT

An adaptive antenna apparatus comprises M receiving circuits, and N antenna elements, N being larger than M. The N antenna elements constitute a plurality of sets of partial array antennas each including M antenna elements among the N antenna elements, and a straight line passing through feeding points of two of the antenna elements included in any one of the partial array antennas has a different direction from a further straight line passing through feeding points of two of the antenna elements included in any one of the other partial array antennas. A control means adaptively controls the receiving circuits to adjust at least one of an amplitude and a phase of each radio frequency signal, and adaptively controls an antenna switching means to connect the antenna elements included in one of the plurality of sets of partial array antennas to their corresponding receiving circuits.

8 Claims, 37 Drawing Sheets

SECOND PREFERRED EMBODIMENT

THIRD PREFERRED EMBODIMENT

FOURTH PREFERRED EMBODIMENT

SEVENTH PREFERRED EMBODIMENT

EIGHTH PREFERRED EMBODIMENT

NINTH PREFERRED EMBODIMENT
110-9

TENTH PREFERRED EMBODIMENT
110-10

ELEVENTH PREFERRED EMBODIMENT
110-11

110-11

TWELFTH PREFERRED EMBODIMENT
110-12

THIRTEENTH PREFERRED EMBODIMENT
110-13

FOURTEENTH PREFERRED EMBODIMENT
110-14

FIFTEENTH PREFERRED EMBODIMENT
110-15

ADAPTIVE ANTENNA APPARATUS INCLUDING A PLURALITY SETS OF PARTIAL ARRAY ANTENNAS HAVING DIFFERENT DIRECTIVITIES

BACKGROUND OF THE INVENTION

1. Field of the Invention

The present invention relates to an adaptive antenna apparatus including a plurality of sets of partial array antennas having different directivities, and in particular, to an adaptive antenna apparatus for use in a communication apparatus, typically including a mobile phone, and to a radio communication apparatus using such an adaptive antenna apparatus.

2. Description of the Related Art

Portable radio communication apparatuses such as mobile phones have rapidly miniaturized and become thinner. Further, the mobile radio communication apparatuses have developed into data terminal equipment that are not only used as conventional telephone sets, but for example, send and receive emails, and are used for browsing web pages of the WWW (World Wide Web). Since amounts of information to be handled increase from those of conventional audio and text information to those of pictures and movies, it is necessary to further improve the communication quality. Under such circumstances, it has been suggested to apply to the mobile terminal apparatus, an adaptive antenna apparatus which has so far been used mainly to enhance the performance of base station antennas.

For example, an antenna apparatus described in Japanese patent laid-open publication No. 11-284424 includes: a conductive housing; three antenna elements mounted at different locations of the conductive housing; a transmitting and receiving circuit mounted on the conductive housing and performing transmission and reception; and an amplitude and phase adjusting circuit connected to the antenna elements and the transmitting and receiving circuit and adjusting an amplitude and phase of each antenna element signal to reduce a radiation power in a direction of a user. This antenna apparatus is intended to solve problems including the waste of power which is converted into heat in a human head upon transmission without contributing to communication, the deterioration of reception characteristics due to mutual interference between delayed waves, etc. Accordingly, upon transmission, the antenna apparatus reduces the power to be radiated in the direction of the human head and thus can efficiently radiate signals transmitted to the antenna elements into space, and upon reception, the antenna apparatus has no directivity in the side of the mobile terminal toward the human body and thus can increase antenna directivity in directions other than that of the human body; and therefore, the antenna apparatus has an improved operational effect, i.e., an improvement of efficiency.

In addition, Japanese patent laid-open publication No. 10-242739, for example, proposes a configuration of an antenna apparatus in which in order to eliminate delayed waves which become interference waves, directional nulls are steered in the directions of delayed waves. This antenna apparatus has the following configuration of a mobile communication base station, to prevent the interferences of delayed waves, and to reduce the number of antenna elements for implementing pencil beams by using an array configuration. The antenna apparatus is configured as a base station antenna apparatus for mobile communication covering a strip-shaped area. In the antenna apparatus, a plurality of antenna elements, the number of which is between two and five, are linearly arranged so as to be orthogonal to a longitudinal direction of the strip-shaped area, and each distance between the antenna elements is set to a value between one wavelength and three wavelengths. In addition, an amplitude and phase adjuster, which changes the amplitude and phase of an input signal inputted from each antenna element through a frequency converter, is provided to each antenna input. Furthermore, an amplitude and phase calculating unit calculates the amplitude and phase of each antenna input signal so as to minimize an error between a signal which is known in advance by a receiving side and a combined signal of signals received by the respective antenna elements, and adjusts each amplitude and phase adjuster such that each amplitude and phase adjuster outputs a signal of each antenna element with the amplitude and phase calculated by the amplitude and phase calculating unit.

As a diversity of antennas having a plurality of antenna elements, there are antenna apparatuses such as those disclosed in Japanese patent laid-open publications Nos. 7-74687, 6-132940, 9-214409 and 6-502981.

According to such prior art antenna apparatuses, in general, since a plurality of antenna elements are arranged parallel to one another on a straight line, there is a problem that it is difficult to control the beams and nulls in the direction of the straight line passing through the antenna elements. This problem is particularly remarkable when the number of antenna elements is two.

FIG. 48 is a plan view showing a prior art array antenna apparatus, including two half-wavelength dipole antennas 31 and 32 arranged parallel to each other. FIGS. 49 to 52 are diagrams showing simulation results for the array antenna apparatus of FIG. 48. The array antenna apparatus of FIG. 48 includes the dipole antenna elements 31 and 32 each having an element length of $\lambda/2$ when the wavelength of a radio signal to be transmitted and received is $\lambda$, and the dipole antenna elements 31 and 32 are provided so as to be parallel to each other and separated by a distance of $\lambda/2$. The dipole antenna element 31 has, at its middle, a feeding point Q01, and includes element portions 31a and 31b each having an element length of $\lambda/4$, such that the feeding point Q01 is positioned between the element portions 31a and 31b. The dipole antenna element 32 also has, at its middle, a feeding point Q02, and includes element portions 32a and 32b each having an element length of $\lambda/4$, such that the feeding point Q02 is positioned between the element portions 32a and 32b. The following description is made using a coordinate system having x, y and z axes, as shown in FIG. 48. Here, a direction from back to front of the drawing is defined as a positive direction on the x-axis.

FIGS. 49 to 52 are diagrams each showing an example of a radiation pattern in a horizontal-plane (x-y plane) of the array antenna apparatus of FIG. 48 which is adaptively controlled when a desired wave with a certain azimuth angle and an interference wave with a certain azimuth angle are incoming to the array antenna apparatus. As incoming waves, one desired wave and one interference wave arrives with an interval of 40 degrees between these waves. Each of FIGS. 49 to 52 shows the case in which an average angle of arrival (i.e., a center angle between the desired wave and the interference wave) is 0, 45, 90 or 135 degrees. Specifically, FIG. 49 shows the case in which the desired wave with the azimuth angle of 20 degrees and the interference wave with the azimuth angle of –20 degrees are incoming to the array antenna apparatus of FIG. 48, FIG. 50 shows the case in which the desired wave with the azimuth angle of 65 degrees and the interference wave with the azimuth angle of 25 degrees are incoming to the array antenna apparatus of FIG. 48, FIG. 51 shows the case in which the desired wave with the azimuth angle of 110 degrees and the interference wave with the azimuth angle of 70 degrees are incoming to the array antenna apparatus of FIG. 48, and FIG. 52 shows the case in which the desired wave with the azimuth angle of 155 degrees and the interference wave with the azimuth angle of 115 degrees are incoming to the array antenna apparatus of FIG. 48. Each radiation pattern shows a vertically polarized component. The interference wave signal is uncorrelated with the desired wave signal, an initial value of a signal to noise ratio (SNR) is 20 dB, and an initial value of a signal to interference ratio (SIR) is 0 dB, i.e., a desired wave and an interference wave have the same signal level. Both the desired wave signal and the interference wave signal are QPSK signals.

The results of signal to interference plus noise ratios (SINR) after adaptive control are shown below.

TABLE 1

|     | Average Angle of Arrival | SINR | BER |
| --- | --- | --- | --- |
| (a) | 0 degree | 16.9 dB | $1.2 \times 10^{-12}$ |
| (b) | 45 degrees | 16.9 dB | $1.5 \times 10^{-12}$ |
| (c) | 90 degrees | −0.3 dB | $1.6 \times 10^{-1}$ |
| (d) | 135 degrees | 16.9 dB | $1.2 \times 10^{-12}$ |

It can be seen that when the average angles of arrival are 0, 45 and 135 degrees, the SINR is sufficiently improved by performing the adaptive control for steering a null in the direction of the interference wave, however, when an average angle of arrival is 90 degrees, a desired wave signal and an interference wave signal have almost the same signal level and thus the SINR is not improved. This results from the fact that in a linear array, the control of beams and nulls in an array direction is limited. Thus, in the case of the array antenna apparatus of FIG. 48, it can be seen that since a plurality of antenna elements are arranged so as to be aligned on the y axis, the beam and the null cannot be controlled on the incoming wave and the interference wave from the direction of y-axis (i.e., the direction of 90 degrees), as shown in FIG. 51.

As described above, a plurality of antenna elements of the prior art antenna apparatuses are generally arranged parallel to one another on a straight line, and thus there is a problem that it is difficult to control beams and nulls on the straight line passing through the antenna elements.

SUMMARY OF THE INVENTION

The object of the present invention is therefore to solve the above-described problem, and to provide an adaptive antenna apparatus capable of forming a beam(s) on an incoming wave(s) with an arbitrary azimuth angle(s) and forming nulls on interference waves with arbitrary azimuth angles, and to provide a radio communication apparatus using the adaptive antenna apparatus.

In order to achieve the aforementioned objective, according to one aspect of the present invention, an adaptive antenna apparatus is provided, including a plurality of number M of receiving circuits, a number N of antenna elements, the number N being larger than M, antenna switching means, combining means, signal quality determination means, and control means. Each of the M receiving circuits adjusts at least one of an amplitude and a phase of a radio frequency signal and outputs the adjusted received signal. The antenna switching means connects a number M of antenna elements as selected among the total number N of antenna elements, to the number M of receiving circuits, respectively. The combining means combines the number M of received signals outputted from the number M of receiving circuits, respectively. The signal quality determination means determines signal quality of the combined received signal. The control means controls the antenna switching means and the receiving circuits. The number N of antenna elements constitute a plurality of sets of partial array antennas, each including M antenna elements among the total N antenna elements, and a straight line passing through feeding points of two of the antenna elements included in any one of the partial array antennas has a different direction from a further straight line passing through feeding points of two of the antenna elements included in any one of the other partial array antennas. The control means adaptively controls the receiving circuits to adjust, based on radio frequency signals respectively received by antenna elements connected to their corresponding receiving circuits, at least one of an amplitude and a phase of each of the radio frequency signals, so as to form a radiation pattern with a beam in a direction of a desired wave and nulls in directions of interference waves, and adaptively controls the antenna switching means to connect the antenna elements included in one of the plurality of sets of partial array antennas to their corresponding receiving circuits, so as to improve the determined signal quality to be obtained when the receiving circuits are adaptively controlled.

In the adaptive antenna apparatus, the plurality of sets of partial array antennas may be linear array antennas. In this case, the linear array antennas are disposed such that a straight line passing through feeding points of antenna elements included in any one of the linear array antennas intersects with a further straight line passing through feeding points of antenna elements included in any one of the other linear array antennas.

In the adaptive antenna apparatus, the control means may allow the signal quality determination means to determine the respective signal qualities of the combined received signals to be obtained when connecting antenna elements included in each one of the plurality of sets of partial array antennas to their corresponding receiving circuits and adaptively controlling the receiving circuits, compare the signal qualities for the respective sets of partial array antennas, and control the antenna switching means to connect antenna elements included in a partial array antenna that achieves the best signal quality, to their corresponding receiving circuits.

In the adaptive antenna apparatus, the control means may measure signal strengths of radio frequency signals received by antenna elements connected to their corresponding receiving circuits, and in the case that a signal strength of a radio frequency signal received by any one of the antenna elements is smaller than a predetermined threshold value, the control means may control the antenna switching means to connect another antenna element in place of the antenna element of the signal strength smaller than the predetermined threshold value, to its corresponding receiving circuit.

The adaptive antenna apparatus may include three antenna elements, two receiving circuits, and three sets of partial array antennas.

According to another aspect of the present invention, a radio communication apparatus is provided including the adaptive antenna apparatus and a radio communication circuit that transmits and receives a radio signal through the adaptive antenna apparatus.

The radio communication apparatus may be a mobile phone or a laptop computer having radio communication functionality.

Thus, by providing such a configuration as described above, the adaptive antenna apparatus of the present invention can adaptively change the amplitudes and phases of the received signals, and adaptively connect the antenna elements included in any one of the plurality of sets of partial array antennas to the receiving circuit portions in the subsequent stage. Accordingly, it is possible to provide an adaptive antenna apparatus which includes a smaller number of antenna elements and a smaller number of receiving circuit systems than those in the prior art, as well as is capable of forming a beam(s) on an incoming wave(s) with an arbitrary azimuth angle(s) and forming nulls on interference waves with arbitrary azimuth angles. Additionally, according to the present invention, a radio communication apparatus using such adaptive antenna apparatus can be provided.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

Figure 1:
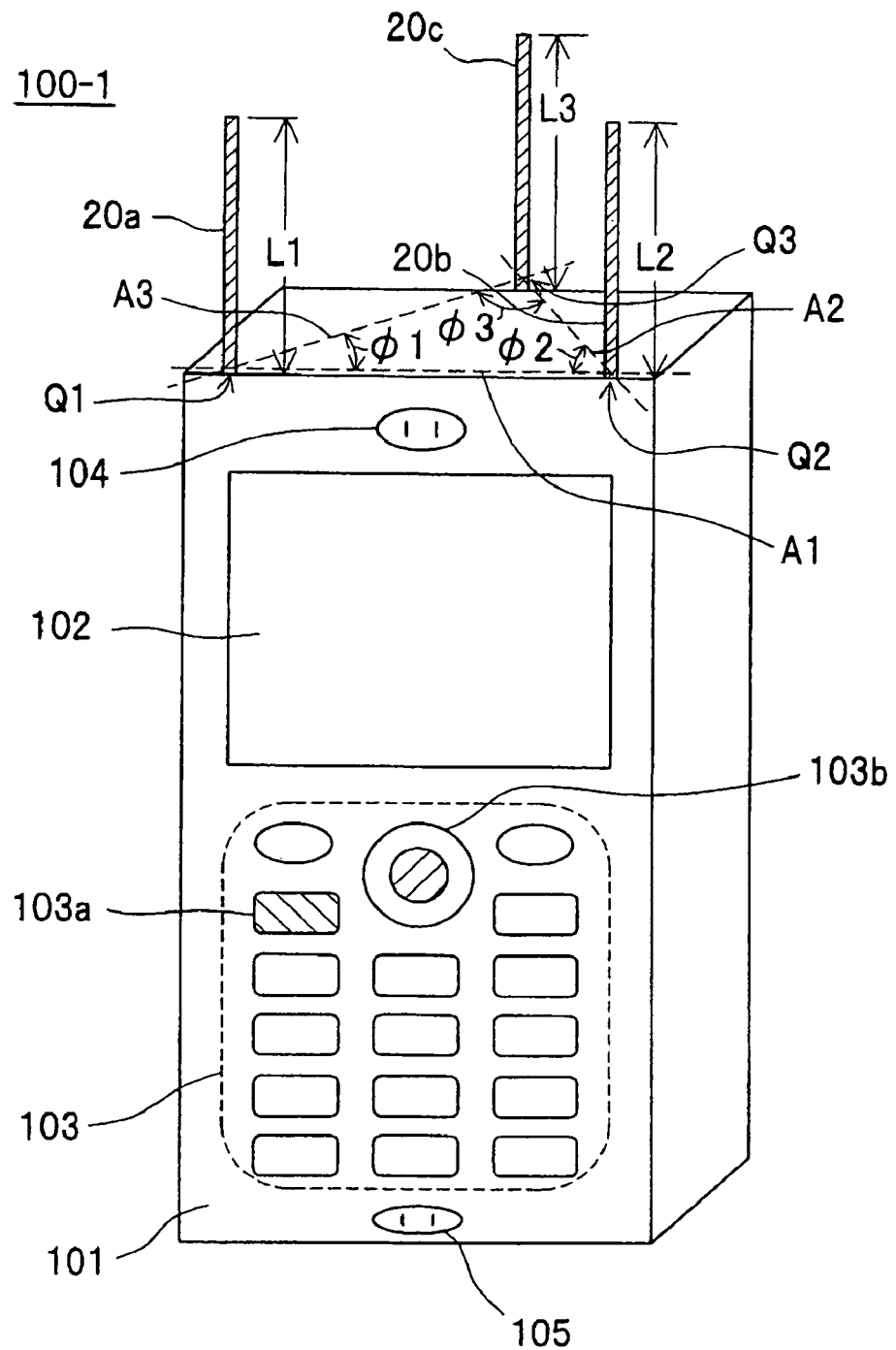
FIG. 1 is a perspective view showing a configuration of a mobile radio communication apparatus 100-1 equipped with an adaptive antenna apparatus according to a first preferred embodiment of the present invention.

The preferred embodiments according to the present invention will be described below with reference to the attached drawings. Note that similar components are denoted by like reference numerals.

First Preferred Embodiment

Figure 2:
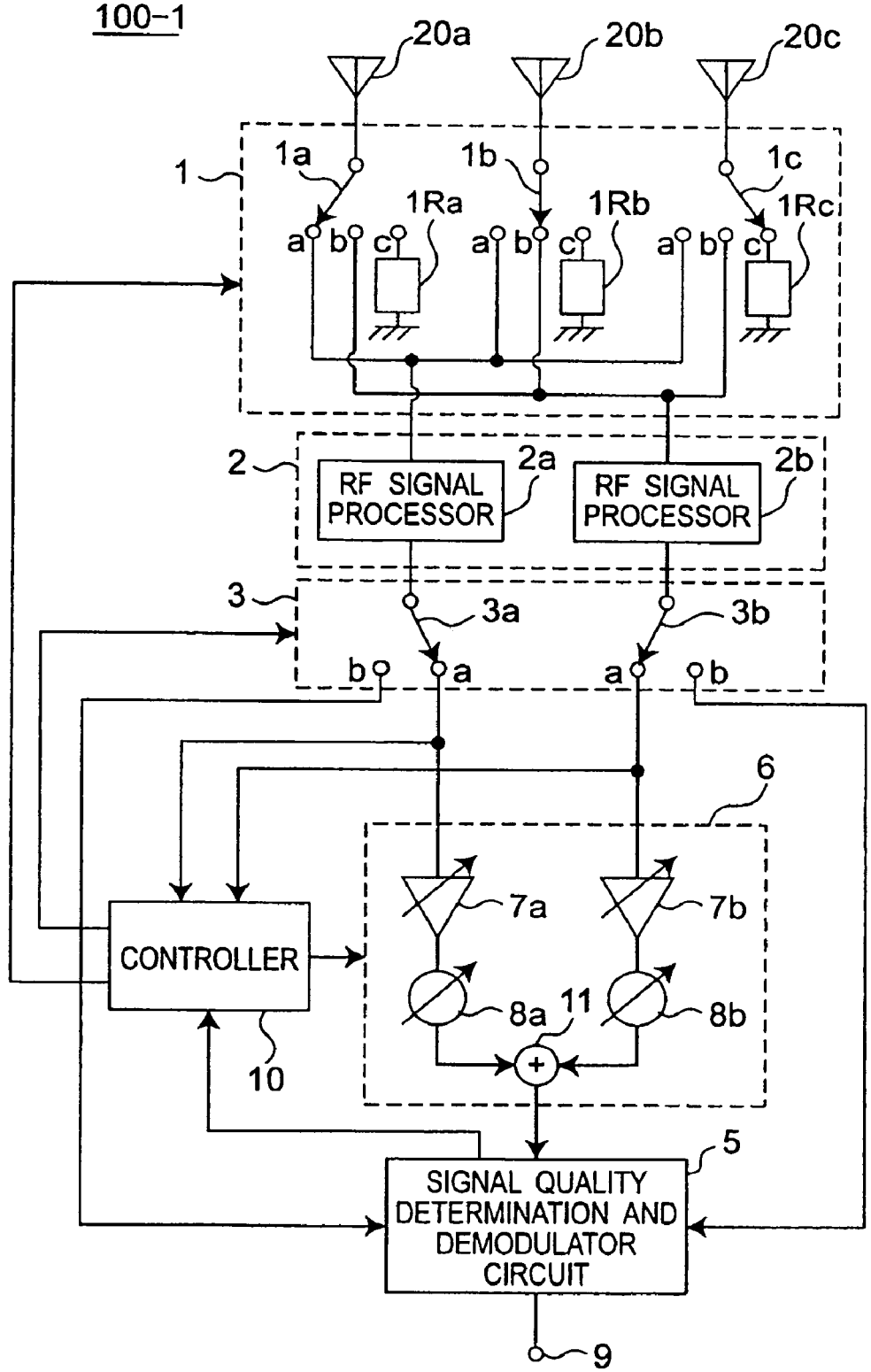
FIG. 2 is a block diagram showing a configuration of a radio communication circuit of the mobile radio communication apparatus 100-1 of FIG. 1.

FIG. 1 is a perspective view showing a configuration of a mobile radio communication apparatus 100-1 equipped with an adaptive antenna apparatus according to a first preferred embodiment of the present invention, and FIG. 2 is a block diagram showing a configuration of a radio communication circuit of the mobile radio communication apparatus 100-1 of FIG. 1. Referring to FIG. 1, the mobile radio communication apparatus 100-1 according to the present preferred embodiment is equipped, at a top of its housing 101, with three antenna elements 20a, 20b and 20c made of linear cylindrical conductors, having predetermined element lengths L1, L2 and L3 respectively, and electrically insulated from the housing 101. The antenna elements 20a, 20b and 20c have feeding points Q1, Q2 and Q3, respectively, at their respective ends in proximity to the housing 101 of the mobile radio communication apparatus 100-1. The antenna elements 20a, 20b and 20c are mounted to be parallel to a longitudinal direction of the housing 101 of the mobile radio communication apparatus 100-1. The antenna elements 20a, 20b and 20c constitute three sets of partial linear array antennas, each including two of the antenna elements 20a, 20b and 20c (i.e., a set including the antenna elements 20a and 20b, a set including the antenna elements 20b and 20c, and a set including the antenna elements 20c and 20a), and the partial linear array antennas are disposed such that straight lines A1, A2 and A3, each passing through the feeding points of the antenna elements included in any one of the three sets of linear array antennas, have different directions from one another. Particularly, the partial linear array antennas are disposed such that the straight line A1 through the feeding points Q1 and Q2 of the antenna elements 20a and 20b and the straight line A3 through the feeding points Q1 and Q3 of the antenna elements 20a and 20c intersect with each other at a predetermined angle $\phi 1$ (preferably, 10 to 170 degrees), and further, the straight line A2 through the feeding points Q2 and Q3 of the antenna elements 20b and 20c intersects with the straight line A1 through the feeding points Q1 and Q2 of the antenna elements 20a and 20b at a predetermined angle $\phi 2$ and intersects with the straight line A3 through the feeding points Q1 and Q3 of the antenna elements 20a and 20c at a predetermined angle $\phi 3$.

When the wavelength of a radio signal to be transmitted and received is $\lambda$, the element lengths L1, L2 and L3 are set to, e.g., $\lambda/4$, and distances between the antenna elements 20a, 20b and 20c are set to, e.g., $\lambda/4$.

The housing 101 contains therein the radio communication circuit of FIG. 2. Further, the housing 101 of the mobile radio communication apparatus 100-1 of FIG. 1 are provided with a display 102, a keyboard 103 including keys 103a, a cross directional key 103b etc., a speaker 104, and a microphone 105.

FIG. 2 is a block diagram showing the configuration of the radio communication circuit of the mobile radio communication apparatus 100-1 of FIG. 1. The radio communication circuit mainly includes an antenna switching circuit 1, an RF signal processing circuit 2, an adaptive control switching circuit 3, an adaptive control circuit 6, a signal quality determination and demodulator circuit 5, and a controller 10. These components are configured as follows.

The antenna switching circuit 1 includes switches 1a, 1b and 1c connected to the antenna elements 20a, 20b and 20c, respectively. As will be described in detail later, the antenna switching circuit 1 selectively outputs, as output signals, radio frequency signals received by any two of the three antenna elements 20a, 20b and 20c, to circuits in the subsequent stage.

The RF signal processing circuit 2 includes two RF signal processors 2a and 2b. The two output signals from the antenna switching circuit 1 are inputted into the RF signal processing circuit 2, and the RF signal processing circuit 2 performs a necessary radio frequency processing on these signals, such as amplification, frequency conversion, and/or analog-to-digital (A/D) conversion of the signals, and outputs the processed signals to circuits in the subsequent stage, as output signals.

The adaptive control switching circuit 3 inputs the two output signals of the RF signal processing circuit 2 into the adaptive control circuit 6 or into the signal quality determination and demodulator circuit 5, according to control of the controller 10.

The adaptive control circuit 6 includes variable gain amplifiers 7a and 7b, phase shifters 8a and 8b, and a combiner 11. The variable gain amplifier 7a and the phase shifter 8a control the amplitude and phase of an output signal from the RF signal processor 2a, and the variable gain amplifier 7b and the phase shifter 8b control the amplitude and phase of an output signal from the RF signal processor 2b. The signals, the amplitude and phase of which have been controlled, are combined by the combiner 11. Thus, the adaptive control circuit 6 performs an adaptive control of the two output signals from the RF signal processing circuit 2, by adjusting the amplitudes and phases of these signals and combining the adjusted signals with each other, so as to form a radiation pattern with a beam in a direction of a desired wave and nulls in the directions of interference waves, and then outputs the combined signal to circuits in the subsequent stage, as an output signal.

The output signal from the adaptive control circuit 6, or one output signal which is directly sent from the RF signal processing circuit 2 through the adaptive control switching circuit 3 is inputted into the signal quality determination and demodulator circuit 5 is inputted. The signal quality determination and demodulator circuit 5 then determines a signal quality of the input signal, such as a desired wave power to noise ratio, as well as demodulates the input signal and then outputs the demodulated signal from an output terminal 9.

The controller 10 controls the adaptive control circuit 6 based on the two output signals from the RF signal processing circuit 2, and controls the antenna switching circuit 1 based on the two output signals from the RF signal processing circuit 2 and the determination result obtained by the signal quality determination and demodulator circuit 5. The controller 10 further controls the adaptive control switching circuit 3 for the two output signals from the RF signal processing circuit 2 to be outputted to the adaptive control circuit 6, or to be directly outputted to the signal quality determination and demodulator circuit 5 without passing through the adaptive control circuit 6.

In the mobile radio communication apparatus 100-1 of the present preferred embodiment, two receiving circuit portions are constituted of a set of parts including the RF signal processor 2a, the variable gain amplifier 7a and the phase shifter 8a, and another set of parts including the RF signal processor 2b, the variable gain amplifier 7b and the phase shifter 8b. The controller 10 is characterized in controlling the adaptive control circuit 6 to adaptively change the amplitudes and phases of received signals, so as to form a radiation pattern with a beam in a direction of a desired wave and nulls in the directions of interference waves, and also characterized in controlling the antenna switching circuit 1 to adaptively connect antenna elements included in any one of a linear array antenna formed by the antenna elements 20a and 20b, a linear array antenna formed by the antenna elements 20a and 20c, and a linear array antenna formed by the antenna elements 20b and 20c, to their corresponding receiving circuit portions in the subsequent stage, so as to improve the signal quality of received signals to be obtained when the adaptive control circuit 6 is adaptively controlled.

The configuration and operations of the radio communication circuit of the mobile radio communication apparatus 100-1 will be described below with reference to FIG. 2.

An operation of a typical prior art adaptive antenna apparatus is as follows. The adaptive antenna apparatus is an apparatus employing a technique for achieving a stable radio communication by steering a beam of an antenna radiation pattern in a direction in which a desired radio wave arrives and steering nulls of the radiation pattern in directions of interference waves as disturbances. Typically, the prior art adaptive antenna apparatus includes an amplitude adjustment circuit and a phase shifter for each antenna element, and provides the respective antenna signals with differences in amplitude and phase, for achieving the maximization of desired signal power and the minimization of interference signal powers. A signal received by each antenna element normally contains a thermal noise component along with a desired wave signal. Furthermore, the received signal may contain a co-frequency and co-channel interference wave from an adjacent base station, or a delayed wave which is identical to the desired wave with a temporal delay due to its long propagation path. In an analog radio receiver such as a television receiver or a radio receiver, a delayed wave degrades the quality of screen representation, e.g., as a ghost image. On the other hand, in a digital radio receiver, any of thermal noise, a co-channel interference wave and a delayed wave affects the received digital data as bit errors therein, and thus directly degrades the signal quality of the digital data. Let C denote the power of a desired wave, N denote the power of noise, and I denote the power of interference waves including a co-channel interference waves and delayed waves. An adaptive antenna apparatus operates, for example, to maximize an evaluation function C/N for a desired wave power to noise power ratio (CNR), or maximize an evaluation function C/(N+I) for a desired wave power to noise power plus interference wave power ratio (CNIR), in order to improve signal quality. Accordingly, the adaptive antenna apparatus can be adaptively controlled such that a direction of main beam to be formed by the adaptive antenna apparatus is substantially steered in a direction of a desired wave, and directions of nulls are substantially steered in directions of interference waves.

Referring to FIG. 2, in the antenna switching circuit 1 of the present preferred embodiment, the switch 1a connects the antenna element 20a to any one of the RF signal processors 2a and 2b and a load impedance element 1Ra. Similarly, the switch 1b connects the antenna element 20b to any one of the RF signal processors 2a and 2b and a load impedance element 1Rb, and the switch 1c connects the antenna element 20c to any one of the RF signal processors 2a and 2b and a load impedance element 1Rc. Each of the load impedance elements 1Ra, 1Rb and 1Rc acts as a load reactance (L) or a load susceptance (C). As will be described later, the switches 1a, 1b and 1c are interlocked with one another under control of the controller 10, and operate to connect only two of the antenna elements 20a, 20b and 20c to the RF signal processors 2a and 2b and connect the residual one to its corresponding load impedance element 1Ra, 1Rb or 1Rc. Then, the RF signal processors 2a and 2b perform a necessary radio frequency processing on radio frequency signals inputted from the antenna switching circuit 1, and outputs the processed signals to the adaptive control switching circuit 3. The adaptive control switching circuit 3 includes switches 3a and 3b controlled by the controller 10. The switch 3a changes between outputting an output signal of the RF signal processor 2a to the variable gain amplifier 7a (contact "a" side), and outputting the output signal directly to the signal quality determination and demodulator circuit 5 (contact "b" side). The switch 3b changes between outputting an output signal of the RF signal processor 2b to the variable gain amplifier 7b (contact "a" side), and outputting the output signal directly to the signal quality determination and demodulator circuit 5 (contact "b" side). When the adaptive control circuit 6 controls the amplitudes and phases of received signals, the respective switches 3a and 3b are switched to the contact "a" side by the controller 10, and output signals from the RF signal processors 2a and 2b are inputted into the variable gain amplifiers 7a and 7b, respectively, and are also inputted into the controller 10. The variable gain amplifier 7a changes the amplitude of a signal inputted thereto, and then the phase shifter 8a changes the phase of the signal that has been adjusted in amplitude. Similarly, the variable gain amplifier 7b changes the amplitude of a signal inputted thereto, and then the phase shifter 8b changes the phase of the signal that has been adjusted in amplitude. The combiner 11 combines the signals that have been adjusted in amplitude and phase, and outputs the combined signal to the signal quality determination and demodulator circuit 5. The signal quality determination and demodulator circuit 5 determines signal quality, such as CNR, of a signal inputted from the adaptive control circuit 6 or a signal directly inputted from the RF signal processing circuit 2 through the adaptive control switching circuit 3, and then outputs a determination result to the controller 10, as well as demodulates the input signal by using a demodulation scheme corresponding to a modulation scheme used in a transmitting side, and outputs the demodulated signal from the output terminal 9. Further, when the respective switches 3a and 3b are connected to the contact "a" side, the controller 10 detects respective signal strengths of the received signals inputted from the RF signal processors 2a and 2b.

Now, the control by the controller 10 for the adaptive control circuit 6 and the antenna switching circuit 1 will be described. When the mobile radio communication apparatus 100-1 receives radio frequency signals, the controller 10 controls the antenna switching circuit 1 to connect any two of the antenna elements 20a, 20b and 20c (e.g., the antenna elements 20a and 20b) to the RF signal processing circuit 2, and controls the adaptive control switching circuit 3 to turn the switches 3a and 3b to the contact "a" side. For simplicity of description, consider an example in which a radio environment is good. It is assumed that when the noise power (kTB), which is defined by the Boltzmann constant k, the absolute temperature T and the bandwidth B, is −92 dBm, the signal strength required for demodulation is −70 dB. This condition corresponds to the case in which the CNR is 22 dB. The controller 10 controls the adaptive control switching circuit 3 to turn the switch 3a to the contact "b" side. A received signal outputted from the RF signal processor 2a is inputted into the signal quality determination and demodulator circuit 5. The signal quality determination and demodulator circuit 5 then determines signal quality such as, e.g., CNR, and outputs information on the determined signal quality to the controller 10. At this time, the controller 10 switches the control scheme of the mobile radio communication apparatus 100-1 based on a following determination criterion, for example.

In the first case, if the CNR is high (e.g., 25 dB or more), the controller 10 allows only a received signal outputted from the RF signal processor 2a to be directly outputted to the signal quality determination and demodulator circuit 5, and allows a received signal outputted from the RF signal processor 2b to be attenuated by the variable gain amplifier 7b. Accordingly, only the antenna element 20a among the antenna elements 20a, 20b and 20c operates in the mobile radio communication apparatus 100-1. Alternatively, the controller 10 may allow not the switch 3a but the switch 3b to be turned to the contact "b" side and allow the signal quality determination and demodulator circuit 5 to determine a CNR of a received signal outputted from the RF signal processor 2a. If the determined CNR is high (e.g., 25 dB or more), the controller 10 may allow only a received signal outputted from the RF signal processor 2b to be directly outputted to the signal quality determination and demodulator circuit 5, and allow the received signal outputted from the RF signal processor 2a to be attenuated by the variable gain amplifier 7a of the adaptive control circuit 6. In such a case, only the antenna element 20b among the antenna elements 20a, 20b and 20c operates in the mobile radio communication apparatus 100-1. Alternatively, the controller 10 may allow the signal quality determination and demodulator circuit to determine CNRs of the respective received signals outputted from the RF signal processors 2a and 2b. If both of the CNRs are high (e.g., 25 dB or more), the controller 10 may perform selection by allowing only one of the received signals having a better CNR to be outputted to the demodulator.

In the second case, if the CNR is low (e.g., less than 25 dB), the controller 10 controls the adaptive control switching circuit 3 to turn the switches 3a and 3b to the contact "a" side, and performs the adaptive control (e.g., maximum ratio combining) on respective received signals outputted from the RF signal processors 2a and 2b. The signal quality determination and demodulator circuit 5 determines CNRs of the adaptively-controlled received signals, and outputs a determination result to the controller 10. If the CNR after the adaptive control is 25 dB or more, the controller 10 continues the maximum ratio combining. On the other hand, if the CNR after the adaptive control is less than 25 dB, the controller 10 controls the antenna switching circuit 1 to change one of the antenna elements 20a and 20b receiving a signal of a signal strength lower than the other (e.g., the antenna element 20b), with the antenna element 20c, based on signal strengths of the received signals inputted into the controller 10 from the RF signal processors 2a and 2b through the adaptive control switching circuit 3, and then performs the adaptive control on received signals received by the antenna elements being used after the change.

Figure 51:
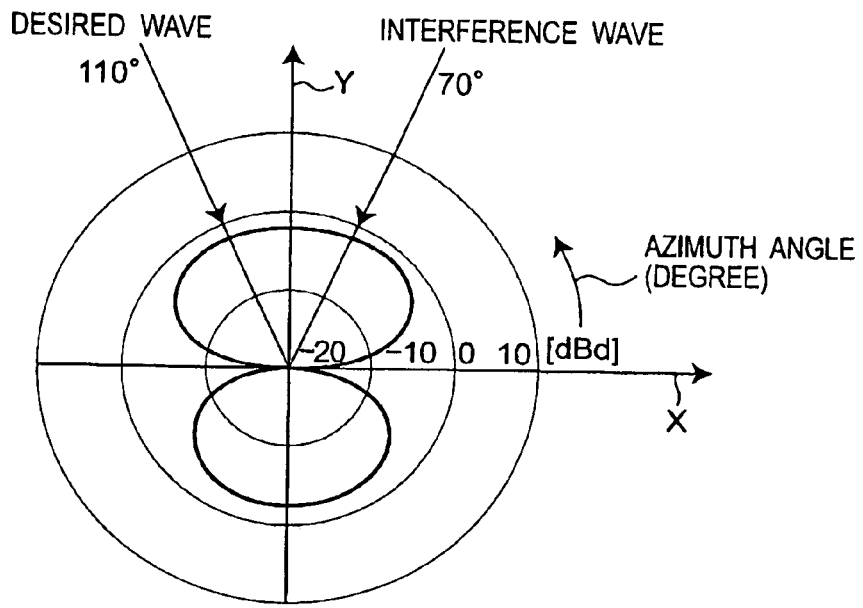
FIG. 51 is a diagram showing a simulation result according to the array antenna apparatus of FIG. 48 and showing an example of a radiation pattern in a horizontal-plane of the array antenna apparatus which is adaptively controlled when a desired wave with an azimuth angle of 110 degrees and an interference wave with an azimuth angle of 70 degrees are incoming to the array antenna apparatus.
Figure 52:
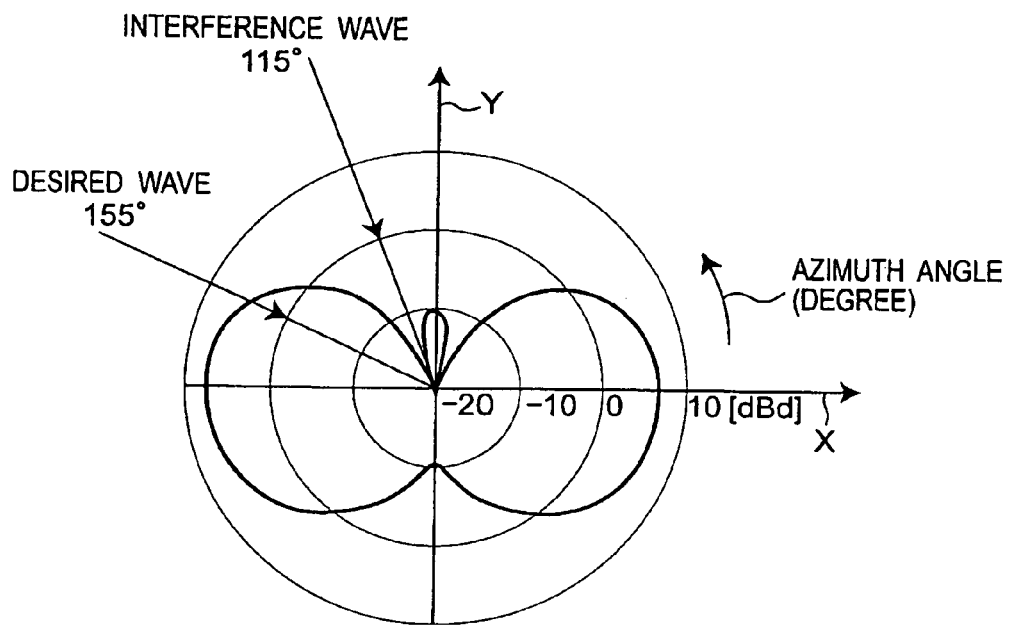
FIG. 52 is a diagram showing a simulation result according to the array antenna apparatus of FIG. 48 and showing an example of a radiation pattern in a horizontal-plane of the array antenna apparatus which is adaptively controlled when a desired wave with an azimuth angle of 155 degrees and an interference wave with an azimuth angle of 115 degrees are incoming to the array antenna apparatus.

If the CNRs of the received signals are less than 25 dB even performing the adaptive control, then it is supposed that as described with reference to FIG. 51, an average angle of arrival between a desired wave and an interference wave may match a direction of a straight line passing through feeding points of antenna elements connected to the RF signal processing circuit 2 (e.g., the straight line A1 through the feeding points Q1 and Q2 of the antenna elements 20a and 20b), thus it is difficult to produce a null in the direction of interference wave. In the present preferred embodiment, one of the antenna elements 20a and 20b receiving a signal of a signal strength lower than the other (here, the antenna element 20b) is changed with the antenna element 20c, thus forming a linear array antenna including the antenna elements 20a and 20c. Accordingly, the direction of the linear array antenna (i.e., the direction of the straight line A3 passing through the feeding points Q1 and Q3 of the antenna elements 20a and 20c) is shifted from the average angle of arrival between the desired wave and the interference wave, and thus, it becomes possible to adaptively control the amplitudes and phases of the received signals and steer null(s) in the direction(s) of interference wave(s).

Alternatively, instead of the above-described adaptive control process, the controller 10 may perform a control process as described below. The controller 10 allows the signal quality determination and demodulator circuit 5 to determine the respective signal qualities to be obtained when connecting antenna elements, which are included in each one of a linear array antenna formed by the antenna elements 20a and 20b, a linear array antenna formed by the antenna elements 20a and 20c, and a linear array antenna formed by the antenna elements 20b and 20c, to their corresponding receiving circuit portions. The controller 10 adaptively controls the receiving circuit portions, and compares the signal qualities for the respective linear array antennas with each other. Then, the controller 10 controls the antenna switching circuit 1 to connect antenna elements included in a linear array antenna that achieves the best signal quality, to their corresponding receiving circuit portions. Accordingly, a better signal quality can be achieved.

Although in the radio communication circuit of FIG. 2, the radiation pattern of the adaptive antenna apparatus is adaptively controlled by adjusting both the amplitude and phase of each received signal, the present invention is not limited thereto and the radiation pattern of the mobile radio communication apparatus 100-1 can be adaptively controlled by adjusting at least one of the amplitude and phase of each received signal.

The antenna elements 20a, 20b and 20c can include at least one antenna element that receives a radio frequency signal having a principal plane of polarization which is different from that of radio frequency signals to be received by other antenna elements. For example, the principal polarization of the antenna elements 20a and 20b may be vertical polarization, and the principal polarization of the antenna element 20c may be horizontal polarization. Alternatively, the planes of polarization of radio frequency signals to be received by the respective antenna elements 20a, 20b and 20c may be different from one another.

In the mobile radio communication apparatus 100-1 of the present preferred embodiment, the antenna elements 20a, 20b and 20c are not limited to linear antenna elements, such as those shown in FIG. 1, and patch antennas or antenna elements of other shapes can be used.

Further, the configuration of the mobile radio communication apparatus 100-1 of the present preferred embodiment is not limited to antenna elements included in any one of a linear array antenna formed by the antenna elements 20a and 20b, a linear array antenna formed by the antenna elements 20a and 20c, and a linear array antenna formed by the antenna elements 20b and 20c that are connected to their corresponding receiving circuit portions in the subsequent stage. According to the present invention, any one of the antenna elements may be permanently connected to a receiving circuit portion in the subsequent stage. For example, the antenna element 20a can be permanently connected to the RF signal processor 2a, and the antenna switching circuit 1 can connect one of the antenna elements 20b and 20c to the RF signal processor 2b.

Although the radio communication circuit of FIG. 2 includes only a radio receiving circuit, the present invention is not limited thereto and a mobile radio communication apparatus 100-1 can be configured so as to further include a radio transmitting circuit in addition to the radio receiving circuit. In this case, the controller 10 can adaptively control the antenna switching circuit 1 to connect antenna elements included in any one of a linear array antenna formed by the antenna elements 20a and 20b, a linear array antenna formed by the antenna elements 20a and 20c, and a linear array antenna formed by the antenna elements 20b and 20c to preferably two transmitting circuit portions (not shown), and can adaptively control the transmitting circuit portions to adjust at least one of the amplitude and phase of each radio frequency signal to be transmitted, so as to form a radiation pattern having a beam and nulls in desired directions.

As described above, the mobile radio communication apparatus 100-1 according to the present preferred embodiment controls the adaptive control circuit 6 to adaptively change the amplitudes and phases of received signals, and controls the antenna switching circuit 1 to adaptively connect antenna elements included in any one of a linear array antenna formed by the antenna elements 20a and 20b, a linear array antenna formed by the antenna elements 20a and 20c, and a linear array antenna formed by the antenna elements 20b and 20c to their corresponding receiving circuit portions in the subsequent stage, and accordingly, can form a beam for an incoming wave with an arbitrary azimuth angle and nulls for interference waves with arbitrary azimuth angles. Thus, in the present preferred embodiment, the plurality of sets of linear array antennas are configured so as to be disposed in different directions, and accordingly, even if an interference wave with a certain angle of arrival cannot be sufficiently suppressed by one linear array antenna, the present preferred embodiment can suppress the interference wave by using another linear array antenna, and thus, can perform adaptive control for receiving an incoming wave in an arbitrary direction and suppressing interference wave(s).

Second Preferred Embodiment

Figure 3:
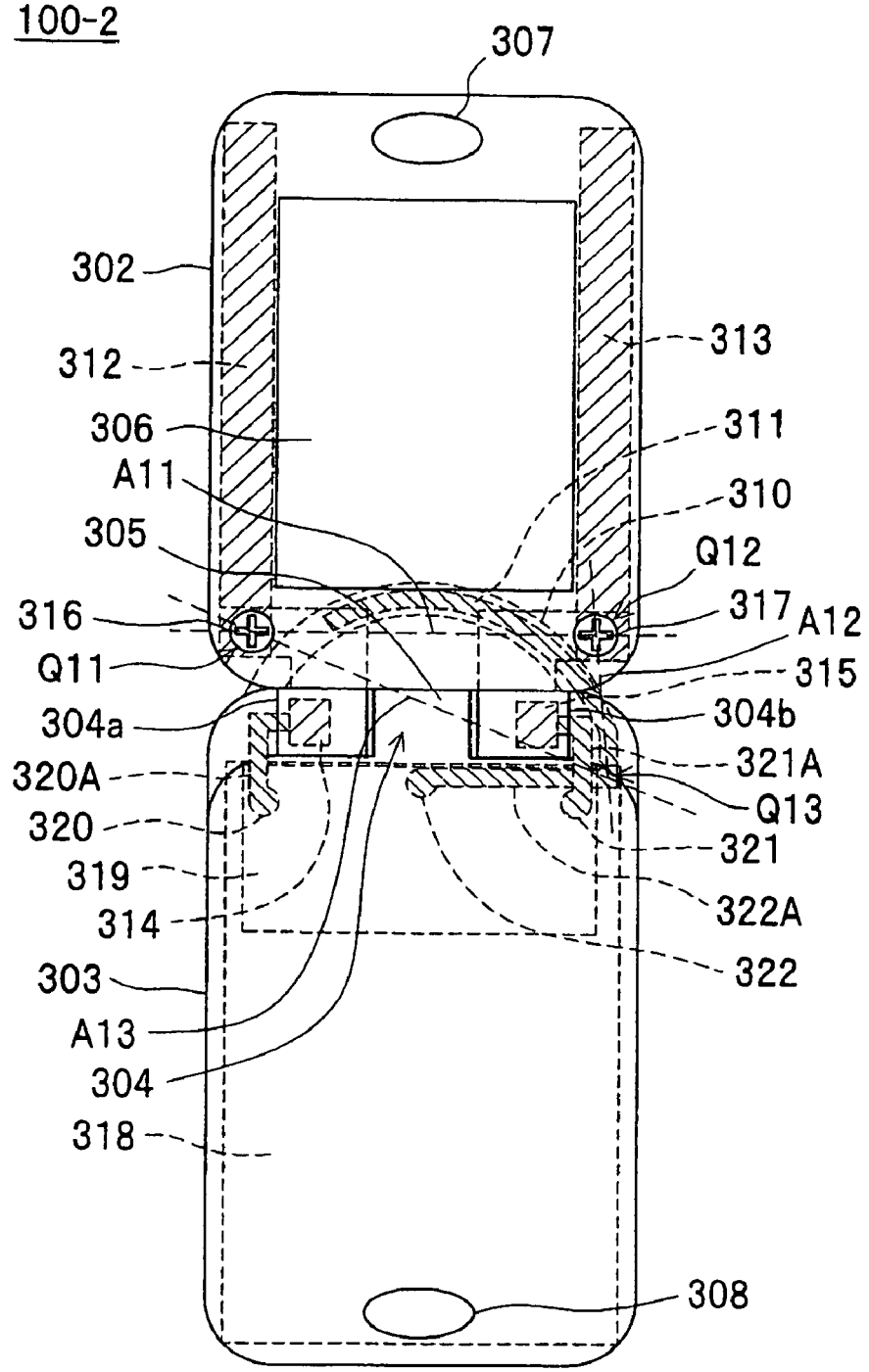
FIG. 3 is a plan view showing a foldable mobile radio communication apparatus 100-2 in an open state, equipped with an adaptive antenna apparatus according to a second preferred embodiment of the present invention.
Figure 4:
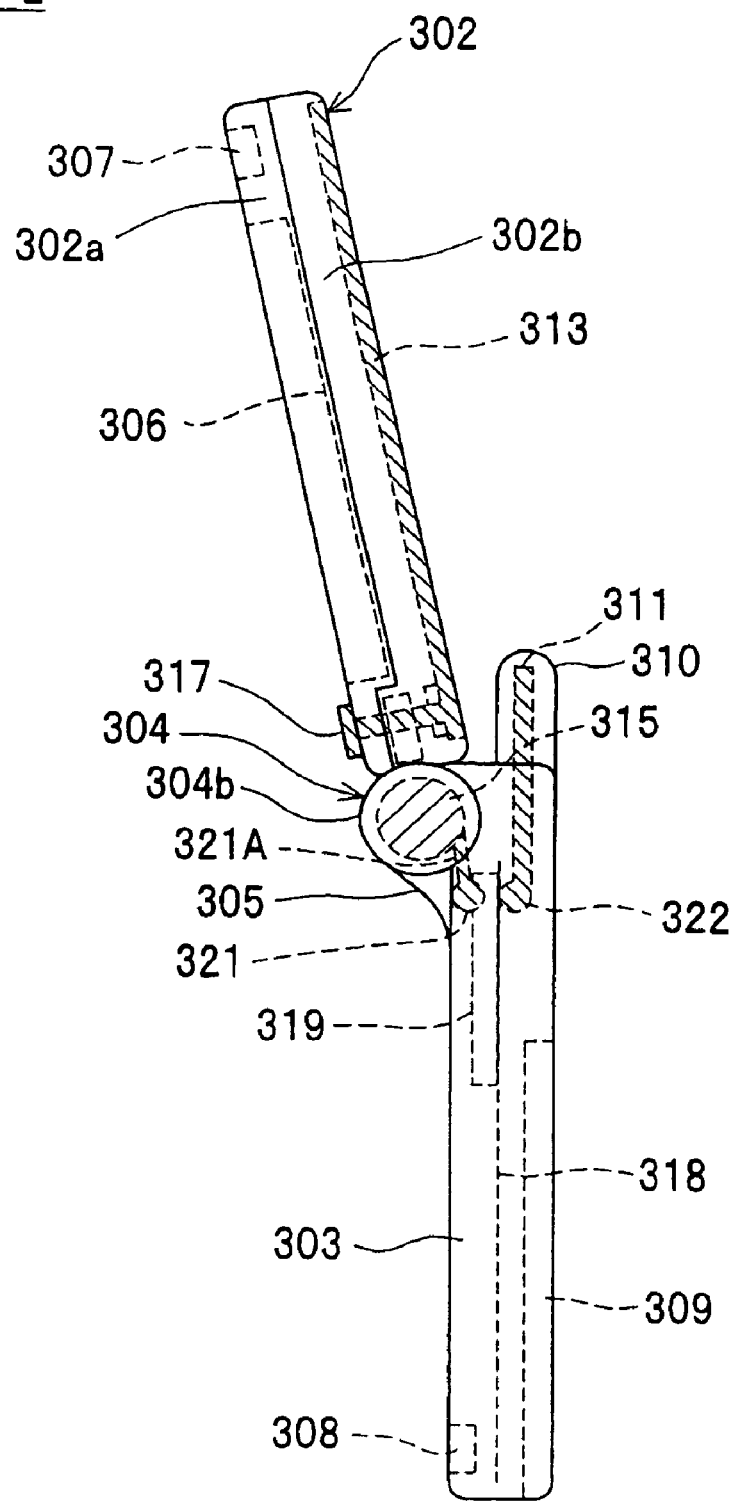
FIG. 4 is a side view of the foldable mobile radio communication apparatus 100-2 of FIG. 3.

FIG. 3 is a plan view showing a foldable mobile radio communication apparatus 100-2 in an open state, equipped with an adaptive antenna apparatus according to a second preferred embodiment of the present invention, and FIG. 4 is a side view of the foldable mobile radio communication apparatus 100-2 of FIG. 3.

Referring to FIGS. 3 and 4, the mobile radio communication apparatus 100-2 according to the present preferred embodiment includes an upper housing 302 and a lower housing 303 each substantially shaped in a rectangular parallelepiped, and in which the upper housing 302 and the lower housing 303 are connected to each other by a cylindrically shaped hinge portion 304 in a foldable manner. The upper housing 302 includes a first upper housing portion 302a located on a side close to a user when the mobile radio communication apparatus 100-2 is being used (this side is referred to as the "inner side" of the mobile radio communication apparatus 100-2 in a following description); and a second upper housing portion 302b located on a side remote from the user (this side is referred to as the "outer side" of the mobile radio communication apparatus 100-2, hereinafter). The lower housing 303 is equipped with, at its outer upper end, a curved boom portion 310 extending in a width direction (left-right direction) of the mobile radio communication apparatus 100-2. The hinge portion 304 includes a left hinge portion 304a and a right hinge portion 304b each mechanically connected to the first upper housing portion 302a, and a central hinge portion 305 integrally formed on the lower housing 303 and engaged between the left hinge portion 304a and the right hinge portion 304b. The upper housing 302 and the lower housing 303 can rotate with and are foldable at the hinge portion 304, by means of a rotating shaft (not shown) internally extending through the left hinge portion 304a, the central hinge portion 305, and the right hinge portion 304b. A liquid crystal display 306 is disposed at substantially a middle of the first upper housing portion 302a, and a speaker 307 is disposed above the liquid crystal display 306. Furthermore, a microphone 308 is disposed on the inner side of the mobile radio communication apparatus 100-2 and near a lower end of the lower housing 303. A rechargeable battery 309 is disposed on the opposite side of the microphone 308 in the lower housing 303 (i.e., the outer side of the mobile radio communication apparatus 100-2). A printed circuit board 318 is disposed within the lower housing 303 and at substantially a middle of a thickness direction of the lower housing 303. A radio communication circuit 319 including the radio communication circuit of FIG. 2 is configured on the printed circuit board 318. Further, a ground conductor pattern of the printed circuit board 318 acts as a ground conductor of the antenna apparatus.

Figure 5:
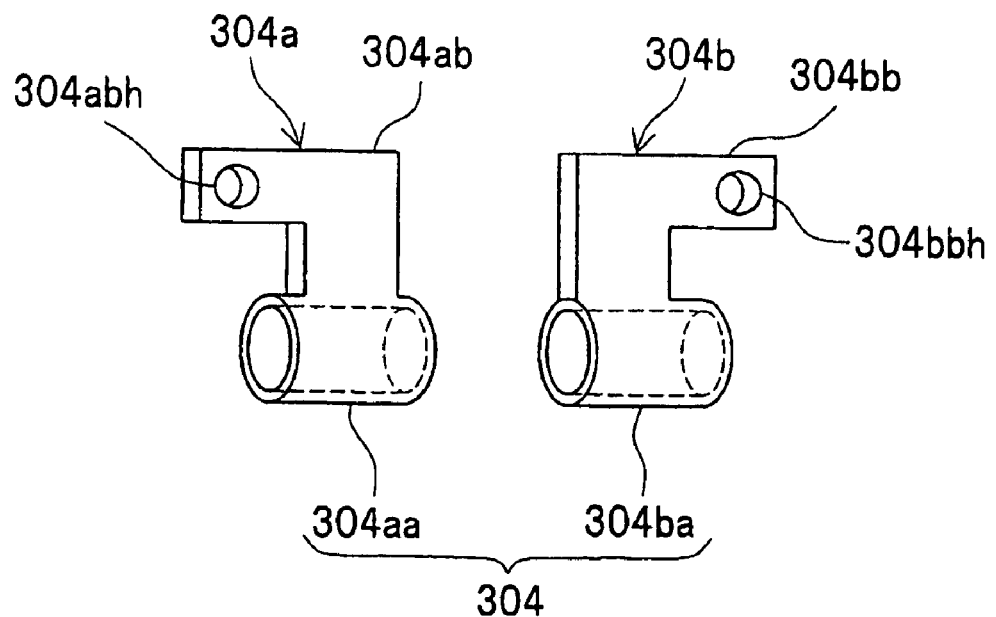
FIG. 5 is a perspective view showing a left hinge portion 304a and a right hinge portion 304b of a hinge portion 304 of FIGS. 3 and 4.
Figure 6:
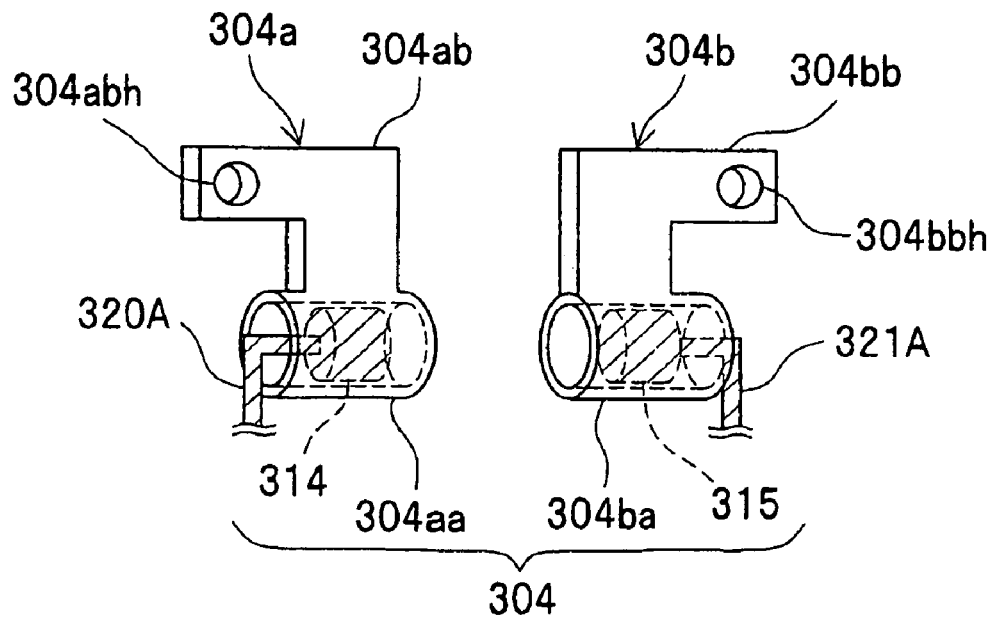
FIG. 6 is a perspective view of the hinge portion 304 in which cylindrical connecting members 314 and 315 are inserted into the left hinge portion 304a and the right hinge portion 304b of FIG. 5, respectively.

The mobile radio communication apparatus 100-2 of the present preferred embodiment includes two antenna elements 312 and 313 provided in the upper housing 302, and an antenna element 311 provided in the boom portion 310 of the lower housing 303. Each of the antenna elements 312 and 313 is made of a linear strip conductor. The antenna elements 312 and 313 are disposed so as to extend along a longitudinal direction (up-down direction) of the upper housing 302, closely to a left end and a right end of the upper housing 302, respectively, and in contact with a side facing the outer side of the upper housing 302. The antenna element 312 is electrically connected, at a feeding point Q11 at the lower end thereof, to the left hinge portion 304a via a screw 316. Similarly, the antenna element 313 is electrically connected, at a feeding point Q12 at the lower end thereof, to the right hinge portion 304b via a screw 317. FIG. 5 is a perspective view showing the left hinge portion 304a and the right hinge portion 304b of the hinge portion 304 of FIGS. 3 and 4. Each of the left hinge portion 304a and the right hinge portion 304b is made of a conductive material such as aluminum or zinc. The left hinge portion 304a includes a cylindrical portion 304aa, a blade portion 304ab connected to the cylindrical portion 304aa, and a screw hole 304abh provided in the blade portion 304ab to receive the screw 316. Similarly, the right hinge portion 304b also includes a cylindrical portion 304ba, a blade portion 304bb connected to the cylindrical portion 304ba, and a screw hole 304bbh provided in the blade portion 304bb to receive the screw 317. The left hinge portion 304a and the right hinge portion 304b are electrically connected to the antenna elements 312 and 313 via the screws 316 and 317 respectively, as described above, and are mechanically connected to the upper housing 302 via the screws 316 and 317. FIG. 6 is a perspective view of the hinge portion 304 in which cylindrical connecting members 314 and 315 are inserted into the left hinge portion 304a and the right hinge portion 304b of FIG. 5, respectively. The cylindrical connecting members 314 and 315 are made of a conductive material, such as aluminum or zinc, and formed such that their outside diameters substantially match inside diameters of the cylindrical portions 304aa and 304ba, respectively. As shown in FIG. 6, the cylindrical connecting member 314 is inserted into the cylindrical portion 304aa of the left hinge portion 304a, and the cylindrical connecting member 314 is connected to a terminal 320 of the radio communication circuit 319 via a feeder line 320A. Similarly, as shown in FIG. 6, the cylindrical connecting member 315 is inserted into the cylindrical portion 304ba of the right hinge portion 304b, and the cylindrical connecting member 315 is connected to a terminal 321 of the radio communication circuit 319 via a feeder line 321A. Thus, the antenna elements 312 and 313 are electrically connected to the radio communication circuit 319. Note that only at least part of the left hinge portion 304a and the right hinge portion 304b should be made of a conductive material so as to electrically connect the antenna elements 312 and 313 to the radio communication circuit 319. In this case, each of the left hinge portion 304a and the right hinge portion 304b may be composed by, for example, patterning a metal film on a surface of a resin material, or a resin material may be used on a surface or in part of the conductive material.

The antenna element 311 is made of a linear conductor, and provided to extend through the boom portion 310 of the lower housing 303. A feeding point Q13 at an end of the antenna element 311 is connected to a terminal 322 of the radio communication circuit 319 via a feeder line 322A, and thus, the antenna element 311 is electrically connected to the radio communication circuit 319. The antenna element 311 is not limited to being embedded in the boom portion 310, and the antenna element 311 may be provided to be contained in a projection which is integrally formed with the lower housing 303. Alternatively, the antenna element 311 may be provided to be built in the lower housing 303.

Thus, the mobile radio communication apparatus 100-2 of the present preferred embodiment is provided with the antenna elements 312, 313 and 311, and accordingly, as with the mobile radio communication apparatus 100-1 according to the first preferred embodiment, a partial array antenna including the antenna elements 312 and 313, a partial array antenna including the antenna elements 311 and 312, and a partial array antenna including the antenna elements 311 and 313 are formed, and the partial array antennas are disposed such that straight lines each passing through feeding points of the antenna elements included in each one of the three sets of partial array antennas, i.e., a straight line A11 through the feeding points Q11 and Q12 of the antenna elements 312 and 313, a straight line A12 through the feeding points Q12 and Q13 of the antenna elements 313 and 311, and a straight line A13 through the feeding points Q13 and Q11 of the antenna elements 311 and 312, have different directions from one another. The mobile radio communication apparatus 100-2 performs control such that antenna elements included in any one of the partial array antennas are adaptively connected to preferably two receiving circuit portions (not shown) provided in the radio communication circuit 319, and accordingly, can form a beam for an incoming wave with an arbitrary azimuth angle and nulls for interference waves with arbitrary azimuth angles. The radio communication circuit 319 is characterized in performing adaptive control so as to form a radiation pattern with a beam in a direction of desired wave and nulls in directions of interference waves, based on radio frequency signals received by antenna elements connected to their corresponding receiving circuit portions, by adjusting at least one of the amplitude and phase of each radio frequency signal, and also characterized in adaptively switching a plurality of sets of partial array antennas so as to improve the signal quality of received signals to be obtained when the receiving circuit portions are adaptively controlled. Thus, in the present preferred embodiment, the plurality of sets of partial array antennas are configured so as to be disposed in different directions, and accordingly, even if an interference wave with a certain angle of arrival cannot be sufficiently suppressed by one partial array antenna, the present preferred embodiment can suppress the interference wave by using another partial array antenna, and thus, can perform adaptive control for receiving an incoming wave in an arbitrary direction and suppressing interference wave(s).

Third Preferred Embodiment

Figure 7:
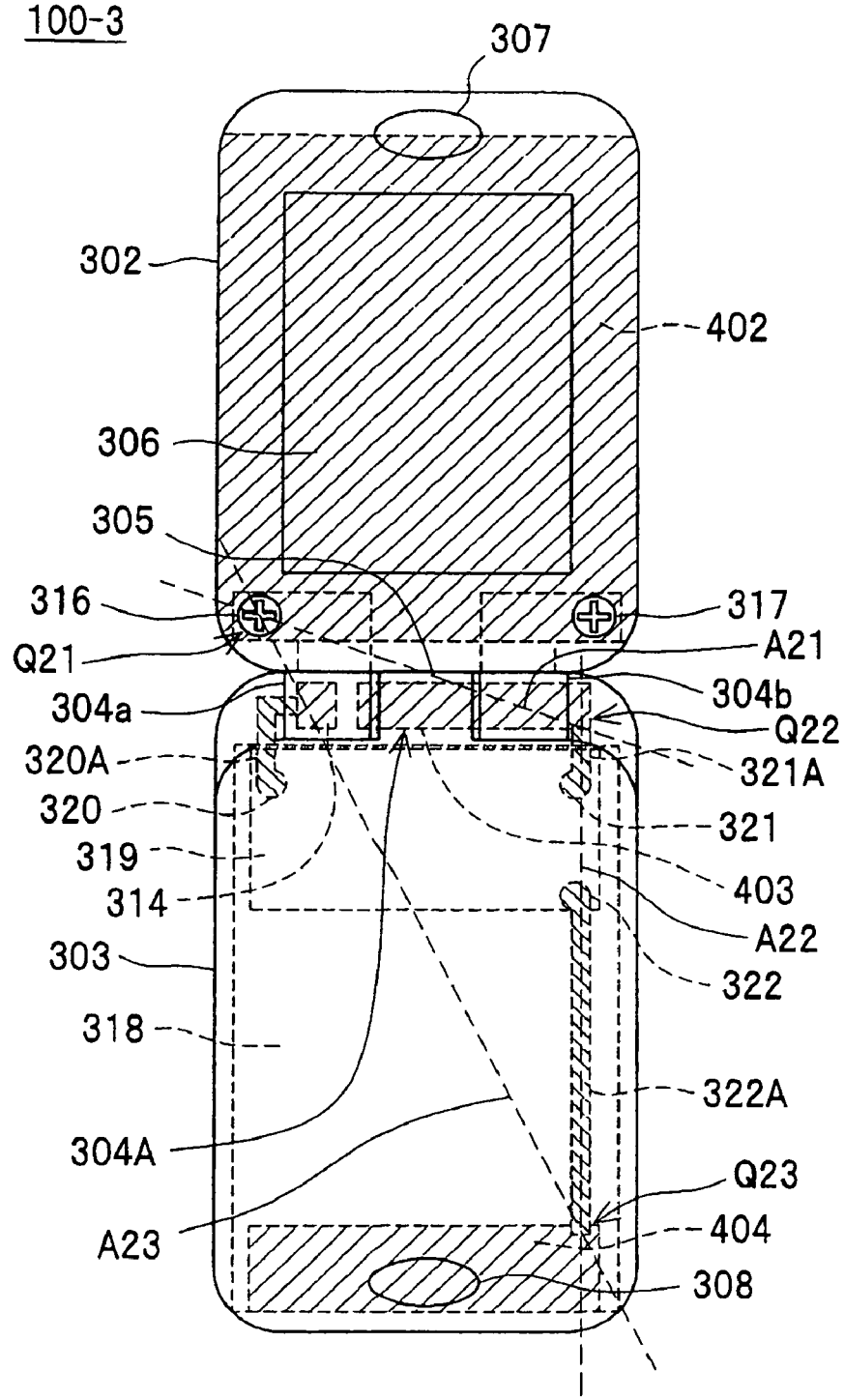
FIG. 7 is a plan view showing a foldable mobile radio communication apparatus 100-3 in an open state, equipped with an adaptive antenna apparatus according to a third preferred embodiment of the present invention.
Figure 8:
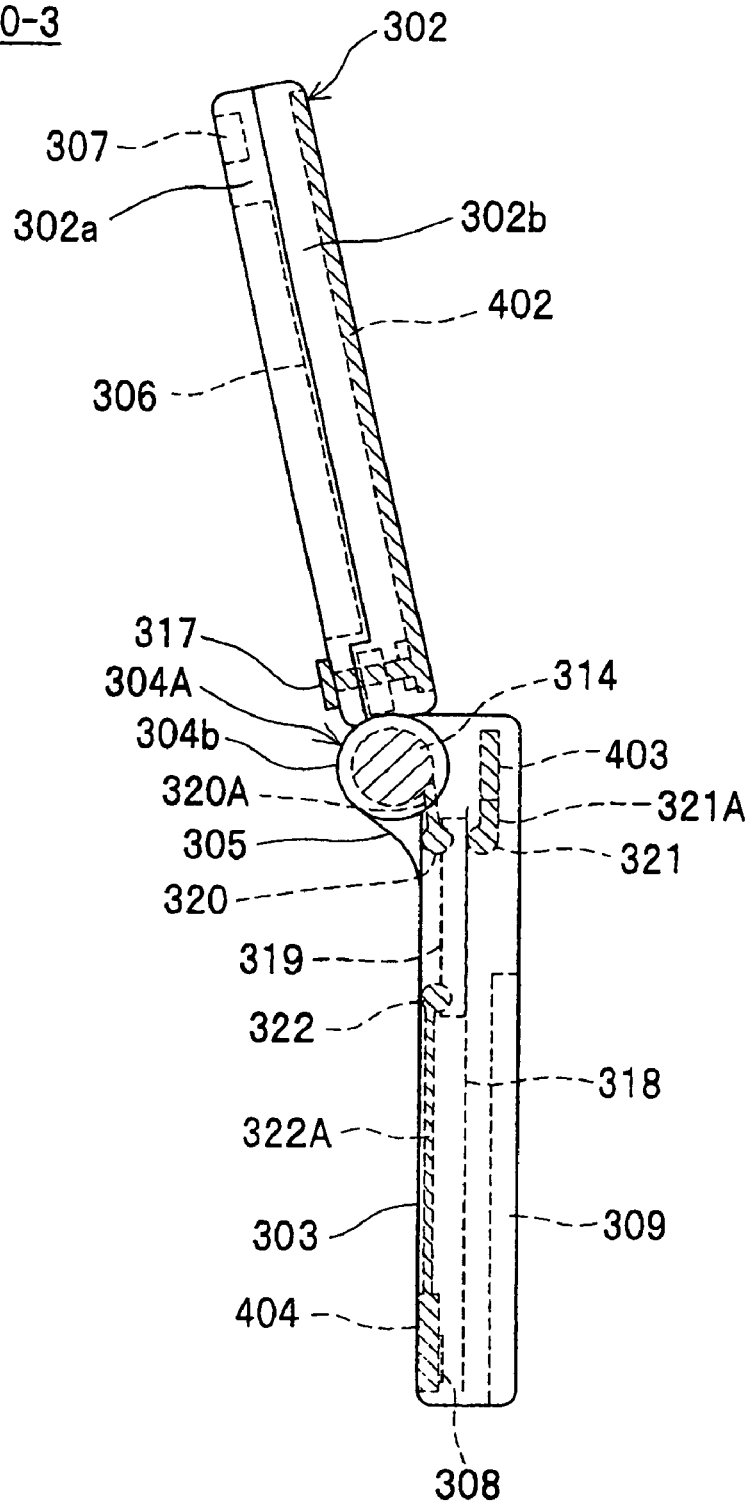
FIG. 8 is a side view of the foldable mobile radio communication apparatus 100-3 of FIG. 7.

FIG. 7 is a plan view showing a foldable mobile radio communication apparatus 100-3 in an open state, equipped with an adaptive antenna apparatus according to a third preferred embodiment of the present invention, and FIG. 8 is a side view of the foldable mobile radio communication apparatus 100-3 of FIG. 7.

Figure 9:
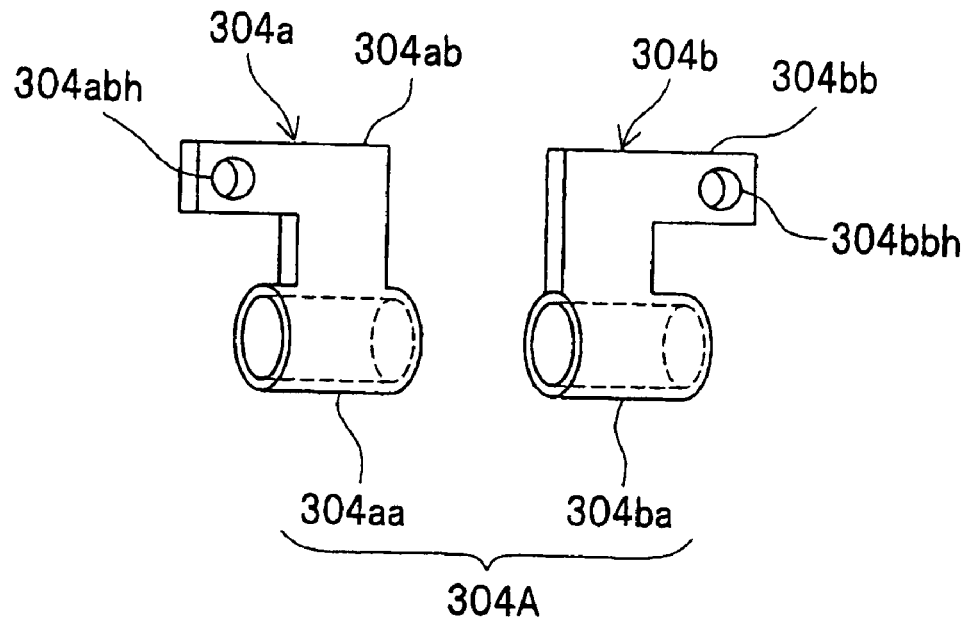
FIG. 9 is a perspective view showing a left hinge portion 304a and a right hinge portion 304b of a hinge portion 304A of FIGS. 7 and 8.
Figure 10:
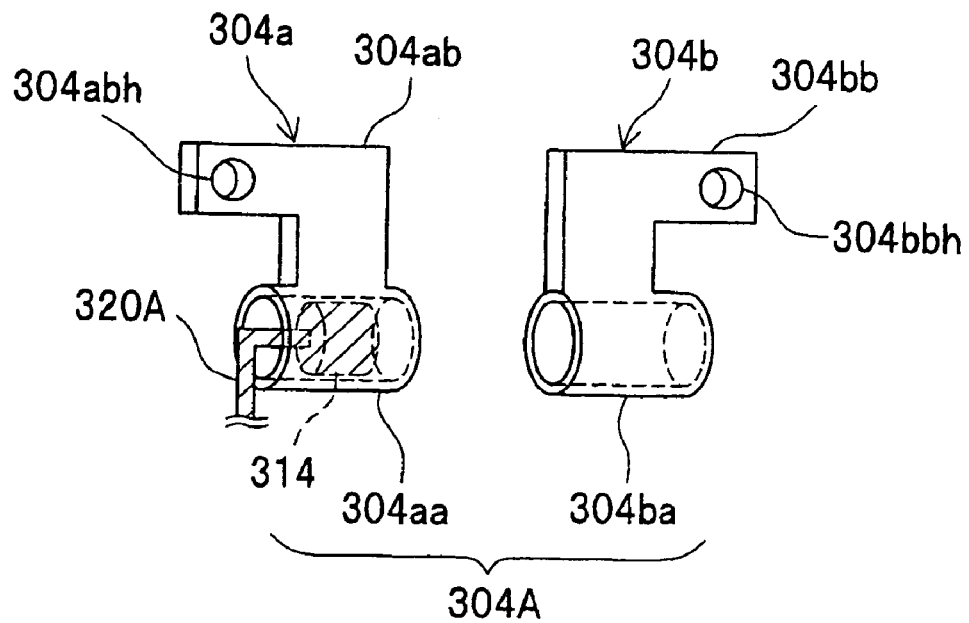
FIG. 10 is a perspective view of the hinge portion 304A in which a cylindrical connecting member 314 is inserted into the left hinge portion 304a of FIG. 9.

Referring to FIGS. 7 and 8, the mobile radio communication apparatus 100-3 according to the present preferred embodiment includes an antenna element 402 provided in an upper housing 302 and two antenna elements 403 and 404 provided in a lower housing 303, in place of the antenna elements 312 and 313, the boom portion 310, and the antenna element 311 in the boom portion 310 of the mobile radio communication apparatus 100-2 according to the second preferred embodiment. The antenna element 402 is made of a conductive plate having substantially the same area as a side facing the outer side of the upper housing 302, and disposed in contact with the side facing the outer side of the upper housing 302. The antenna element 402 is electrically and mechanically connected, at a feeding point Q21 at a lower left end thereof, to a left hinge portion 304a via a screw 316, and mechanically connected, at its lower right end thereof, to a right hinge portion 304b via a screw 317. FIG. 9 is a perspective view showing the left hinge portion 304a and the right hinge portion 304b of a hinge portion 304A of FIGS. 7 and 8. The left hinge portion 304a and the right hinge portion 304b are configured in the same manner as in the second preferred embodiment. FIG. 10 is a perspective view of the hinge portion 304A in which a cylindrical connecting member 314 is inserted into the left hinge portion 304a of FIG. 9. The hinge portion 304A of the present preferred embodiment is configured in the same manner as the hinge portion 304 in the second preferred embodiment, except that the cylindrical connecting member 315 is omitted because the upper housing 302 includes one antenna element (i.e., antenna element 402) therein. The cylindrical connecting member 314 inserted into a cylindrical portion 304aa of the left hinge portion 304a is connected to a terminal 320 of a radio communication circuit 319 via a feeder line 320A, and thus, the antenna element 402 is electrically connected to the radio communication circuit 319. The antenna element 403 is made of a linear strip conductor, and provided at an upper end of the lower housing 303 so as to extend in a width direction (left-right direction). A feeding point Q22 at an end of the antenna element 403 is connected to a terminal 321 of the radio communication circuit 319 via a feeder line 321A, and thus, the antenna element 403 is electrically connected to the radio communication circuit 319. The antenna element 404 is made of a linear strip conductor, and provided at a lower end of the lower housing 303 so as to extend in the width direction (left-right direction). A feeding point Q23 at an end of the antenna element 404 is connected to a terminal 322 of the radio communication circuit 319 via a feeder line 322A, and thus, the antenna element 404 is electrically connected to the radio communication circuit 319.

Thus, the mobile radio communication apparatus 100-3 of the present preferred embodiment is provided with the antenna elements 402, 403 and 404, and accordingly, as with the mobile radio communication apparatus 100-1 according to the first preferred embodiment, three sets of partial array antennas are constituted each including any two of the antenna elements 402, 403 and 404, and the partial array antennas are disposed such that straight lines A21, A22 and A23 each passing through feeding points of the antenna elements included in each one of the three sets of partial array antennas have different directions from one another. Thus, in the present preferred embodiment, the plurality of sets of partial array antennas are configured so as to be disposed in different directions, and accordingly, even if an interference wave with a certain angle of arrival cannot be sufficiently suppressed by one partial array antenna, the present preferred embodiment can suppress the interference wave by using another partial array antenna, and thus, can perform adaptive control for receiving an incoming wave in an arbitrary direction and suppressing interference wave(s).

Fourth Preferred Embodiment

Figure 11:
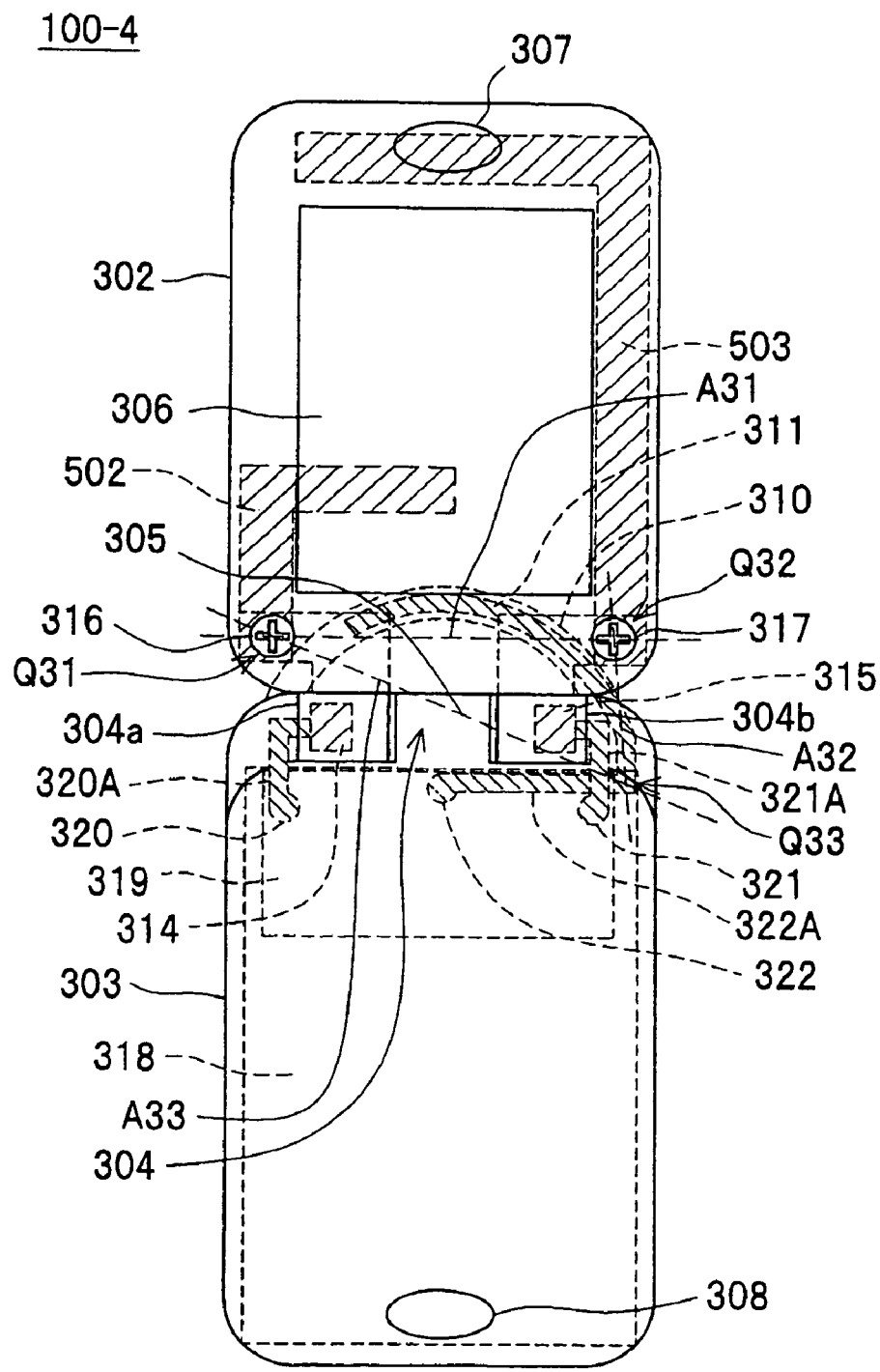
FIG. 11 is a plan view showing a foldable mobile radio communication apparatus 100-4 in an open state, equipped with an adaptive antenna apparatus according to a fourth preferred embodiment of the present invention.
Figure 12:
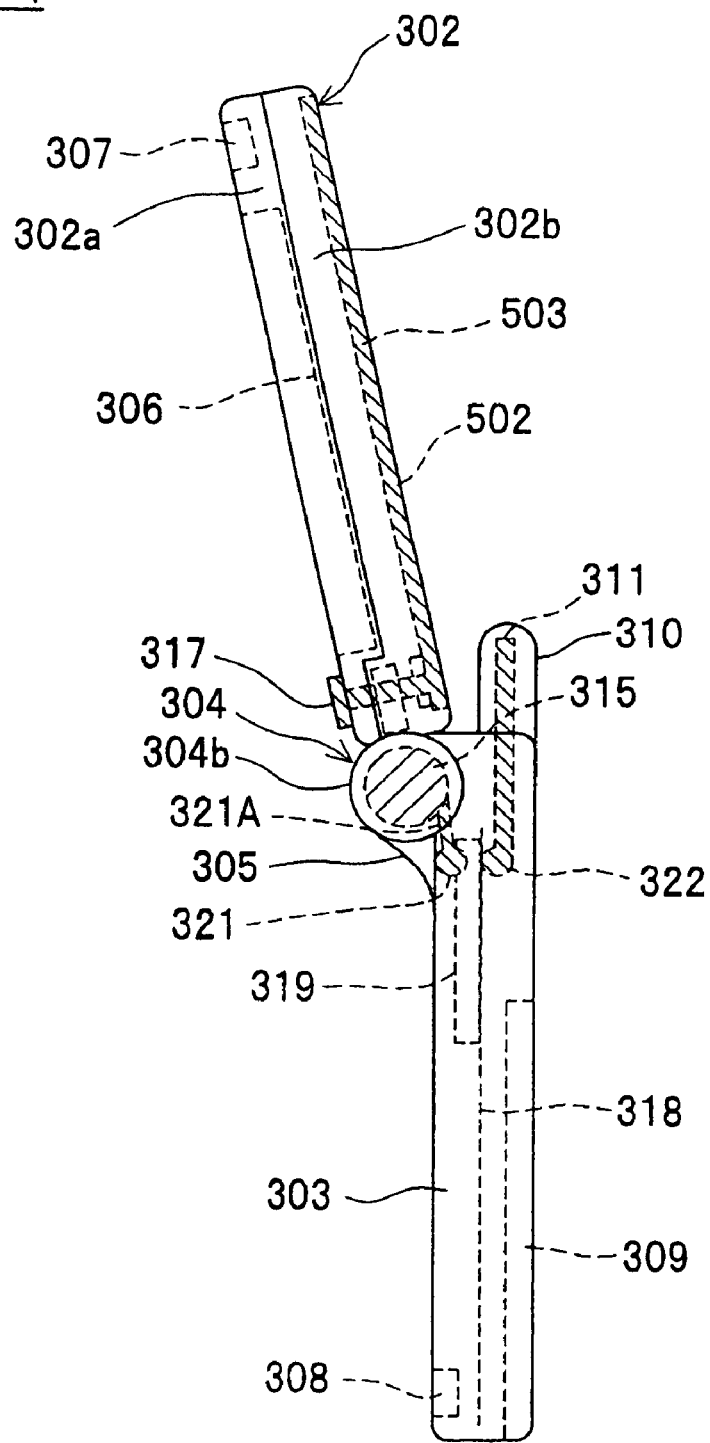
FIG. 12 is a side view of the foldable mobile radio communication apparatus 100-4 of FIG. 11.
Figure 13:
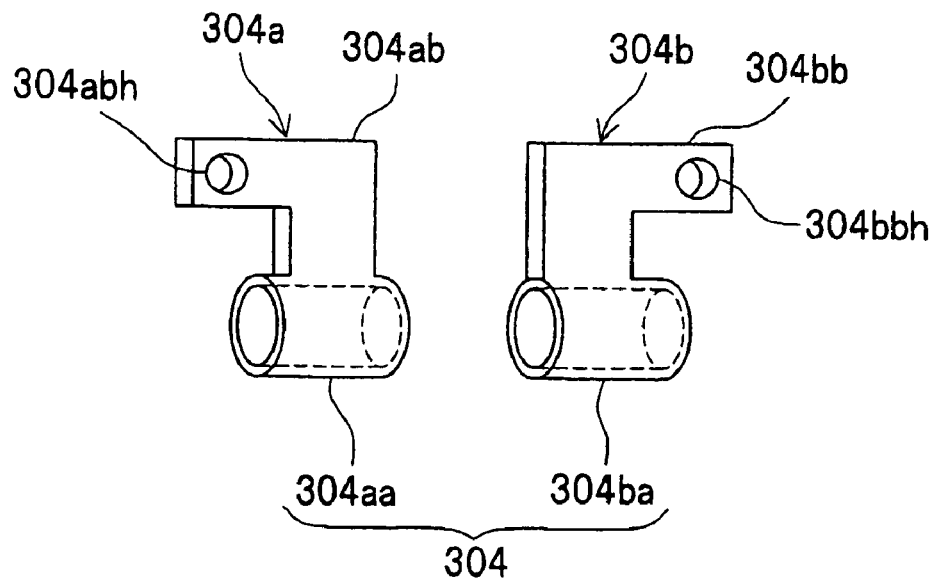
FIG. 13 is a perspective view showing a left hinge portion 304a and a right hinge portion 304b of a hinge portion 304 of FIGS. 11 and 12.
Figure 14:
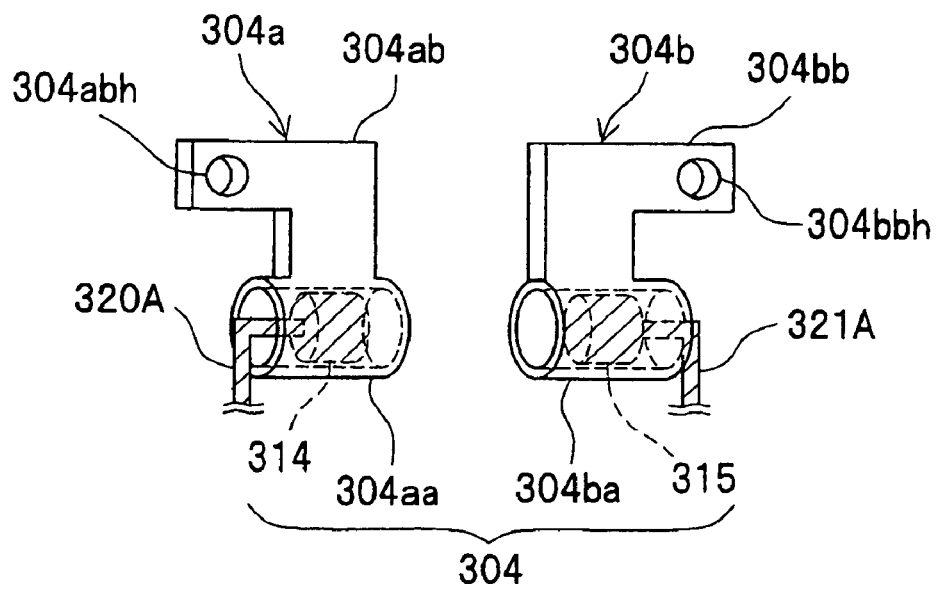
FIG. 14 is a perspective view of the hinge portion 304 in which cylindrical connecting members 314 and 315 are inserted into the left hinge portion 304a and the right hinge portion 304b of FIG. 13, respectively.

FIG. 11 is a plan view showing a foldable mobile radio communication apparatus 100-4 in an open state, equipped with an adaptive antenna apparatus according to a fourth preferred embodiment of the present invention, and FIG. 12 is a side view of the foldable mobile radio communication apparatus 100-4 of FIG. 11. FIG. 13 is a perspective view showing a left hinge portion 304a and a right hinge portion 304b of a hinge portion 304 of FIGS. 11 and 12, and FIG. 14 is a perspective view of the hinge portion 304 in which cylindrical connecting members 314 and 315 are inserted into the left hinge portion 304a and the right hinge portion 304b of FIG. 13, respectively.

Referring to FIGS. 11 and 12, the mobile radio communication apparatus 100-4 according to the present preferred embodiment includes antenna elements 502 and 503 each made of an inverted-L shaped strip conductor, in place of the antenna elements 312 and 313 each made of a linear strip conductor in the mobile radio communication apparatus 100-2 according to the second preferred embodiment. The antenna element 502 on a left side includes a vertical portion extending along a longitudinal direction of an upper housing 302 from a lower end to substantially a middle of the longitudinal direction; and a horizontal portion horizontally extending from an upper end of the vertical portion of the antenna element 502 towards a right side of the upper housing 302. A feeding point Q31 at the lower end of the antenna element 502 is electrically connected to a left hinge portion 304a via a screw 316, as with the antenna element 312 of FIG. 3. The antenna element 503 on the right side includes a vertical portion extending along the longitudinal direction of the upper housing 302 and closely to a right end of the upper housing 302, as with the antenna element 313 of FIG. 3; and a horizontal portion horizontally extending from an upper end of the vertical portion of the antenna element 503 toward a left side of the upper housing 302. A feeding point Q32 at a lower end of the antenna element 503 is electrically connected to a right hinge portion 304b via a screw 317, as with the antenna element 313 of FIG. 3. The antenna elements 502 and 503 are provided so as to contact a side facing the outer side of the upper housing 302, as with the antenna elements 312 and 313 of FIG. 3. A feeding point Q33 at an end of an antenna element 311 is connected to a terminal 322 of a radio communication circuit 319 via a feeder line 322A, in a manner similar to that of the second preferred embodiment.

Thus, the mobile radio communication apparatus 100-4 of the present preferred embodiment is provided with the antenna elements 502, 503 and 311, and accordingly, as with the mobile radio communication apparatus 100-1 according to the first preferred embodiment, three sets of partial array antennas are constituted each including any two of the antenna elements 502, 503 and 311, and the partial array antennas are disposed such that straight lines A31, A32 and A33 each passing through feeding points of the antenna elements included in each one of the three sets of partial array antennas have different directions from one another. Thus, in the present preferred embodiment, the plurality of sets of partial array antennas are configured so as to be disposed in different directions, and accordingly, even if an interference wave with a certain angle of arrival cannot be sufficiently suppressed by one partial array antenna, the present preferred embodiment can suppress the interference wave by using another partial array antenna, and thus, can perform adaptive control for receiving an incoming wave in an arbitrary direction and suppressing interference wave(s).

Fifth Preferred Embodiment

Figure 15:
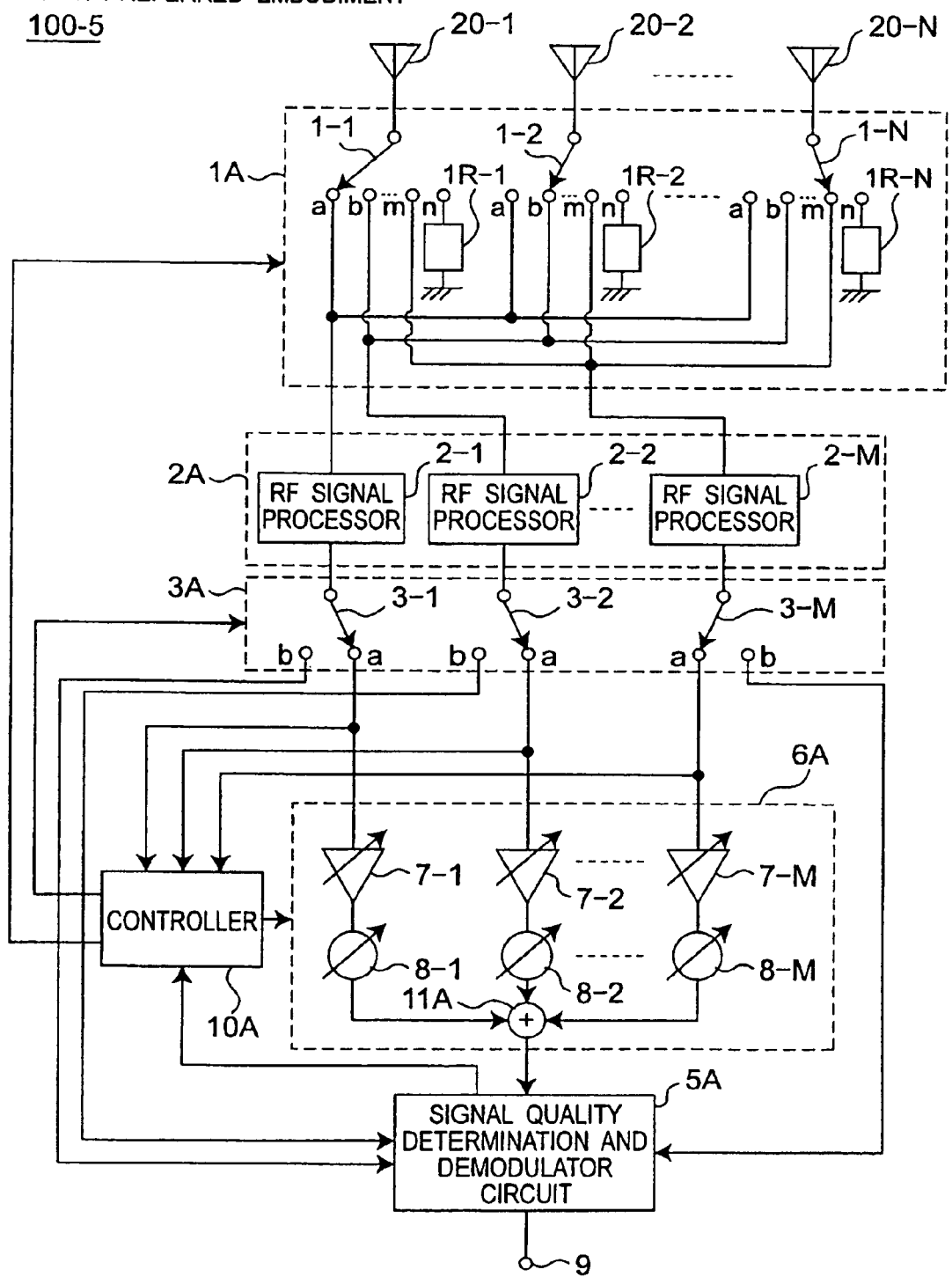
FIG. 15 is a block diagram showing a configuration of a radio communication circuit of a mobile radio communication apparatus 100-5 according to a fifth preferred embodiment of the present invention.

FIG. 15 is a block diagram showing a configuration of a radio communication circuit of a mobile radio communication apparatus 100-5 according to a fifth preferred embodiment of the present invention. The configuration of the preferred embodiments of the present invention are not limited to the one including three antenna elements 20a, 20b and 20c and two receiving circuit portions, such as that of the mobile radio communication apparatus 100-1 of FIG. 1. An adaptive antenna apparatus according to a preferred embodiment of the present invention can be configured which includes a plurality of number M of receiving circuit portions and a plurality of number N of antenna elements 20-1, 20-2, ..., 20-N, where N is greater than M. In this case, the number N of antenna elements 20-1, 20-2, ..., 20-N constitute a plurality of sets of partial array antennas, each including a number M of antenna elements among the number N of antenna elements, and the partial array antennas are disposed such that a straight line passing through feeding points of two antenna elements included in any one of the partial array antennas has a different direction from a further straight line passing through feeding points of two antenna elements included in any one of the other array antennas. Each array antenna is constituted, for example, as a linear array antenna; and in this case, the partial array antennas may be disposed such that straight lines each passing through feeding points of the antenna elements included in each one of the plurality of sets of linear array antennas intersect with each other. Each partial array antenna is not limited to that in which the number M of antenna elements are linearly arranged, and the partial array antennas may be disposed such that the number M of antenna elements have a certain directivity as a whole, and the respective partial array antennas have different directivities from one another. Some sets of the partial array antennas may include an antenna element in common, or alternatively, the partial array antennas may be constituted so as not to include any shared antenna element.

The radio communication circuit of FIG. 15 mainly includes an antenna switching circuit 1A, an RF signal processing circuit 2A, an adaptive control switching circuit 3A, an adaptive control circuit 6A, a signal quality determination and demodulator circuit 5A, and a controller 10A. These components are configured as follows.

The antenna switching circuit 1A includes switches 1-1, 1-2, ..., 1-N connected to the antenna elements 20-1, 20-2, ..., 20-N, respectively, and selectively outputs, as output signals, radio frequency signals received by a number M of antenna elements among the antenna elements 20-1, 20-2, ..., 20-N to circuits in the subsequent stage, as will be described in detail later.

The RF signal processing circuit 2A includes a number M of RF signal processors 2-1, 2-2, ..., 2-M. The number M of output signals from the antenna switching circuit 1A are inputted into the RF signal processing circuit 2A, and the RF signal processing circuit 2A then performs a necessary radio frequency processing on these signals, such as amplification, frequency conversion, and/or analog-to-digital (A/D) conversion of the signals, and outputs the processed signals to circuits in the subsequent stage, as output signals.

The adaptive control switching circuit 3A inputs the number M of output signals of the RF signal processing circuit 2A into the adaptive control circuit 6A or to the signal quality determination and demodulator circuit 5A, according to control of the controller 10A.

The adaptive control circuit 6A includes variable gain amplifiers 7-1 to 7-M, phase shifters 8-1 to 8-M, and a combiner 11A. The variable gain amplifier 7-1 and the phase shifter 8-1 control the amplitude and phase of an output signal from the RF signal processor 2-1, the variable gain amplifier 7-2 and the phase shifter 8-2 control the amplitude and phase of an output signal from the RF signal processor 2-2, the residual amplifiers and phase shifters perform the corresponding processes in the same way, and the variable gain amplifier 7-M and the phase shifter 8-M control the amplitude and phase of an output signal from the RF signal processor 2-M, and the signals, the amplitude and phase of which have been controlled, are combined by the combiner 11A. Thus, the adaptive control circuit 6A performs an adaptive control of the number M of output signals from the RF signal processing circuit 2A, by adjusting the amplitudes and phases of these signals and combining the adjusted signals with each other, so as to form a radiation pattern with a beam in a direction of a desired wave and nulls in the directions of interference waves, and then outputs the combined signal to circuits in the subsequent stage, as an output signal.

The output signal from the adaptive control circuit 6A, or one output signal which is directly sent from the RF signal processing circuit 2A through the adaptive control switching circuit 3A is inputted into the signal quality determination and demodulator circuit 5A. The signal quality determination and demodulator circuit 5 then determines a signal quality of the input signal, such as a desired wave power to noise ratio, as well as demodulates the input signal and then outputs the demodulated signal from an output terminal 9.

The controller 10A controls the adaptive control circuit 6A based on the number M of output signals from the RF signal processing circuit 2A, and controls the antenna switching circuit 1A based on the number M of output signals from the RF signal processing circuit 2A and the determination result obtained by the signal quality determination and demodulator circuit 5A. The controller 10A further controls the adaptive control switching circuit 3A for the number M of output signals from the RF signal processing circuit 2A to be outputted to the adaptive control circuit 6A, or to be directly outputted to the signal quality determination and demodulator circuit 5A without passing through the adaptive control circuit 6A.

Here, the components 1A, 2A, 3A, 5A, 6A, 10A and 11A of FIG. 15 correspond to the components 1, 2, 3, 5, 6, 10 and 11 of FIG. 2, respectively.

In the mobile radio communication apparatus 100-5 of the present preferred embodiment, a number M of receiving circuit portions are constituted of a set of parts including the RF signal processor 2-1, the variable gain amplifier 7-1, and the phase shifter 8-1, a set of parts including the RF signal processor 2-2, the variable gain amplifier 7-2, and the phase shifter 8-2, etc., and a set of parts including the RF signal processor 2-M, the variable gain amplifier 7-M, and the phase shifter 8-M. The controller 10A is characterized in controlling the adaptive control circuit 6A to adaptively change the amplitudes and phases of received signals, so as to form a radiation pattern with a beam in a direction of a desired wave and nulls in directions of interference waves, and also characterized in controlling the antenna switching circuit 1A to adaptively connect antenna elements included in any one of partial array antennas, each including a number M of antenna elements among the number N of antenna elements 20-1, 20-2, ..., 20-N, to their corresponding receiving circuit portions in the subsequent stage, so as to improve the signal quality of received signals to be obtained when the adaptive control circuit 6A is adaptively controlled.

Referring to FIG. 15, in the antenna switching circuit 1A of the present preferred embodiment, the switch 1-1 connects the antenna element 20-1 to any one of the RF signal processors 2-1, 2-2, ..., 2-M and a load impedance element 1R-1. The switch 1-2 connects the antenna element 20-2 to any one of the RF signal processors 2-1, 2-2, ..., 2-M and a load impedance element 1R-2, the residual switches perform the corresponding switching in the same way, and the switch 1-N connects the antenna element 20-N to any one of the RF signal processors 2-1, 2-2, ..., 2-M and a load impedance element 1R-N. As will be described later, the switches 1-1, 1-2, ..., 1-M are interlocked with one another under control of the controller 10A, and operate to connect only the number M of antenna elements among the antenna elements 20-1, 20-2, ..., 20-N to the RF signal processors 2-1, 2-2, ..., 2-M and connect the residual antenna elements to the corresponding load impedance elements. Then, the RF signal processors 2-1, 2-2, ..., 2-M perform a necessary radio frequency processing on radio frequency signals inputted from the antenna switching circuit 1A, and outputs the processed signals to the adaptive control switching circuit 3A. The adaptive control switching circuit 3A includes switches 3-1, 3-2, ..., 3-M controlled by the controller 10A. The switch 3-1 changes between outputting an output signal of the RF signal processor 2-1 to the variable gain amplifier 7-1 (contact "a" side), and outputting the output signal directly to the signal quality determination and demodulator circuit 5A (contact "b" side). The switch 3-2 changes between outputting an output signal of the RF signal processor 2-2 to the variable gain amplifier 7-2 (contact "a" side), and outputting the output signal directly to the signal quality determination and demodulator circuit 5A (contact "b" side), and the residual switches perform the corresponding switching in the same way, and the switch 3-M changes between outputting an output signal of the RF signal processor 2-M to the variable gain amplifier 7-M (contact "a" side), and outputting the output signal directly to the signal quality determination and demodulator circuit 5A (contact "b" side). When the adaptive control circuit 6A controls the amplitudes and phases of received signals, the respective switches 3-1, 3-2, ..., 3-M are switched to the contact "a" side by the controller 10A, and output signals from the RF signal processors 2-1, 2-2, ..., 2-M are inputted into the variable gain amplifiers 7-1, 7-2, ..., 7-M, respectively, and are also inputted into the controller 10A. The variable gain amplifier 7-1 changes the amplitude of a signal inputted thereto, and then the phase shifter 8-1 changes the phase of the signal that has been adjusted in amplitude. The variable gain amplifier 7-2 changes the amplitude of a signal inputted thereto, and then the phase shifter 8-2 changes the phase of the signal that has been adjusted in amplitude, and the residual variable gain amplifiers and phase shifters perform the corresponding processes in the same way, and then, the variable gain amplifier 7-M changes the amplitude of a signal inputted thereto, and then the phase shifter 8-M changes the phase of the signal that has been adjusted in amplitude. The combiner 11A combines the signals that have been adjusted in amplitude and phase, and outputs the combined signal to the signal quality determination and demodulator circuit 5A. The signal quality determination and demodulator circuit 5A determines a signal quality, such as CNR, of a signal inputted from the adaptive control circuit 6A or a signal directly inputted from the RF signal processing circuit 2A through the adaptive control switching circuit 3A, and then outputs the determination result to the controller 10A, as well as demodulates the input signal using a demodulation scheme corresponding to a modulation scheme used in a transmitting side, and outputs the demodulated signal from the output terminal 9. Further, when the switches 3-1, 3-2, ..., 3-M are connected to the contact "a" side, the controller 10A detects signal strengths of received signals inputted from the RF signal processors 2-1, 2-2, ..., 2-M.

As described above, according to the mobile radio communication apparatus 100-5 according to the present preferred embodiment, the antenna switching circuit 1A connects antenna elements included in any one of a plurality of sets of partial array antennas, to a number M of receiving circuit portions, respectively, each receiving circuit portion adjusts the amplitude and phase of a radio frequency signal received by an antenna element connected to the receiving circuit portion itself and then outputs the adjusted received signal, and the signal quality determination and demodulator circuit 5A determines, based on the received signals outputted from the respective receiving circuit portions, a signal quality of the received signals. The controller 10A is characterized in adaptively controlling the respective receiving circuit portions so as to form a radiation pattern with a beam in a direction of a desired wave and nulls in the directions of interference waves, based on radio frequency signals received by antenna elements connected to their corresponding receiving circuit portions, by adjusting the amplitude and phase of each radio frequency signal, and also characterized in controlling the antenna switching circuit 1A to adaptively switch the plurality of sets of partial array antennas, so as to improve the signal quality of received signals to be obtained when the receiving circuit portions are adaptively controlled. Thus, in the present preferred embodiment, the plurality of sets of partial array antennas are configured so as to be disposed in different directions, and accordingly, even if an interference wave with a certain angle of arrival cannot be sufficiently suppressed by one partial array antenna, the present preferred embodiment can suppress the interference wave by using another partial array antenna, and thus, can perform adaptive control for receiving an incoming wave in an arbitrary direction and suppressing interference wave(s).

Sixth Preferred Embodiment

Figure 16:
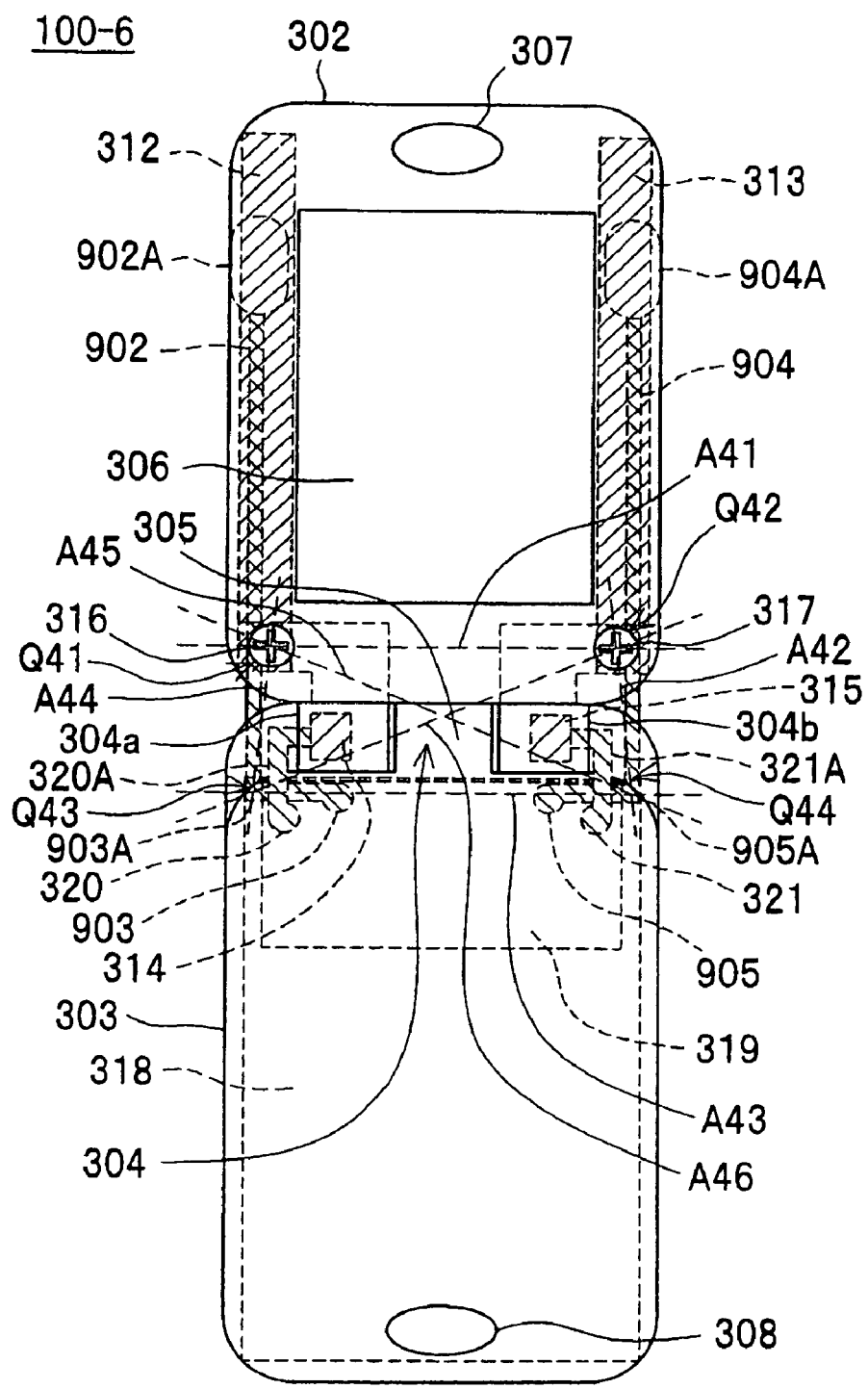
FIG. 16 is a plan view showing a foldable mobile radio communication apparatus 100-6 in an open state, equipped with an adaptive antenna apparatus according to a sixth preferred embodiment of the present invention.
Figure 17:
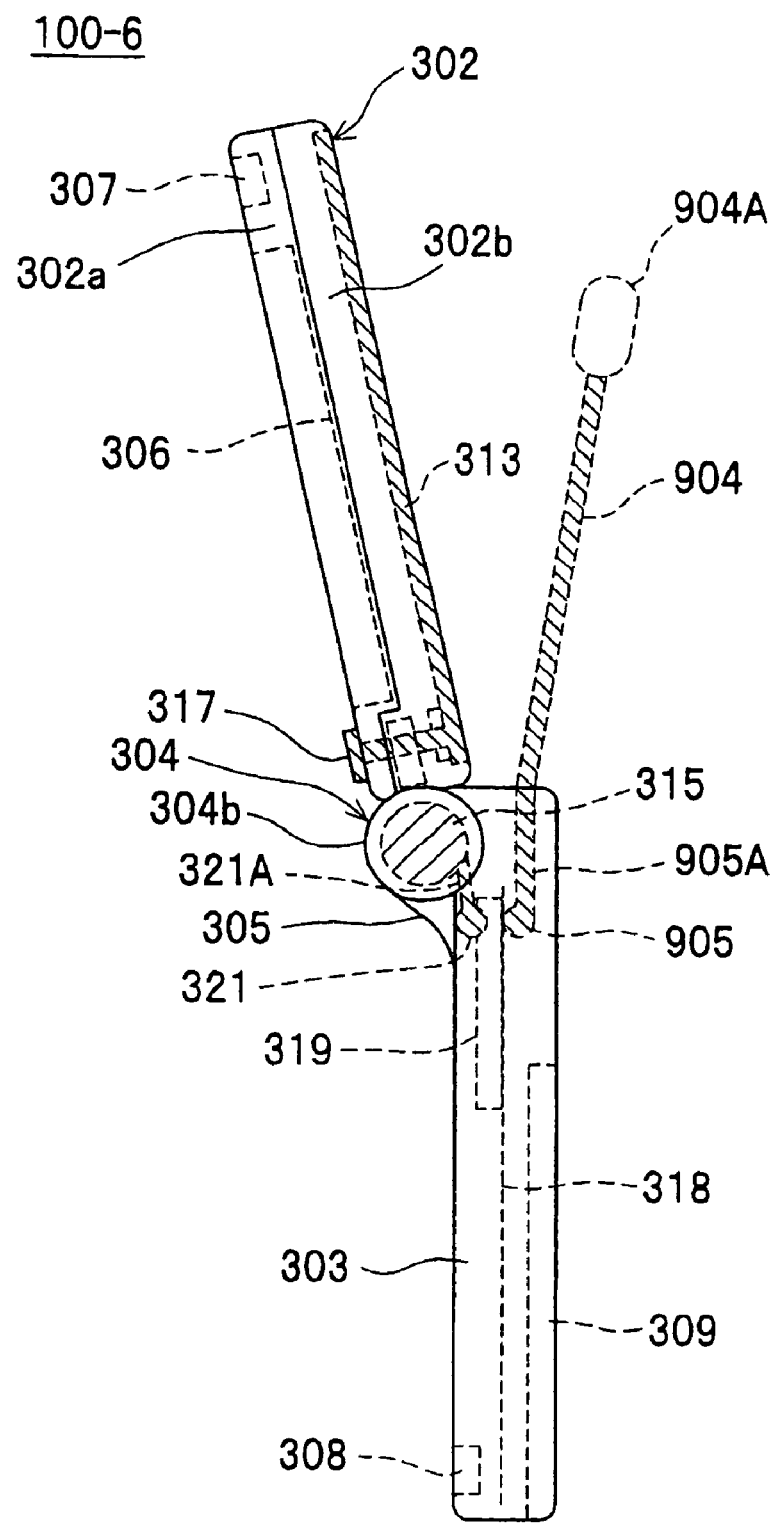
FIG. 17 is a side view of the foldable mobile radio communication apparatus 100-6 of FIG. 16.
Figure 18:
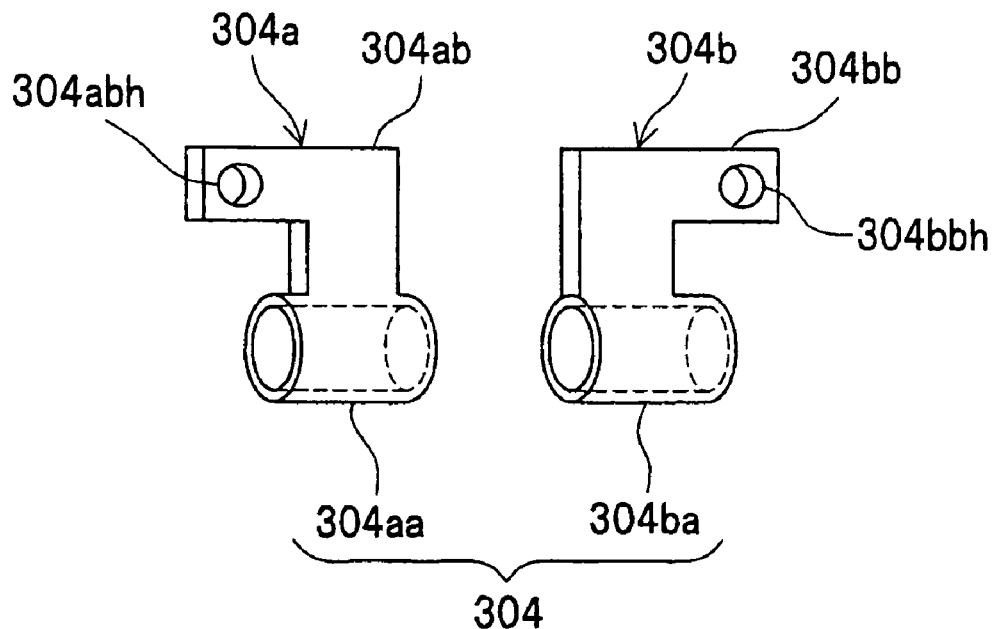
FIG. 18 is a perspective view showing a left hinge portion 304a and a right hinge portion 304b of a hinge portion 304 of FIGS. 16 and 17.
Figure 19:
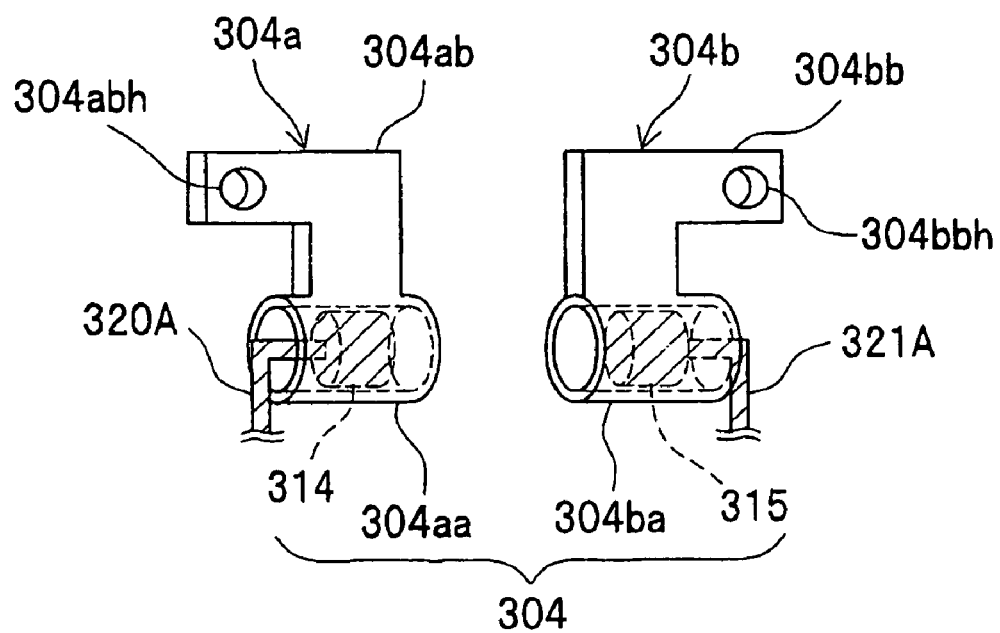
FIG. 19 is a perspective view of the hinge portion 304 in which cylindrical connecting members 314 and 315 are inserted into the left hinge portion 304a and the right hinge portion 304b of FIG. 18, respectively.

FIG. 16 is a plan view showing a foldable mobile radio communication apparatus 100-6 in an open state, equipped with an adaptive antenna apparatus according to a sixth preferred embodiment of the present invention, and FIG. 17 is a side view of the foldable mobile radio communication apparatus 100-6 of FIG. 16. FIG. 18 is a perspective view showing a left hinge portion 304a and a right hinge portion 304b of a hinge portion 304 of FIGS. 16 and 17, and FIG. 19 is a perspective view of the hinge portion 304 in which cylindrical connecting members 314 and 315 are inserted into the left hinge portion 304a and the right hinge portion 304b of FIG. 18, respectively. The present preferred embodiment is an example of the mobile radio communication apparatus 100-5 according to the fifth preferred embodiment shown in FIG.

15, and corresponds to a configuration including two receiving circuit portions (not shown) and four antenna elements.

Referring to FIGS. 16 and 17, the mobile radio communication apparatus 100-6 according to the present preferred embodiment includes two antenna elements 902 and 904 projecting from the mobile radio communication apparatus 100-6, in place of the boom portion 310, the antenna element 311 in the boom portion 310, the feeder line 322A, and the terminal 322 of the radio communication circuit 319 of the mobile radio communication apparatus 100-2 according to the second preferred embodiment. In a manner similar to that of the second preferred embodiment, antenna elements 312 and 313 have feeding points Q41 and Q42 at their respective lower ends. The antenna element 902 is made of a cylindrical conductor, and provided so as to project from an upper left end of a lower housing 303 and substantially in parallel to a longitudinal direction (up-down direction) of the lower housing 303. An antenna cover 902A is provided at a tip (upper end) of the antenna element 902, and a feeding point Q43 at a lower end of the antenna element 902 is connected to a terminal 903 of a radio communication circuit 319 via a feeder line 903A, and thus, the antenna element 902 is electrically connected to the radio communication circuit 319. Similarly, the antenna element 904 is also made of a cylindrical conductor, and provided so as to project from an upper right end of the lower housing 303 and substantially in parallel to the longitudinal direction of the lower housing 303. An antenna cover 904A is provided at a tip of the antenna element 904, and a feeding point Q44 at a lower end of the antenna element 904 is connected to a terminal 905 of the radio communication circuit 319 via a feeder line 905A, and thus, the antenna element 904 is electrically connected to the radio communication circuit 319. The antenna elements 902 and 904 may be provided to be drawn into the lower housing 302. In the preferred embodiment shown in FIG. 16, the antenna elements 312 and 313 built in an upper housing 302 are lying in the same plane with each other, and the antenna elements 902 and 904 projecting outward the lower housing 303 are lying in the same plane with each other.

The mobile radio communication apparatus 100-6 of the present preferred embodiment is provided with the antenna elements 312, 313, 902 and 904, and accordingly, six sets of partial array antennas are constituted each including any two of the antenna elements 312, 313, 902 and 904, and the partial array antennas are disposed such that straight lines A41, A42, A43, A44, A45 and A46 each passing through feeding points of the antenna elements included in each one of the six sets of partial array antennas have different directions from one another. The mobile radio communication apparatus 100-6 performs control such that antenna elements included in any one of the partial array antennas are adaptively connected to preferably two receiving circuit portions (not shown) provided in the radio communication circuit 319, and accordingly, can form a beam for an incoming wave with an arbitrary azimuth angle and nulls for interference waves with arbitrary azimuth angles. The radio communication circuit 319 is characterized in performing adaptive control so as to form a radiation pattern with a beam in a direction of a desired wave and nulls in directions of interference waves, based on radio frequency signals received by antenna elements connected to their corresponding receiving circuit portions, by adjusting at least one of the amplitude and phase of each radio frequency signal, and also characterized in adaptively switching the plurality of sets of partial array antennas so as to improve the signal quality of received signals to be obtained when the receiving circuit portions are adaptively controlled.

Although in the above description, the mobile radio communication apparatus 100-6 according to the present preferred embodiment includes four antenna elements 312, 313, 902 and 904 and two receiving circuit portions, a mobile radio communication apparatus may be configured to include more than four antenna elements, and/or more than two receiving circuit portions. For example, if a mobile radio communication apparatus includes four antenna elements 312, 313, 902 and 904 and three receiving circuit portions, a plurality of sets of partial array antennas, each including three of the four antenna elements 312, 313, 902 and 904, are constituted. In this case, a straight line passing through feeding points of two antenna elements included in an any one of the partial array antennas has a different direction from a further straight line passing through feeding points of two antenna elements included in any one of the other partial array antennas, and accordingly, three antenna elements included in each array antenna have a certain directivity as a whole, and the respective partial array antennas have different directivities from one another.

Thus, in the present preferred embodiment, the plurality of sets of partial array antennas are configured so as to be disposed in different directions, and accordingly, even if an interference wave with a certain angle of arrival cannot be sufficiently suppressed by one partial array antenna, the present preferred embodiment can suppress the interference wave by using another partial array antenna, and thus, can perform adaptive control for receiving an incoming wave in an arbitrary direction and suppressing interference wave(s).

Seventh Preferred Embodiment

Figure 20:
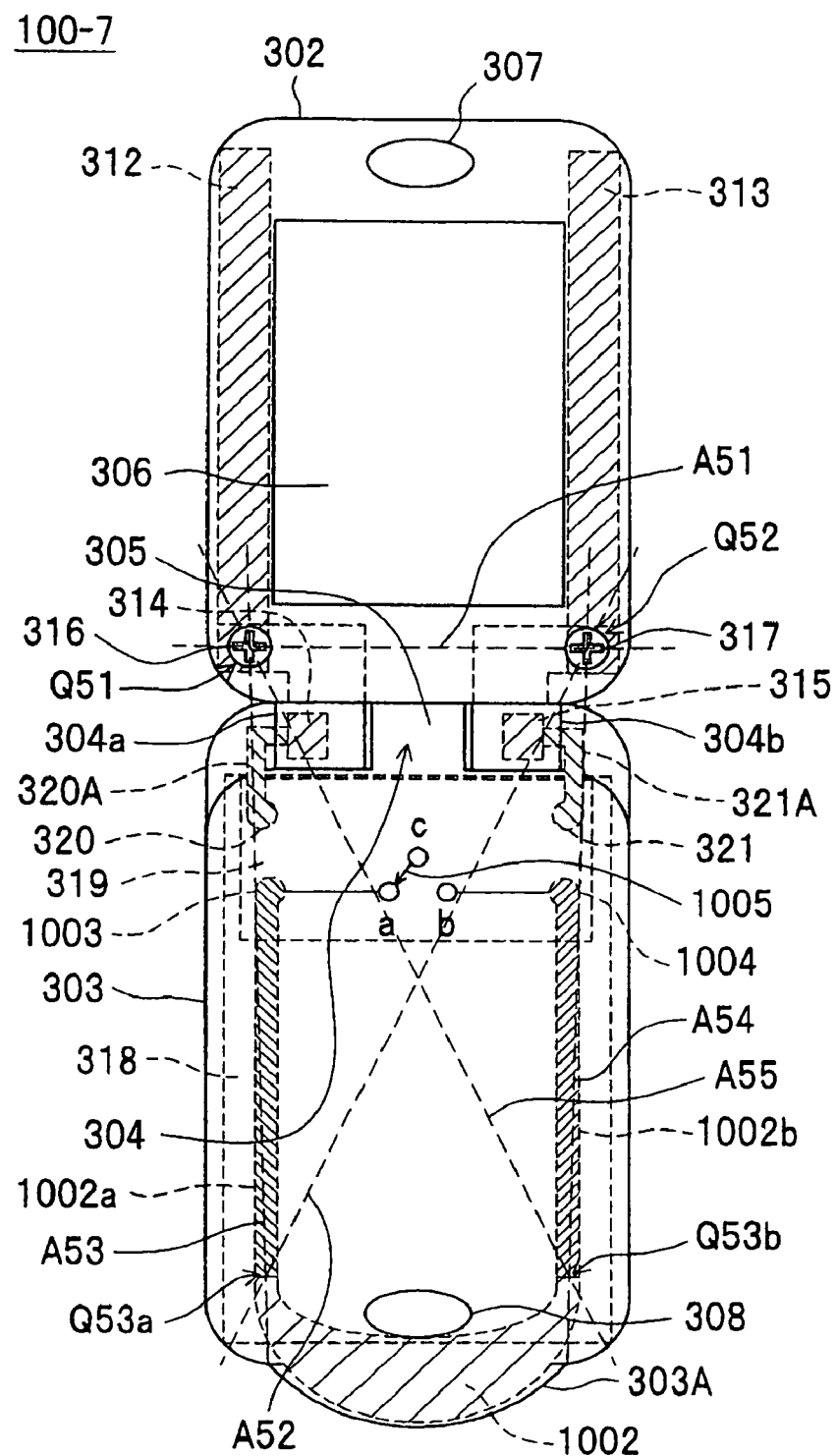
FIG. 20 is a plan view showing a foldable mobile radio communication apparatus 100-7 in an open state, equipped with an adaptive antenna apparatus according to a seventh preferred embodiment of the present invention.
Figure 21:
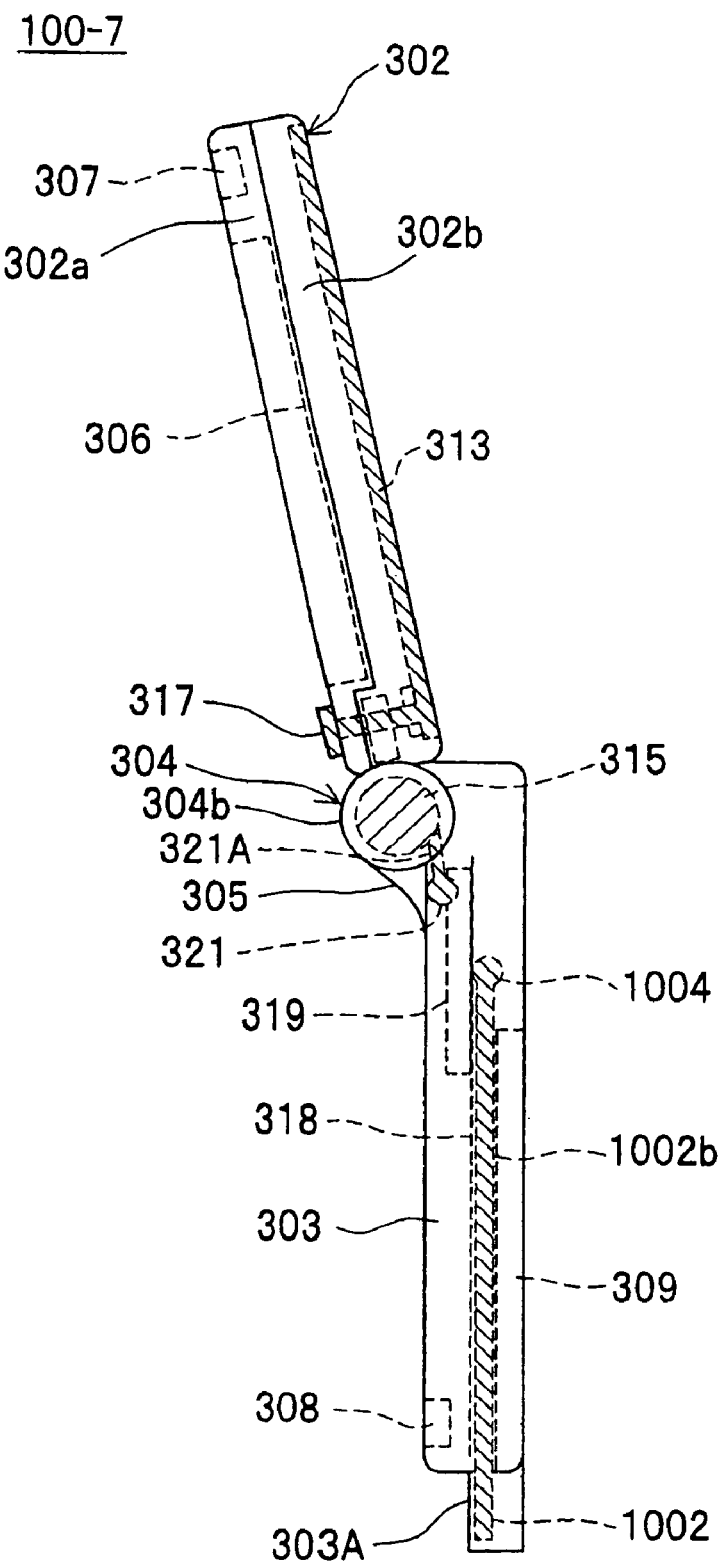
FIG. 21 is a side view of the foldable mobile radio communication apparatus 100-7 of FIG. 20.
Figure 22:
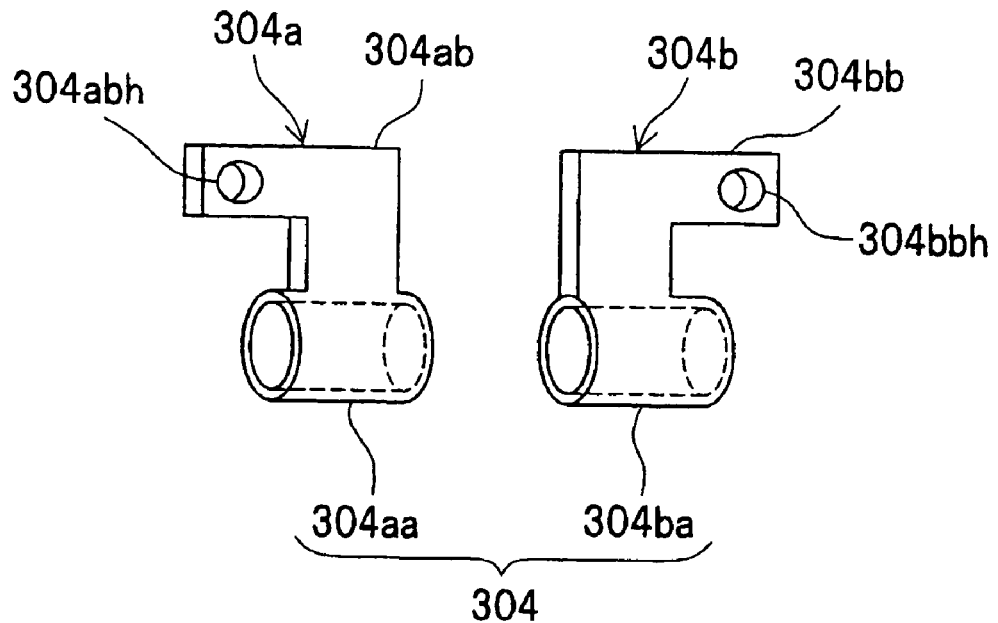
FIG. 22 is a perspective view showing a left hinge portion 304a and a right hinge portion 304b of a hinge portion 304 of FIGS. 20 and 21.
Figure 23:
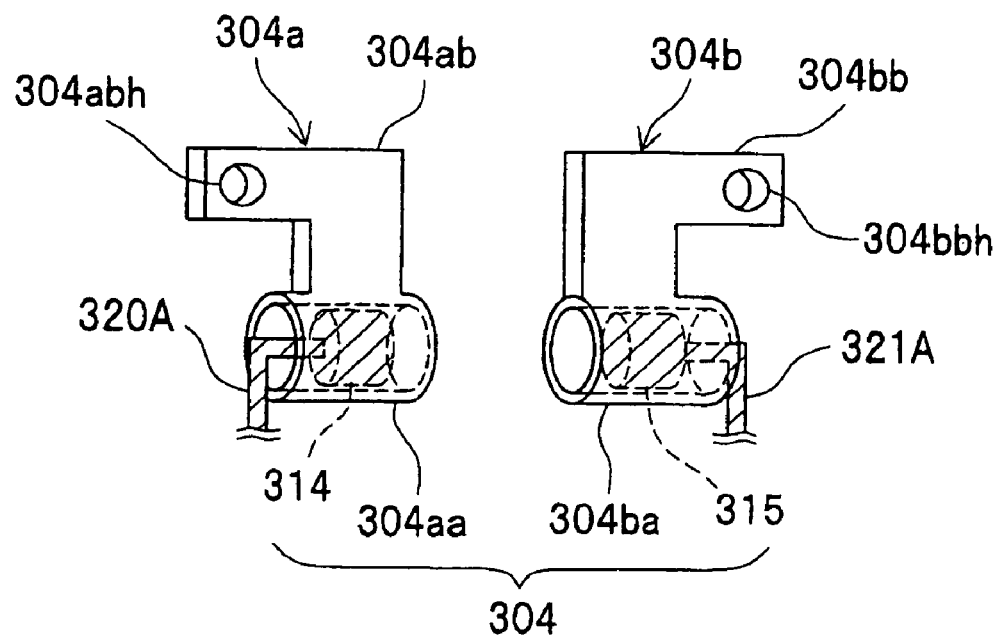
FIG. 23 is a perspective view of the hinge portion 304 in which cylindrical connecting members 314 and 315 are inserted into the left hinge portion 304a and the right hinge portion 304b of FIG. 22, respectively.

FIG. 20 is a plan view showing a foldable mobile radio communication apparatus 100-7 in an open state, equipped with an adaptive antenna apparatus according to a seventh preferred embodiment of the present invention, and FIG. 21 is a side view of the foldable mobile radio communication apparatus 100-7 of FIG. 20. FIG. 22 is a perspective view showing a left hinge portion 304a and a right hinge portion 304b of a hinge portion 304 of FIGS. 20 and 21, and FIG. 23 is a perspective view of the hinge portion 304 in which cylindrical connecting members 314 and 315 are inserted into the left hinge portion 304a and the right hinge portion 304b of FIG. 22, respectively.

Referring to FIGS. 20 and 21, the mobile radio communication apparatus 100-7 according to the present preferred embodiment includes an antenna element 1002 provided at a lower end of a lower housing 303 so as to extend in a width direction, in place of the boom portion 310, the antenna element 311 in the boom portion 310, the feeder line 322A, and the terminal 322 of the radio communication circuit 319 of the mobile radio communication apparatus 100-2 according to the second preferred embodiment. In a manner similar to that of the second preferred embodiment, antenna elements 312 and 313 have feeding points Q51 and Q52 at their respective lower ends. The antenna element 1002 is made of a strip conductor having a widened middle portion, and formed to have a substantially crescent shape or a substantially semicircular shape in the present preferred embodiment; however, the shape is not limited thereto. Two end portions of the antenna element 1002 are provided so as to be located at a lower left end and a lower right end of the lower housing 303. The lower housing 303 has an antenna containing portion 303A projecting downward to contain therein the antenna element 1002. The antenna element 1002 of the present preferred embodiment is characterized in having the two end portions act as feeding points Q53a and Q53b, respectively.

The feeding point Q53a at the left end of the antenna element 1002 is connected to a terminal 1003 of a radio communication circuit 319 via a feeder line 1002a, the feeding point Q53b at the right end of the antenna element 1002 is connected to a terminal 1004 of the radio communication circuit 319 via a feeder line 1002b, and the terminals 1003 and 1004 are connected to a switch 1005 in the radio communication circuit 319. The switch 1005 connects any one of the terminals 1003 and 1004 to an antenna switching circuit (not shown in FIG. 20; see FIG. 2) in the radio communication circuit 319, under control of a controller (not shown) in the radio communication circuit 319.

The mobile radio communication apparatus 100-7 of the present preferred embodiment is provided with the antenna elements 312, 313 and 1002, and accordingly, as with the mobile radio communication apparatus 100-1 according to the first preferred embodiment, a plurality of sets of partial array antennas are constituted each including any two of the antenna elements 312, 313 and 1002, and the partial array antennas are disposed such that straight lines each passing through feeding points of the antenna elements included in each one of the partial array antennas have different directions from one another. Furthermore, the antenna element 1002 of the mobile radio communication apparatus 100-7 of the present preferred embodiment has two feeding points Q53a and Q53b, and the switch 1005 operates to excite any one of the two feeding points Q53a and Q53b, and accordingly, the current distribution and thus the radiation characteristics of the antenna element 1002 changes. Accordingly, when the antenna element 1002 is excited via the feeding point Q53a, an array antenna including the antenna elements 312 and 1002 is constituted on a straight line A53 through their feeding points Q51 and Q53a, and an array antenna including the antenna elements 313 and 1002 is constituted on a straight line A52 through their feeding points Q52 and Q53a. On the other hand, when the antenna element 1002 is excited via the feeding point Q53b, an array antenna including the antenna elements 312 and 1002 is constituted on a straight line A55 through their feeding points Q51 and Q53b and an array antenna including the antenna elements 313 and 1002 is constituted on a straight line A54 through their feeding points Q52 and Q53b. The mobile radio communication apparatus 100-7 of the present preferred embodiment further includes an array antenna including the antenna elements 312 and 313 (the direction in which this array antenna is disposed is represented by a straight line A51). The mobile radio communication apparatus 100-7 of the present preferred embodiment performs control such that antenna elements included in any one of the plurality of sets of partial array antennas are adaptively connected to preferably two receiving circuit portions provided in the radio communication circuit 319, and accordingly, can form a beam for an incoming wave with an arbitrary azimuth angle and nulls for interference waves with arbitrary azimuth angles. According to the configuration of the present preferred embodiment, a certain performance can be achieved which is equivalent to that of the mobile radio communication apparatus 100-6 according to the sixth preferred embodiment.

Thus, in the present preferred embodiment, the plurality of sets of partial array antennas are configured so as to be disposed in different directions, and accordingly, even if an interference wave with a certain angle of arrival cannot be sufficiently suppressed by one partial array antenna, the present preferred embodiment can suppress the interference wave by using another partial array antenna, and thus, can perform adaptive control for receiving an incoming wave in an arbitrary direction and suppressing interference wave(s).

Eighth Preferred Embodiment

Figure 24:
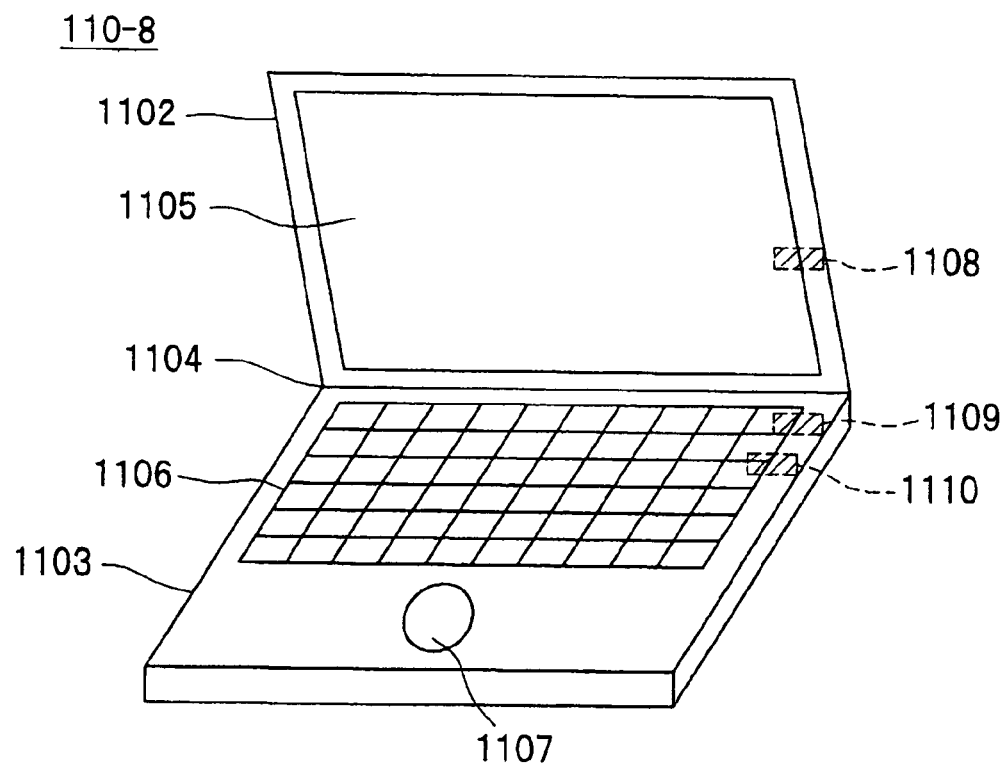
FIG. 24 is a perspective view showing an appearance of a laptop computer 110-8 in an open state, equipped with an adaptive antenna apparatus according to an eighth preferred embodiment of the present invention.
Figure 25:
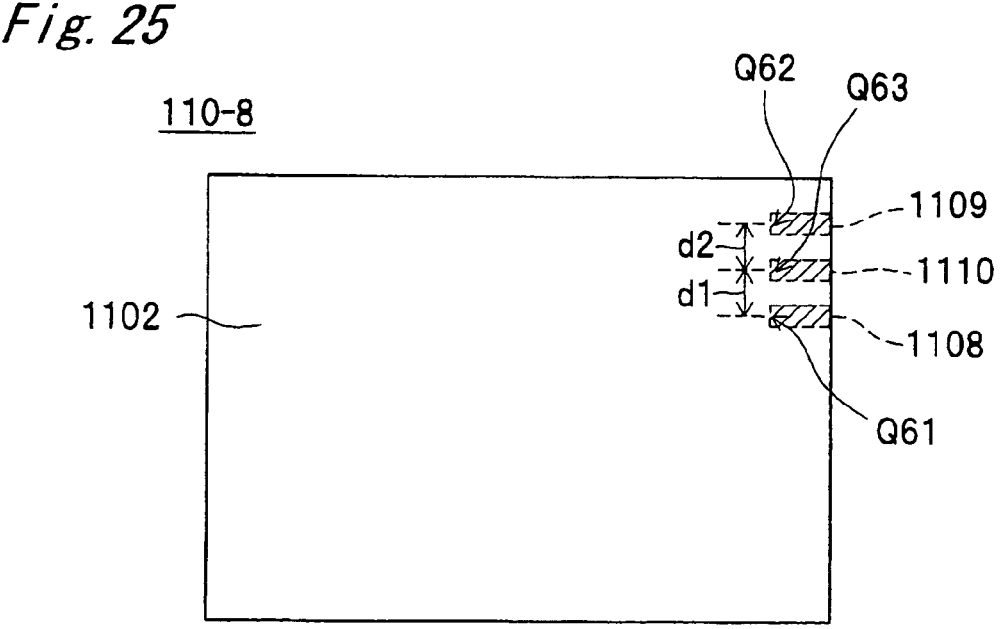
FIG. 25 is a top view of the laptop computer 110-8 of FIG. 24 in a close state.
Figure 26:
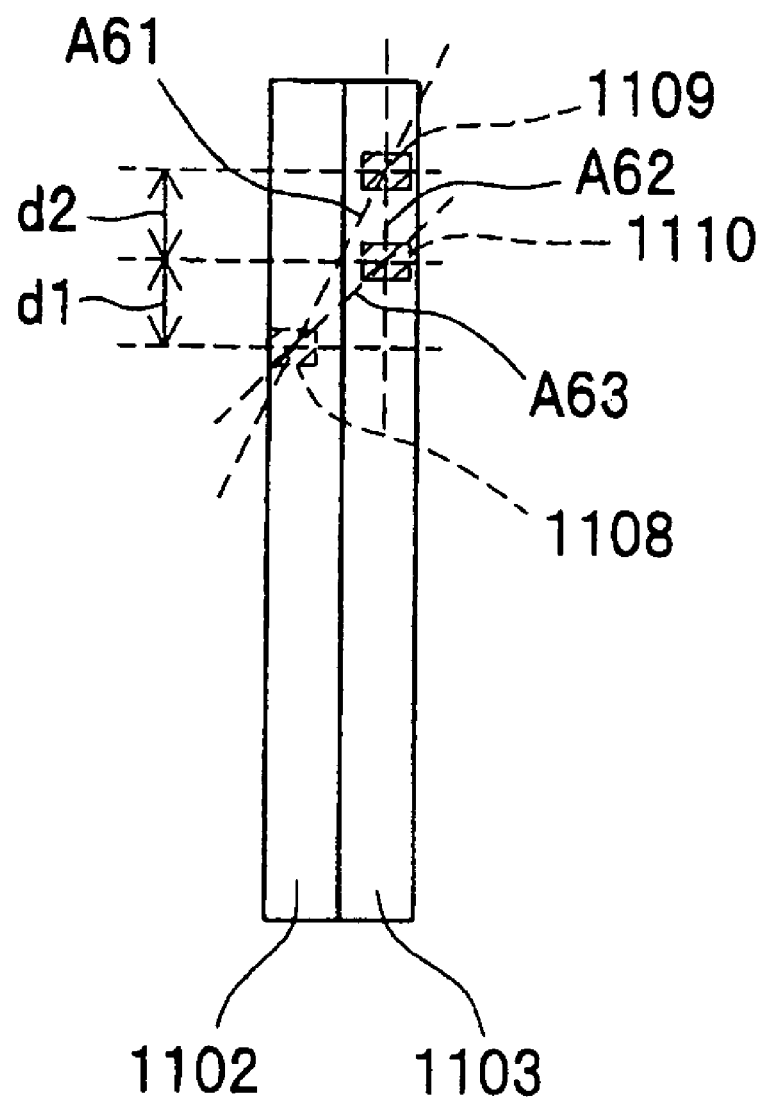
FIG. 26 is a side view of the laptop computer 110-8 of FIG. 24 in a close state.

FIG. 24 is a perspective view showing an appearance of a laptop computer 110-8 in an open state, equipped with an adaptive antenna apparatus according to an eighth preferred embodiment of the present invention and radio communication functionality. FIGS. 25 and 26 respectively show a top view and a side view of the laptop computer 110-8 of FIG. 24 in a close state. The laptop computer 110-8 of the present preferred embodiment is characterized in having the radio communication circuit of FIG. 2 built therein (not shown), and including antenna elements 1108, 1109 and 1110 corresponding to the antenna elements 20a, 20b and 20c of FIG. 2, respectively.

Referring to FIG. 24, the laptop computer 110-8 includes an upper housing 1102 and a lower housing 1103 connected to each other by a hinge portion 1104. The upper housing 1102 includes a display 1105 and the antenna element 1108. The lower housing 1103 includes a keyboard 1106, a pointing device 1107, and the antenna elements 1109 and 1110.

As shown in FIG. 25, the antenna elements 1108, 1109 and 1110 are provided so as to be juxtaposed at right ends of the upper housing 1102 and the lower housing 1103, in such an order of the antenna elements 1109, 1110 and 1108, in ascending order of distance from the hinge portion 1104 when the laptop computer 110-8 is in a closed state. The antenna elements 1108, 1109 and 1110 have feeding points Q61, Q62 and Q63, respectively, at certain locations in the antenna elements. Further, as shown in FIG. 26, when the laptop computer 110-8 is in a closed state, the antenna elements 1108 and 1110 are positioned to be spaced apart with a distance d1 in a horizontal direction, and the antenna elements 1109 and 1110 are positioned to be spaced apart with a distance d2 in the horizontal direction. When the wavelength of a radio signal to be transmitted and received is $\lambda$, the distances d1 and d2 are set to a value preferably from $0.2\lambda$ to $0.5\lambda$.

The laptop computer 110-8 of the present preferred embodiment is provided with the antenna elements 1108, 1109 and 1110, and accordingly, as with the mobile radio communication apparatus 100-1 according to the first preferred embodiment, a partial array antenna including the antenna elements 1108 and 1109, a partial array antenna including the antenna elements 1108 and 1110, and a partial array antenna including the antenna elements 1109 and 1110 are formed, and the partial array antennas are disposed such that straight lines each passing through feeding points of the antenna elements included in each one of the three set of partial array antennas, i.e., a straight line A61 through the feeding points Q61 and Q62 of the antenna elements 1108 and 1109, a straight line A62 through the feeding points Q62 and Q63 of the antenna elements 1109 and 1110, and a straight line A63 through the feeding points Q63 and Q61 of the antenna elements 1110 and 1108, have different directions from one another. The laptop computer 110-8 performs control such that antenna elements included in any one of the partial array antennas are adaptively connected to preferably two receiving circuit portions (not shown) provided in the radio communication circuit, and accordingly, can form a beam for an incoming wave with an arbitrary azimuth angle and nulls for interference waves with arbitrary azimuth angles. The radio communication circuit is characterized in performing adaptive control so as to form a radiation pattern with a beam in a direction of a desired wave and nulls in directions of interference waves, based on radio frequency signals received by antenna elements connected to their corresponding receiving circuit portions, by adjusting at least one of the amplitude and phase of each radio frequency signal, and also characterized in adaptively switching a plurality of sets of partial array antennas so as to improve the signal quality of received signals to be obtained when the receiving circuit portions are adaptively controlled. Thus, in the present preferred embodiment, the plurality of sets of partial array antennas are configured so as to be disposed in different directions, and accordingly, even if an interference wave with a certain angle of arrival cannot be sufficiently suppressed by one partial array antenna, the present preferred embodiment can suppress the interference wave by using another partial array antenna, and thus, can perform adaptive control for receiving an incoming wave in an arbitrary direction and suppressing interference wave(s).

Ninth Preferred Embodiment

Figure 27:
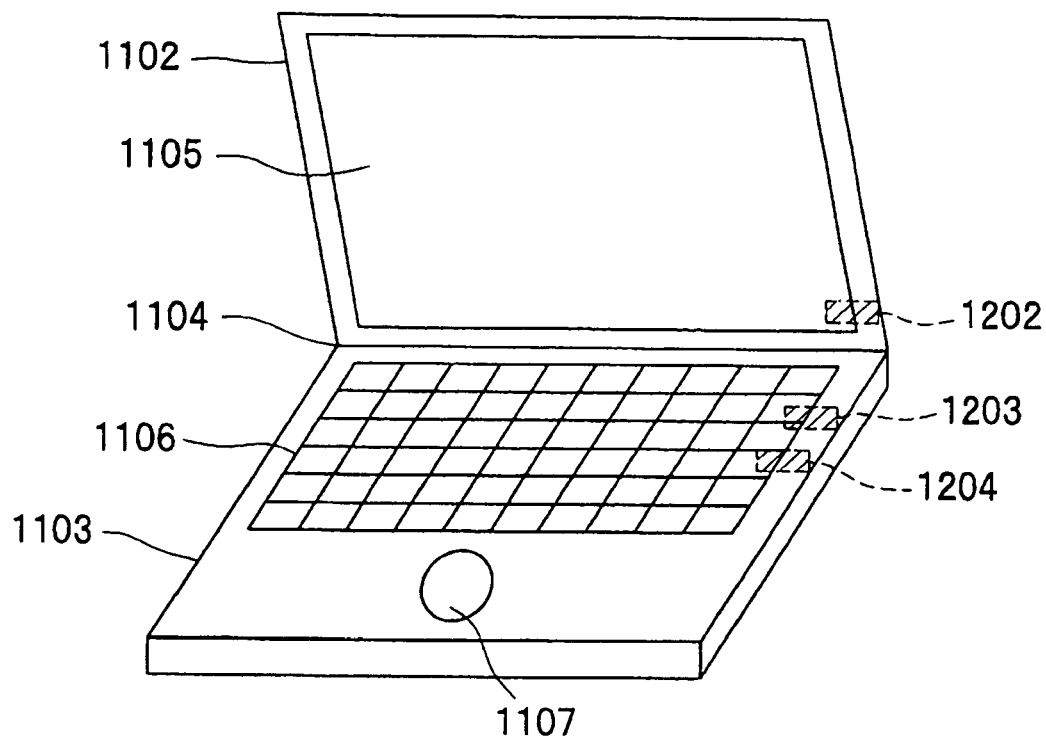
FIG. 27 is a perspective view showing an appearance of a laptop computer 110-9 in an open state, equipped with an adaptive antenna apparatus according to a ninth preferred embodiment of the present invention.
Figure 28:
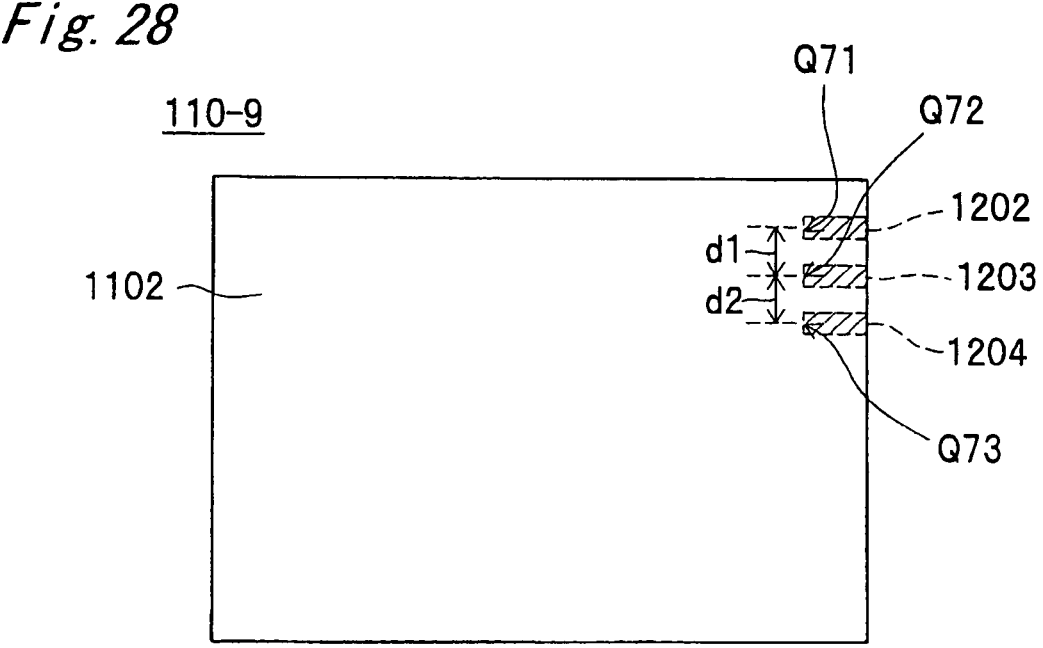
FIG. 28 is a top view of the laptop computer 110-9 of FIG. 27 in a close state.
Figure 29:
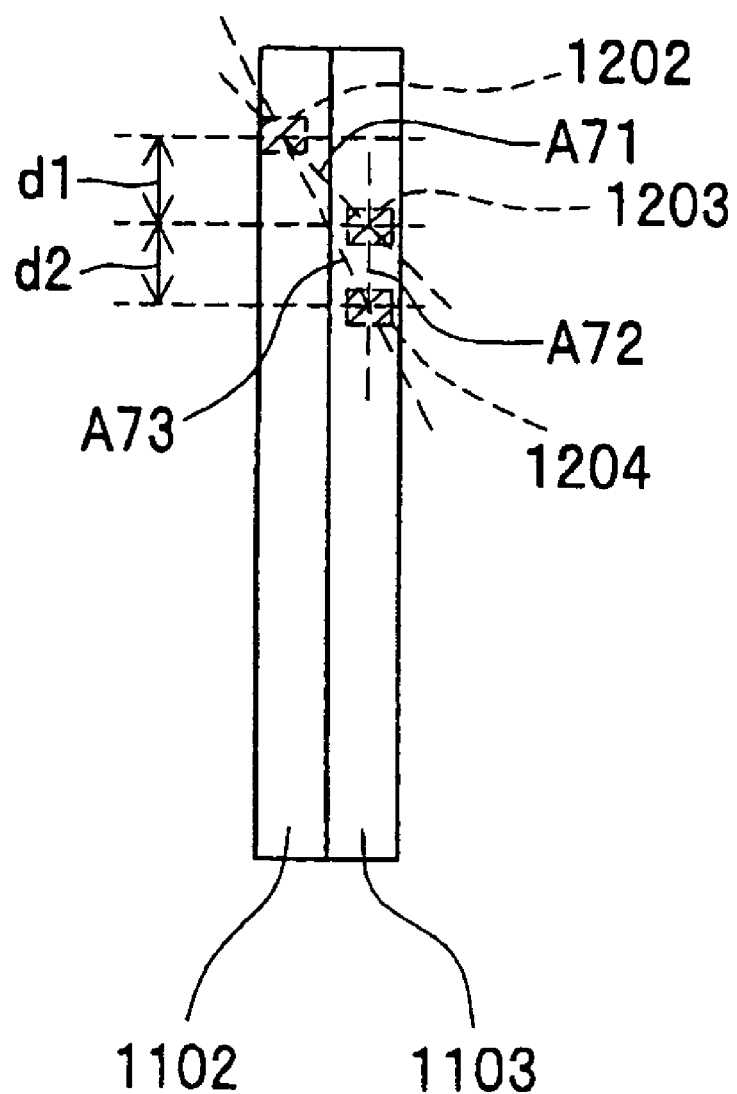
FIG. 29 is a side view of the laptop computer 110-9 of FIG. 27 in a close state.

FIG. 27 is a perspective view showing an appearance of a laptop computer 110-9 in an open state, equipped with an adaptive antenna apparatus according to a ninth preferred embodiment of the present invention. FIGS. 28 and 29 respectively show a top view and a side view of the laptop computer 110-9 of FIG. 27 in a state. The present preferred embodiment is a modified preferred embodiment of the laptop computer 110-8 according to the eighth preferred embodiment. The laptop computer 110-9 includes an antenna element 1202 in an upper housing 1102 and antenna elements 1203 and 1204 in a lower housing 1103, in place of the antenna elements 1108, 1109 and 1110 of FIGS. 24 to 26.

As shown in FIG. 28, the antenna elements 1202, 1203 and 1204 are provided so as to be juxtaposed at the right ends of the upper housing 1102 and the lower housing 1103, in such an order of the antenna elements 1202, 1203 and 1204, in ascending order of distance from the hinge portion 1104 when the laptop computer 110-9 is in a closed state. The antenna elements 1202, 1203 and 1204 have feeding points Q71, Q72 and Q73, respectively, at certain locations in the antenna elements. Further, as shown in FIG. 29, when the laptop computer 110-9 is in a closed state, the antenna elements 1202 and 1203 are positioned to be spaced apart with a distance d1 in a horizontal direction, and the antenna elements 1203 and 1204 are positioned to be spaced apart with a distance d2 in the horizontal direction. The distances d1 and d2 are set to a value preferably from $0.2\lambda$ to $0.5\lambda$.

Thus, the laptop computer 110-9 of the present preferred embodiment is provided with the antenna elements 1202, 1203 and 1204, and accordingly, as with the laptop computer 110-8 according to the eighth preferred embodiment, three sets of partial array antennas are constituted each including any two of the antenna elements 1202, 1203 and 1204, and the partial array antennas are disposed such that straight lines A71, A72 and A73 each passing through feeding points of the antenna elements included in each one of the three sets of partial array antennas have different directions from one another. Thus, in the present preferred embodiment, the plurality of sets of partial array antennas are configured so as to be disposed in different directions, and accordingly, even if an interference wave with a certain angle of arrival cannot be sufficiently suppressed by one partial array antenna, the present preferred embodiment can suppress the interference wave by using another partial array antenna, and thus, can perform adaptive control for receiving an incoming wave in an arbitrary direction and suppressing interference wave(s).

Tenth Preferred Embodiment

Figure 30:
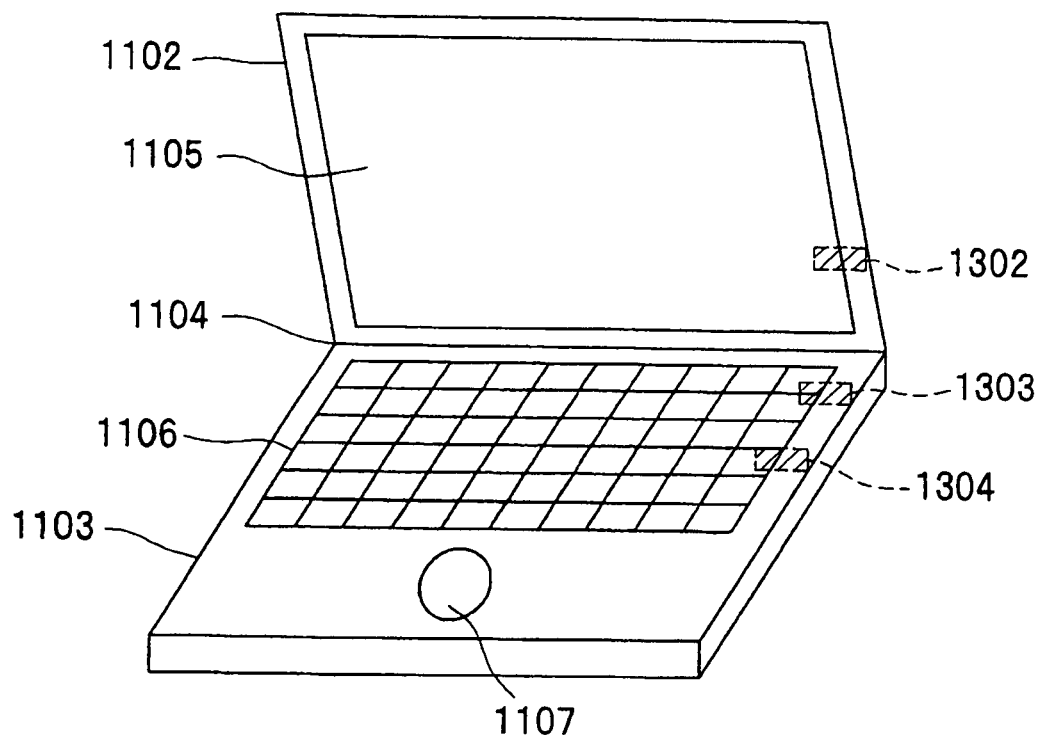
FIG. 30 is a perspective view showing an appearance of a laptop computer 110-10 in an open state, equipped with an adaptive antenna apparatus according to a tenth preferred embodiment of the present invention.
Figure 31:
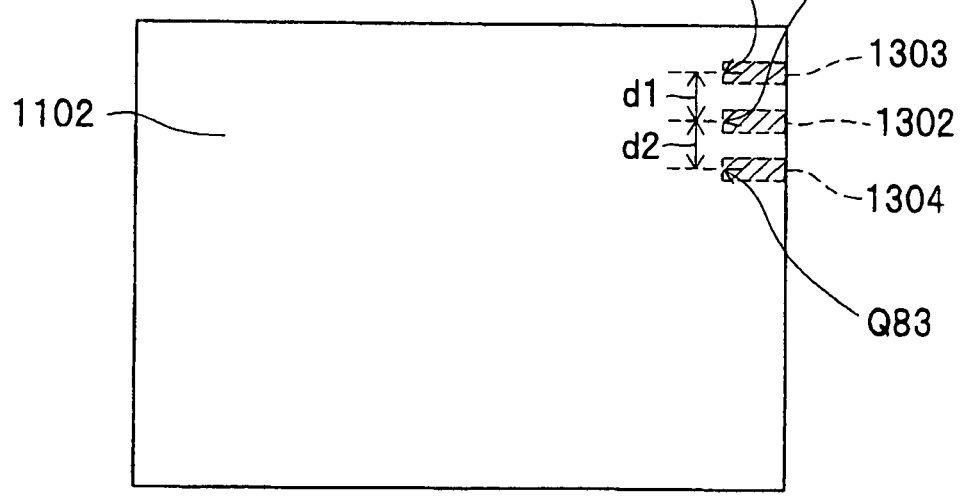
FIG. 31 is a top view of the laptop computer 110-10 of FIG. 30 in a close state.
Figure 32:
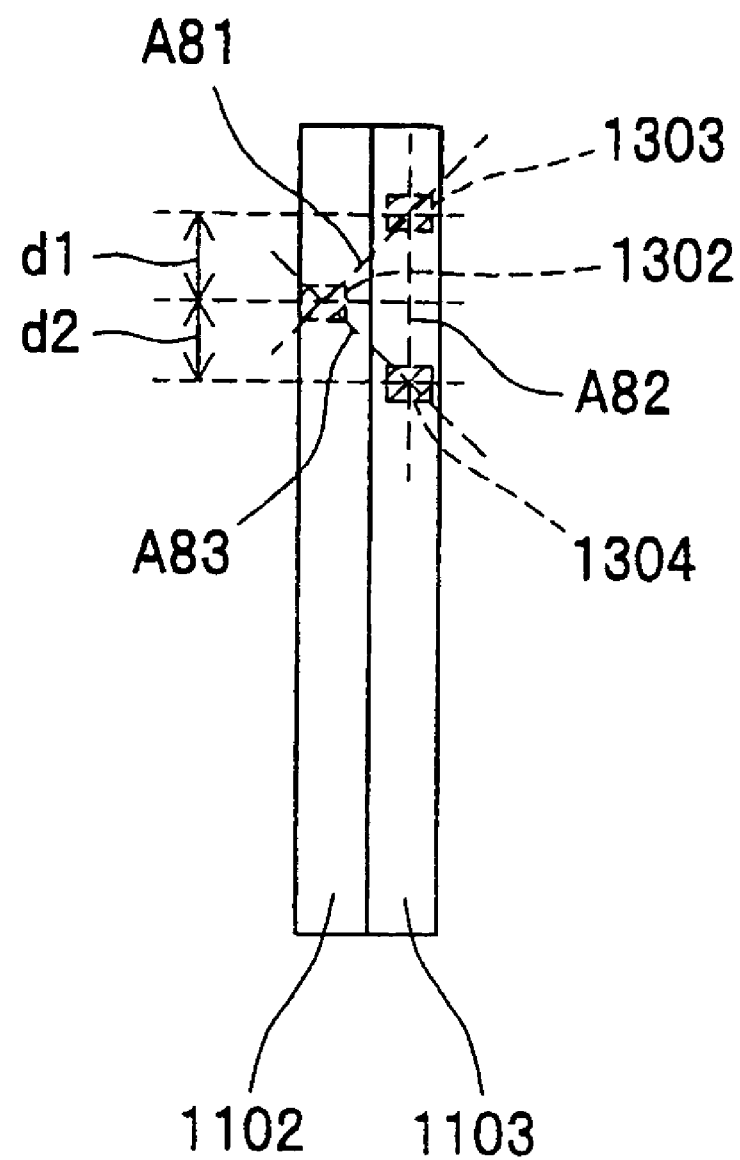
FIG. 32 is a side view of the laptop computer 110-10 of FIG. 30 in a close state.

FIG. 30 is a perspective view showing an appearance of a laptop computer 110-10 in an open state, equipped with an adaptive antenna apparatus according to a tenth preferred embodiment of the present invention. FIGS. 31 and 32 respectively show a top view and a side view of the laptop computer 110-10 of FIG. 30 in a close state. The present preferred embodiment is a modified preferred embodiment of the laptop computer 110-8 according to the eighth preferred embodiment. The laptop computer 110-10 includes an antenna element 1302 in an upper housing 1102 and antenna elements 1303 and 1304 in a lower housing 1103, in place of the antenna elements 1108, 1109 and 1110 of FIGS. 24 to 26.

As shown in FIG. 31, the antenna elements 1302, 1303 and 1304 are provided so as to be juxtaposed at the right ends of the upper housing 1102 and the lower housing 1103, in such an order of the antenna elements 1303, 1302 and 1304, in ascending order of distance from the hinge portion 1104 when the laptop computer 110-10s in a closed state. The antenna elements 1302, 1303 and 1304 have feeding points Q81, Q82 and Q83, respectively, at certain locations in the antenna elements. Further, as shown in FIG. 32, when the laptop computer 110-10 is in a closed state, the antenna elements 1303 and 1302 are positioned to have a distance d1 in a horizontal direction, and similarly, the antenna elements 1302 and 1304 are also positioned to have a distance d2 in the horizontal direction. The distances d1 and d2 are set to a value preferably from $0.2\lambda$ to $0.5\lambda$.

Thus, the laptop computer 110-10 of the present preferred embodiment is provided with the antenna elements 1302, 1303 and 1304, and accordingly, as with the laptop computer 110-8 according to the eighth preferred embodiment, three sets of partial array antennas are constituted each including any two of the antenna elements 1302, 1303 and 1304, and the partial array antennas are disposed such that straight lines A81, A82 and A83 each passing through feeding points of the antenna elements included in each one of the three sets of partial array antennas have different directions from one another. Thus, in the present preferred embodiment, the plurality of sets of partial array antennas are configured so as to be disposed in different directions, and accordingly, even if an interference wave with a certain angle of arrival cannot be sufficiently suppressed by one partial array antenna, the present preferred embodiment can suppress the interference wave by using another partial array antenna, and thus, can perform adaptive control for receiving an incoming wave in an arbitrary direction and suppressing interference wave(s).

Eleventh Preferred Embodiment

Figure 33:
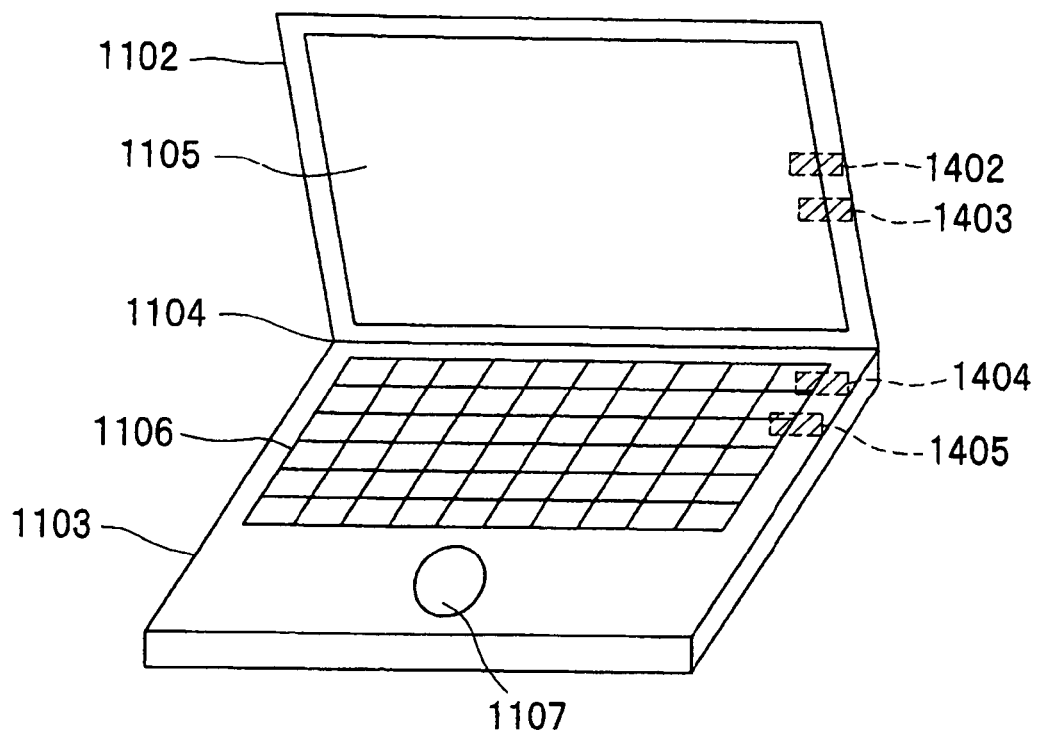
FIG. 33 is a perspective view showing an appearance of a laptop computer 110-11 in an open state, equipped with an adaptive antenna apparatus according to an eleventh preferred embodiment of the present invention.
Figure 34:
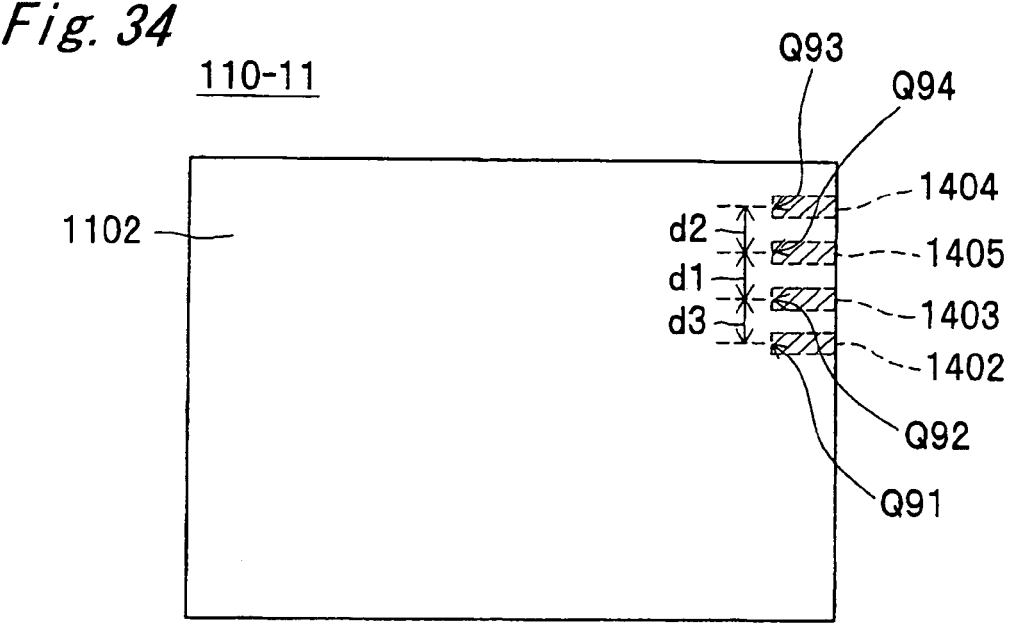
FIG. 34 is a top view of the laptop computer 110-11 of FIG. 33 in a close state.
Figure 35:
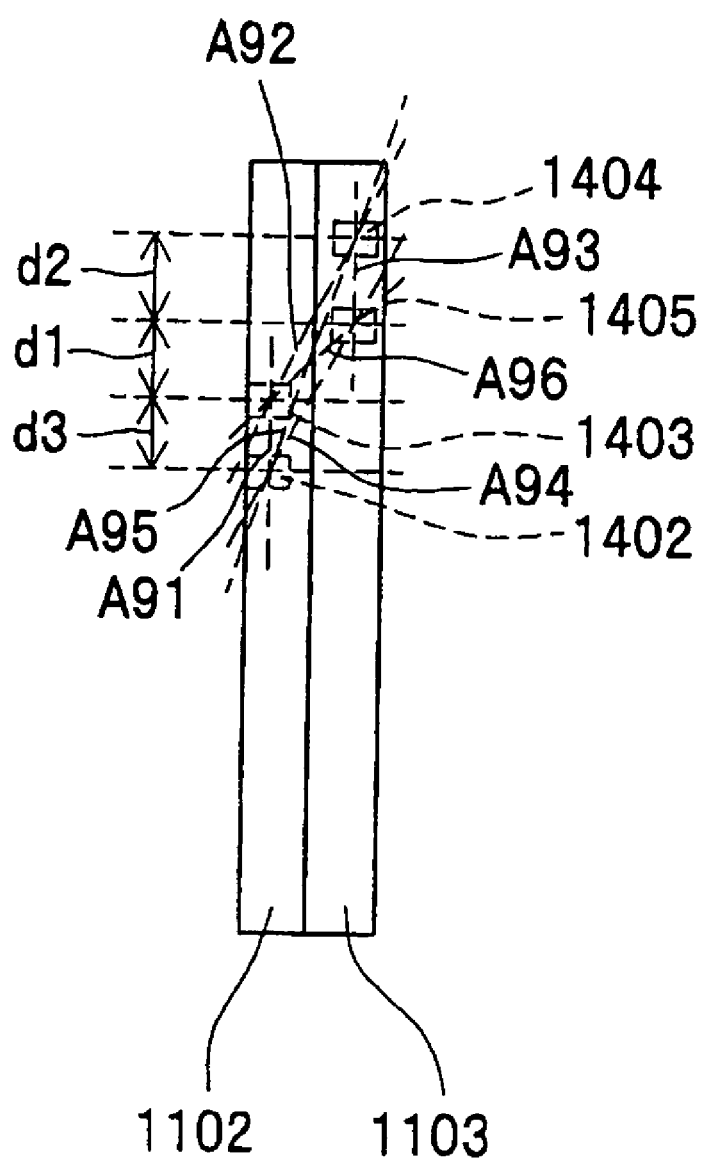
FIG. 35 is a side view of the laptop computer 110-11 of FIG. 33 in a close state.

FIG. 33 is a perspective view showing an appearance of a laptop computer 110-11 in an open state, equipped with an adaptive antenna apparatus according to an eleventh preferred embodiment of the present invention. FIGS. 34 and 35 respectively show a top view and a side view of the laptop computer 110-11 of FIG. 33 in a closed state. The present preferred embodiment is an example of the mobile radio communication apparatus 100-5 according to the fifth preferred embodiment shown in FIG. 15, and corresponds to a configuration including two receiving circuit portions (not shown) and four antenna elements 1402, 1403, 1404 and 1405.

The laptop computer 110-11 of the present preferred embodiment includes antenna elements 1402 and 1403 in an upper housing 1102 and antenna elements 1404 and 1405 in a lower housing 1103, in place of the antenna elements 1108, 1109 and 1110 of FIGS. 24 to 26. As shown in FIG. 34, the antenna elements 1402, 1403, 1404 and 1405 are provided so as to be juxtaposed at the right ends of the upper housing 1102 and the lower housing 1103, in such an order of the antenna elements 1404, 1405, 1403 and 1402, in ascending order of distance from the hinge portion 1104 when the laptop computer 110-11 is in a close state. The antenna elements 1402, 1403, 1404 and 1405 have feeding points Q91, Q92, Q93 and Q94, respectively, at certain locations in the antenna elements. Further, as shown in FIG. 35, when the laptop computer 110-11 is in a closed state, the antenna elements 1405 and 1403 are positioned to be spaced apart with a distance d1 in a horizontal direction, the antenna elements 1404 and 1405 are positioned to be spaced apart with a distance d2 in the horizontal direction, and the antenna elements 1403 and 1402 are positioned to be spaced apart with a distance d3 in the horizontal direction. The distances d1, d2 and d3 are set to a value preferably from $0.2\lambda$ to $0.5\lambda$.

Although in the present preferred embodiment, the laptop computer 110-11 includes four antenna elements 1402, 1403, 1404 and 1405 and two receiving circuit portions, a laptop computer may include more than four antenna elements, and/or more than two receiving circuit portions. For example, if a laptop computer includes four antenna elements 1402, 1403, 1404 and 1405 and three receiving circuit portions, a plurality of sets of partial array antennas, each including three of the four antenna elements 1402, 1403, 1404 and 1405, are constituted. In this case, a straight line passing through feeding points of two of the antenna elements included in an any one of the three partial array antennas has a different direction from a further straight line passing through feeding points of two of the antenna elements included in any one of the other partial array antennas, and accordingly, three antenna elements included in each array antenna have a certain directivity as a whole, and the respective partial array antennas have different directivities from one another.

Thus, the laptop computer 110-11 of the present preferred embodiment is provided with the antenna elements 1402, 1403, 1404 and 1405, and accordingly, as with the mobile radio communication apparatus 100-5 according to the fifth preferred embodiment and the laptop computer 110-8 according to the eighth preferred embodiment, six sets of partial array antennas are constituted each including any two of the antenna elements 1402, 1403, 1404 and 1405, and the partial array antennas are disposed such that straight lines A91, A92, A93, A94, A95 and A96 each passing through feeding points of the antenna elements included in each one of the six sets of partial array antennas have different directions from one another. Thus, in the present preferred embodiment, the plurality of sets of partial array antennas are configured so as to be disposed in different directions, and accordingly, even if an interference wave with a certain angle of arrival cannot be sufficiently suppressed by one partial array antenna, the present preferred embodiment can suppress the interference wave by using another partial array antenna, and thus, can perform adaptive control for receiving an incoming wave in an arbitrary direction and suppressing interference wave(s).

Twelfth Preferred Embodiment

Figure 36:
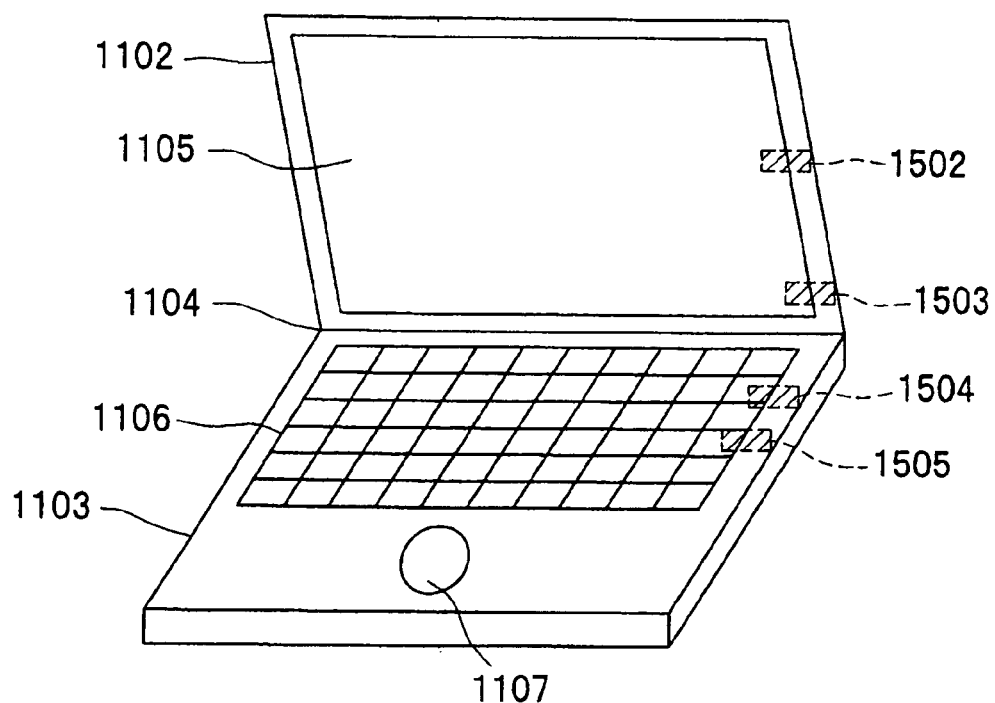
FIG. 36 is a perspective view showing an appearance of a laptop computer 110-12 in an open state, equipped with an adaptive antenna apparatus according to a twelfth preferred embodiment of the present invention.
Figure 37:
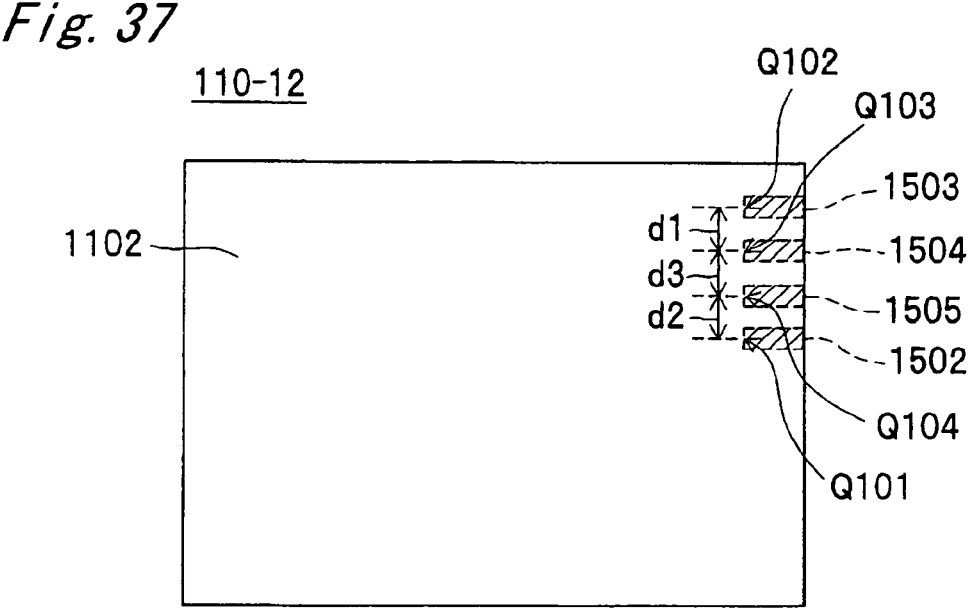
FIG. 37 is a top view of the laptop computer 110-12 of FIG. 36 in a close state.
Figure 38:
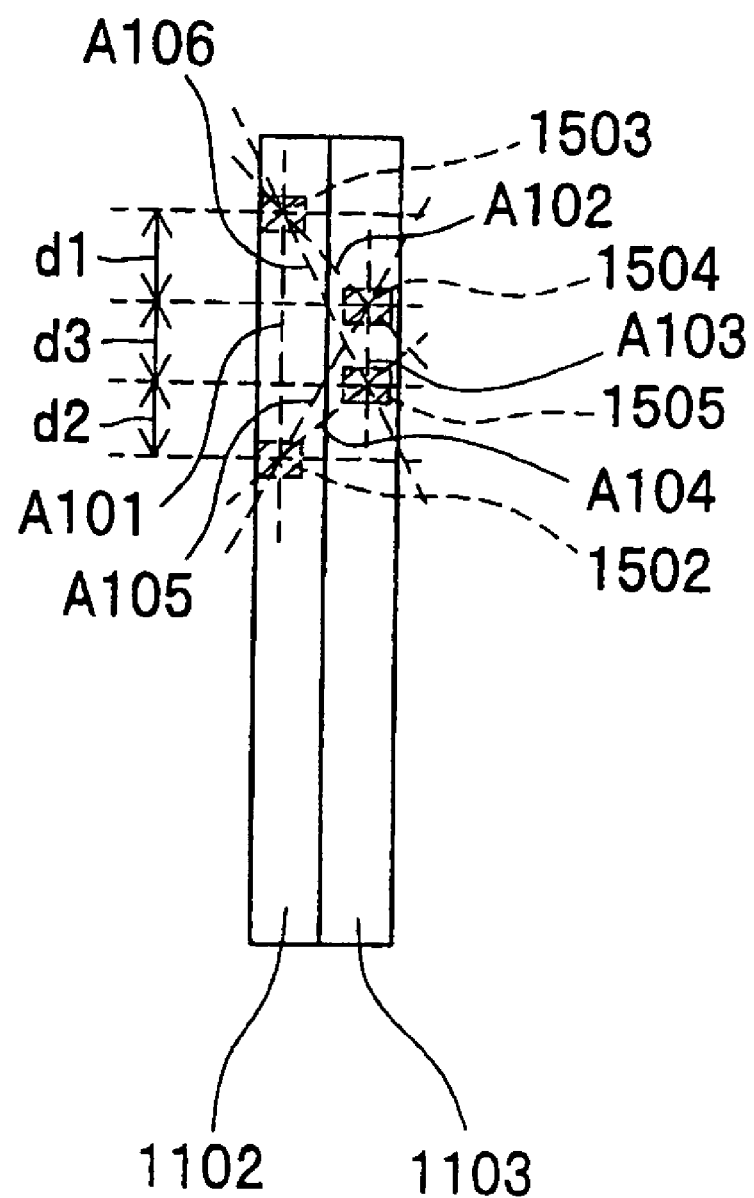
FIG. 38 is a side view of the laptop computer 110-12 of FIG. 36 in a close state.

FIG. 36 is a perspective view showing an appearance of a laptop computer 110-12 in an open state, equipped with an adaptive antenna apparatus according to a twelfth preferred embodiment of the present invention. FIGS. 37 and 38 respectively show a top view and a side view of the laptop computer 110-12 of FIG. 36 in a closed state. The present preferred embodiment is a modified preferred embodiment of the laptop computer 110-11 according to the eleventh preferred embodiment. The laptop computer 110-12 includes antenna elements 1502 and 1503 in an upper housing 1102 and antenna elements 1504 and 1505 in a lower housing 1103, in place of the antenna elements 1402, 1403, 1404 and 1405 of FIGS. 33 to 35.

As shown in FIG. 37, the antenna elements 1502, 1503, 1504 and 1505 are provided so as to be juxtaposed at the right ends of the upper housing 1102 and the lower housing 1103, in such an order of the antenna elements 1503, 1504, 1505 and 1502, in ascending order of distance from the hinge portion 1104 when the laptop computer 110-12 is in a closed state. The antenna elements 1502, 1503, 1504 and 1505 have feeding points Q101, Q102, Q103 and Q104, respectively, at certain locations in the antenna elements. Further, as shown in FIG. 38, when the laptop computer 110-12 is in a closed state, the antenna elements 1503 and 1504 are positioned to be spaced apart with a distance d1 in a horizontal direction, and similarly, the antenna elements 1505 and 1502 are positioned to be spaced apart with a distance d2 in the horizontal direction, and the antenna elements 1504 and 1505 are positioned to be spaced apart with a distance d3 in the horizontal direction. The distances d1, d2 and d3 are set to a value preferably from $0.2\lambda$ to $0.5\lambda$.

Thus, the laptop computer 110-12 of the present preferred embodiment is provided with the antenna elements 1502, 1503, 1504 and 1505, and accordingly, as with the laptop computer 110-11 according to the eleventh preferred embodiment, six sets of partial array antennas are constituted each including any two of the antenna elements 1502, 1503, 1504 and 1505, and the partial array antennas are disposed such that straight lines A101, A102, A103, A104, A105 and A106 each passing through feeding points of the antenna elements included in each one of the six sets of partial array antennas have different directions from one another. Thus, in the present preferred embodiment, the plurality of sets of partial array antennas are configured so as to be disposed in different directions, and accordingly, even if an interference wave with a certain angle of arrival cannot be sufficiently suppressed by one partial array antenna, the present preferred embodiment can suppress the interference wave by using another partial array antenna, and thus, can perform adaptive control for receiving an incoming wave in an arbitrary direction and suppressing interference wave(s).

Thirteenth Preferred Embodiment

Figure 39:
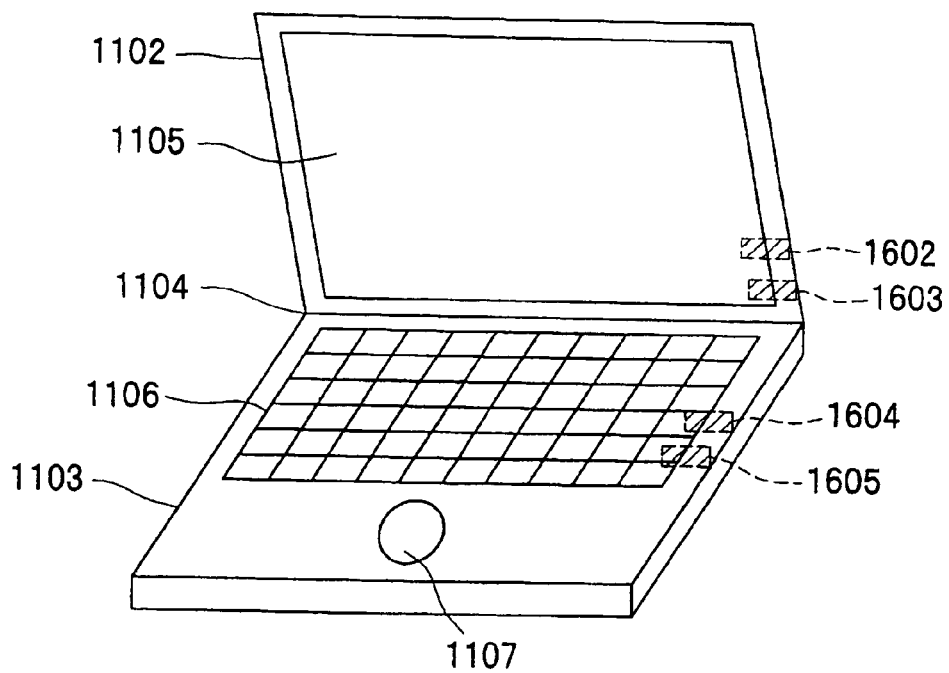
FIG. 39 is a perspective view showing an appearance of a laptop computer 110-13 in an open state, equipped with an adaptive antenna apparatus according to a thirteenth preferred embodiment of the present invention.
Figure 40:
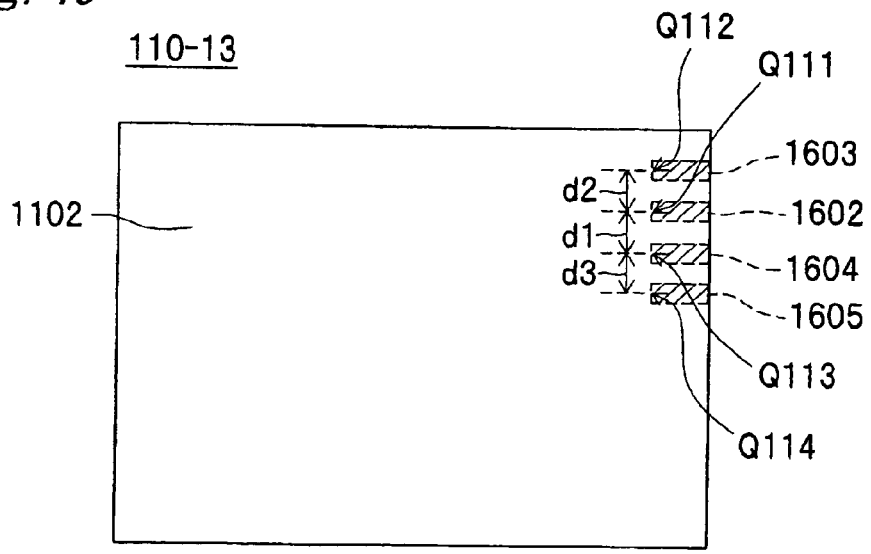
FIG. 40 is a top view of the laptop computer 110-13 of FIG. 39 in a close state.
Figure 41:
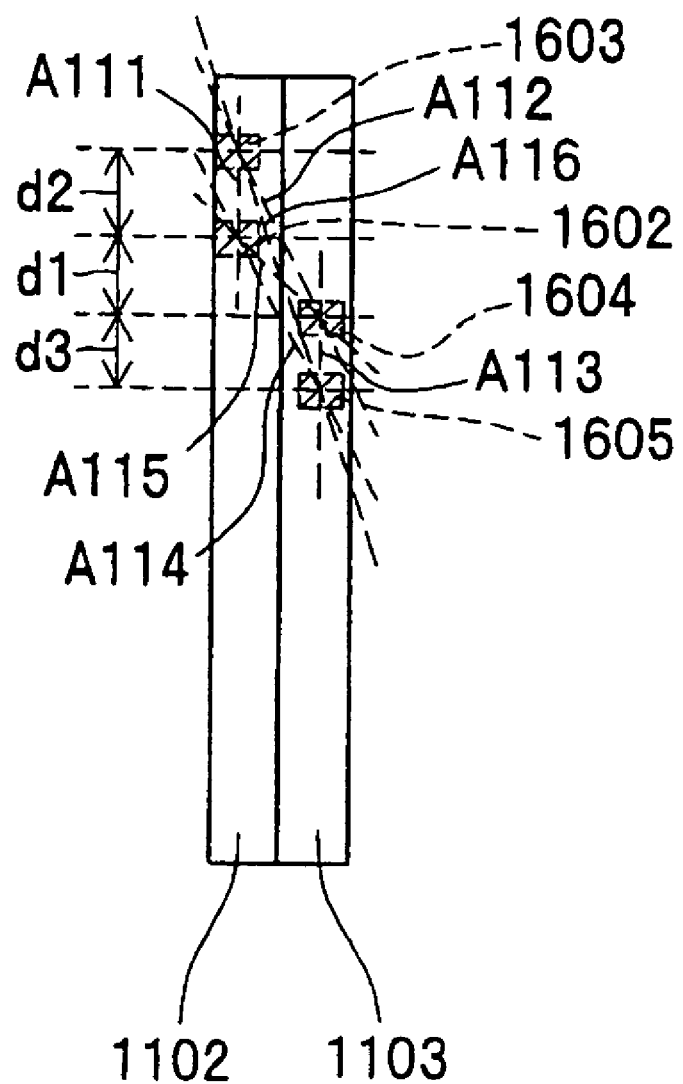
FIG. 41 is a side view of the laptop computer 110-13 of FIG. 39 in a close state.

FIG. 39 is a perspective view showing an appearance of a laptop computer 110-13 in an open state, equipped with an adaptive antenna apparatus according to a thirteenth preferred embodiment of the present invention. FIGS. 40 and 41 respectively show a top view and a side view of the laptop computer 110-13 of FIG. 39 in a closed state. The present preferred embodiment is a modified preferred embodiment of the laptop computer 110-11 according to the eleventh preferred embodiment. The laptop computer 110-13 includes antenna elements 1602 and 1603 in an upper housing 1102 and antenna elements 1604 and 1605 in a lower housing 1103, in place of the antenna elements 1402, 1403, 1404 and 1405 of FIGS. 33 to 35.

As shown in FIG. 40, the antenna elements 1602, 1603, 1604 and 1605 are provided so as to be juxtaposed at the right ends of the upper housing 1102 and the lower housing 1103, in such an order of the antenna elements 1603, 1602, 1604 and 1605, in ascending order of distance from the hinge portion 1104 when the laptop computer 110-13 is in a closed state. The antenna elements 1602, 1603, 1604 and 1605 have feeding points Q11, Q112, Q113 and Q114, respectively, at certain locations in the antenna elements. Further, as shown in FIG. 41, when the laptop computer 110-13 is in a closed state, the antenna elements 1602 and 1604 are positioned to be spaced apart with a distance d1 in a horizontal direction, the antenna elements 1603 and 1602 are also positioned to be spaced apart with a distance d2 in the horizontal direction, and the antenna elements 1604 and 1605 are positioned to be spaced apart with a distance d3 in the horizontal direction. The distances d1, d2 and d3 are set to a value preferably from $0.2\lambda$ to $0.5\lambda$.

Thus, the laptop computer 110-13 of the present preferred embodiment is provided with the antenna elements 1602, 1603, 1604 and 1605, and accordingly, as with the laptop computer 110-11 according to the eleventh preferred embodiment, six sets of partial array antennas are constituted each including any two of the antenna elements 1602, 1603, 1604 and 1605, and the partial array antennas are disposed such that straight lines A111, A112, A113, A114, A115 and A116 each passing through feeding points of the antenna elements included in each one of the six sets of partial array antennas have different directions from one another. Thus, in the present preferred embodiment, the plurality of sets of partial array antennas are configured so as to be disposed in different directions, and accordingly, even if an interference wave with a certain angle of arrival cannot be sufficiently suppressed by one partial array antenna, the present preferred embodiment can suppress the interference wave by using another partial array antenna, and thus, can perform adaptive control for receiving an incoming wave in an arbitrary direction and suppressing interference wave(s).

Fourteenth Preferred Embodiment

Figure 42:
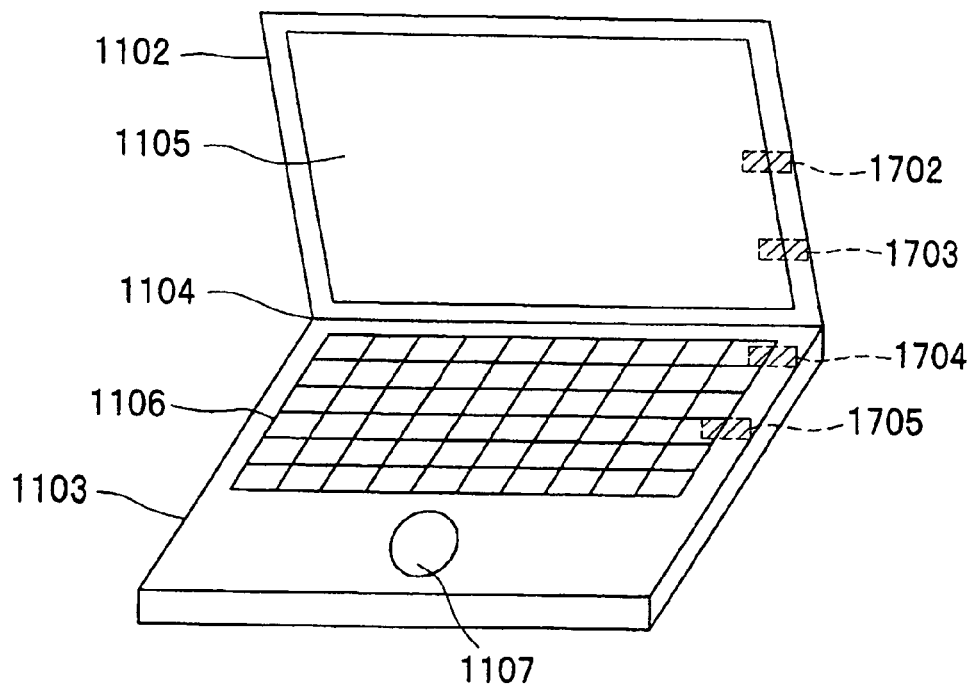
FIG. 42 is a perspective view showing an appearance of a laptop computer 110-14 in an open state, equipped with an adaptive antenna apparatus according to a fourteenth preferred embodiment of the present invention.
Figure 43:
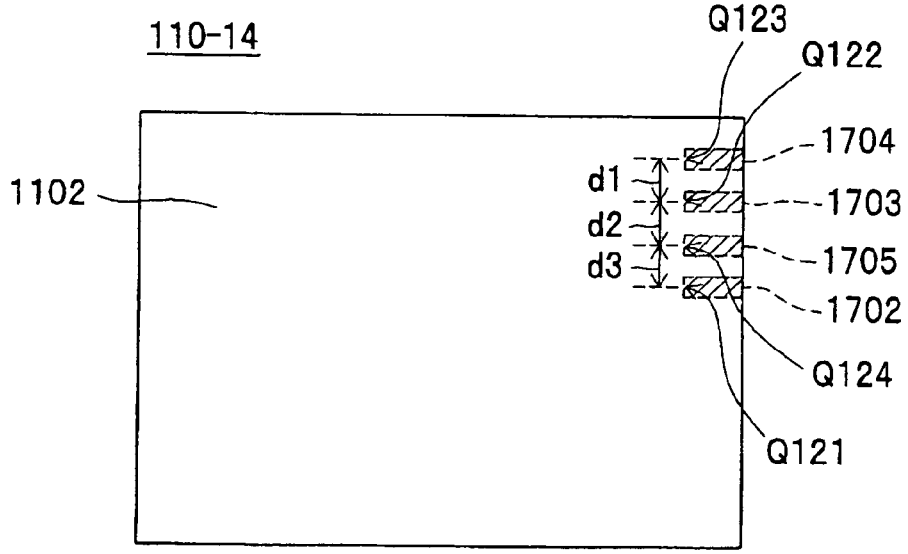
FIG. 43 is a top view of the laptop computer 110-14 of FIG. 42 in a close state.
Figure 44:
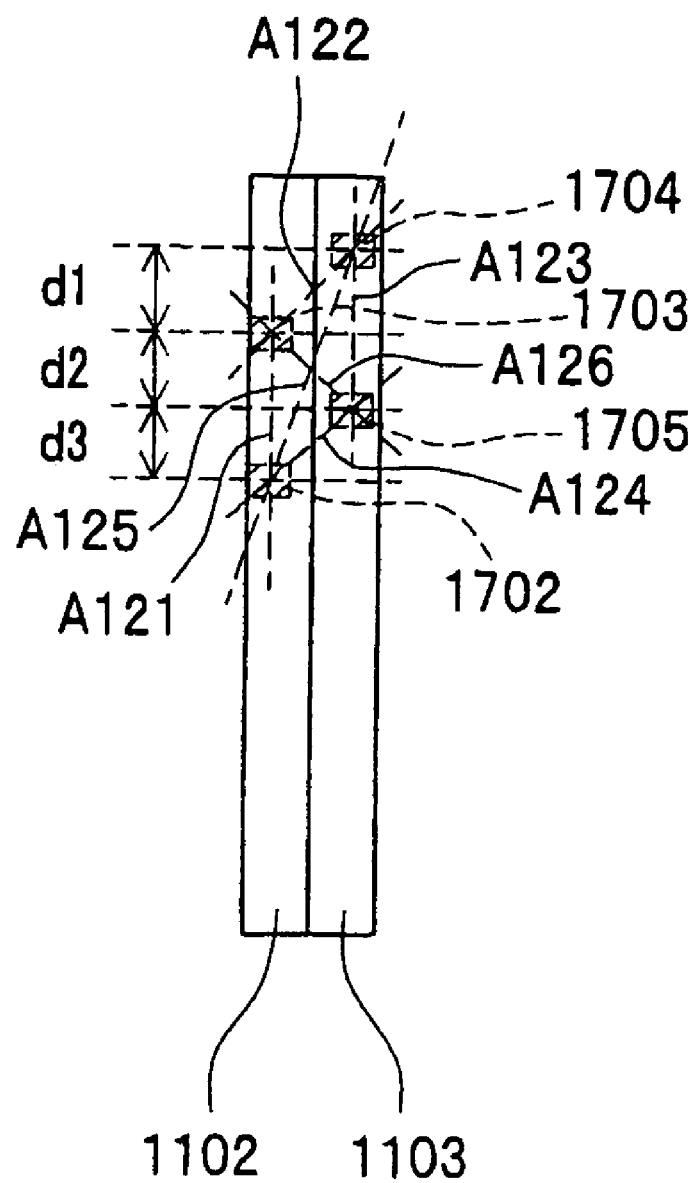
FIG. 44 is a side view of the laptop computer 110-14 of FIG. 42 in a close state.

FIG. 42 is a perspective view showing an appearance of a laptop computer 110-14 in an open state, equipped with an adaptive antenna apparatus according to a fourteenth preferred embodiment of the present invention. FIGS. 43 and 44 respectively show a top view and a side view of the laptop computer 110-14 of FIG. 42 in a closed state. The present preferred embodiment is a modified preferred embodiment of the laptop computer 110-11 according to the eleventh preferred embodiment. The laptop computer 110-14 includes antenna elements 1702 and 1703 in an upper housing 1102 and antenna elements 1704 and 1705 in a lower housing 1103, in place of the antenna elements 1402, 1403, 1404 and 1405 of FIGS. 33 to 35.

As shown in FIG. 43, the antenna elements 1702, 1703, 1704 and 1705 are provided so as to be juxtaposed at the right ends of the upper housing 1102 and the lower housing 1103, in such an order of the antenna elements 1704, 1703, 1705 and 1702, in ascending order of distance from the hinge portion 1104 when the laptop computer 110-14 is in a closed state. The antenna elements 1702, 1703, 1704 and 1705 have feeding points Q121, Q122, Q123 and Q124, respectively, at certain locations in the antenna elements. Further, as shown in FIG. 44, when the laptop computer 110-14 is in a closed state, the antenna elements 1704 and 1703 are positioned to have a distance d1 in a horizontal direction, the antenna elements 1703 and 1705 are positioned to have a distance d2 in the horizontal direction, and similarly, the antenna elements 1705 and 1702 are positioned to have a distance d3 in the horizontal direction. The distances d1, d2 and d3 are set to a value preferably from $0.2\lambda$ to $0.5\lambda$.

Thus, the laptop computer 110-14 of the present preferred embodiment is provided with the antenna elements 1702, 1703, 1704 and 1705, and accordingly, as with the laptop computer 110-11 according to the eleventh preferred embodiment, six sets of partial array antennas are constituted each including any two of the antenna elements 1702, 1703, 1704 and 1705, and the partial array antennas are disposed such that straight lines A121, A122, A123, A124, A125 and A126 each passing through feeding points of the antenna elements included in each one of the six sets of partial array antennas have different directions from one another. Thus, in the present preferred embodiment, the plurality of sets of partial array antennas are configured so as to be disposed in different directions, and accordingly, even if an interference wave with a certain angle of arrival cannot be sufficiently suppressed by one partial array antenna, the present preferred embodiment can suppress the interference wave by using another partial array antenna, and thus, can perform adaptive control for receiving an incoming wave in an arbitrary direction and suppressing interference wave(s).

Fifteenth Preferred Embodiment

Figure 45:
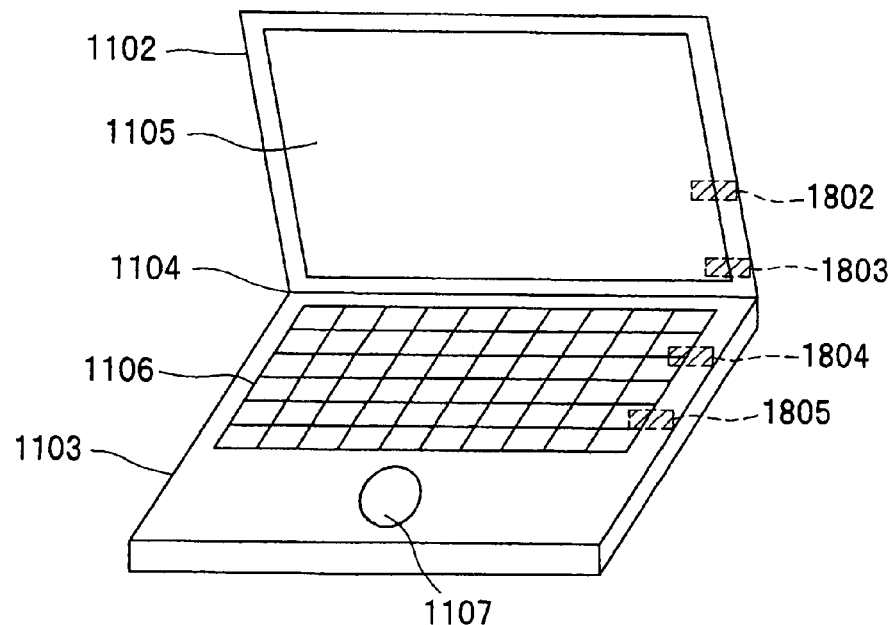
FIG. 45 is a perspective view showing an appearance of a laptop computer 110-15 in an open state, equipped with an adaptive antenna apparatus according to a fifteenth preferred embodiment of the present invention.
Figure 46:
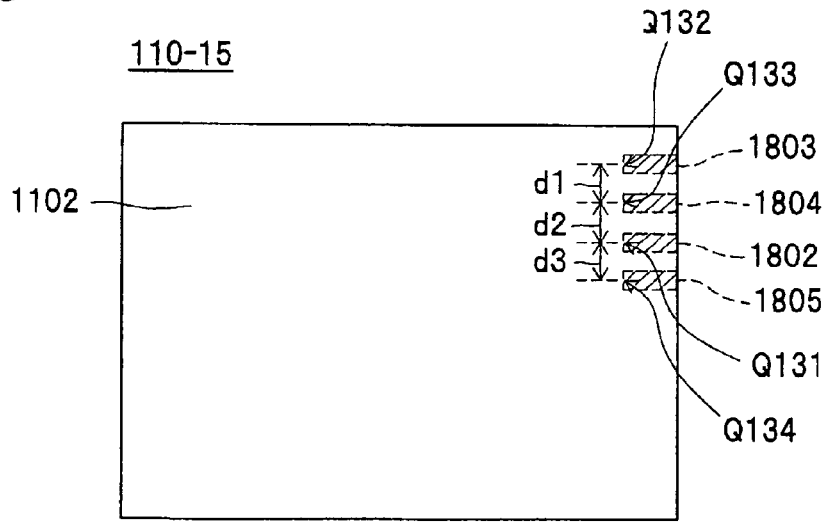
FIG. 46 is a top view of the laptop computer 110-15 of FIG. 45 in a close state.
Figure 47:
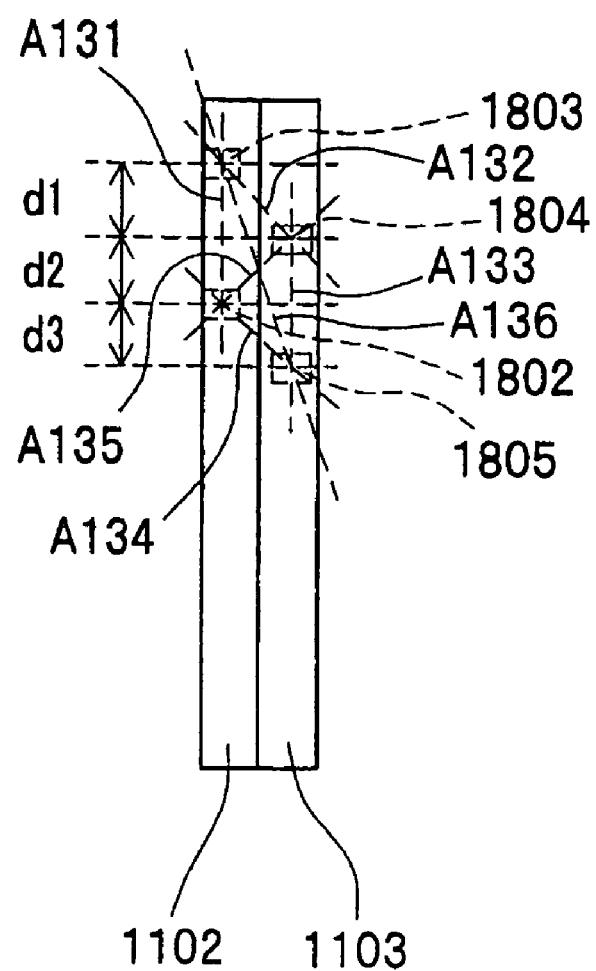
FIG. 47 is a side view of the laptop computer 110-15 of FIG. 45 in a close state.
Figure 48:
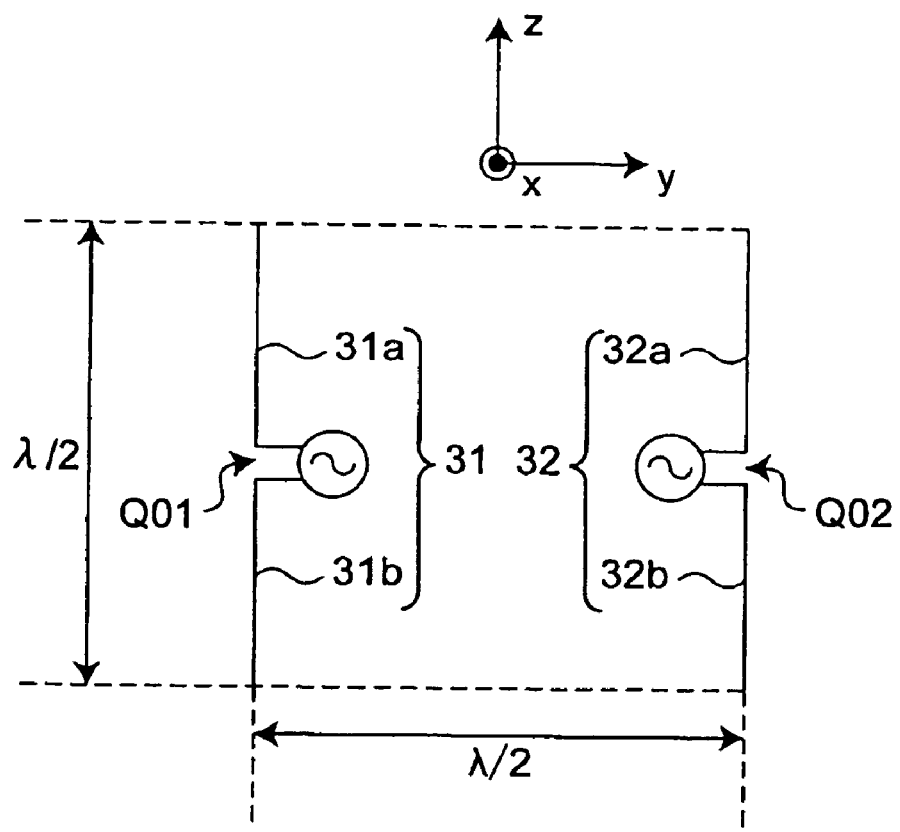
FIG. 48 is a plan view showing a prior art array antenna apparatus, including two half-wavelength dipole antennas 31 and 32 arranged parallel to each other.
Figure 49:
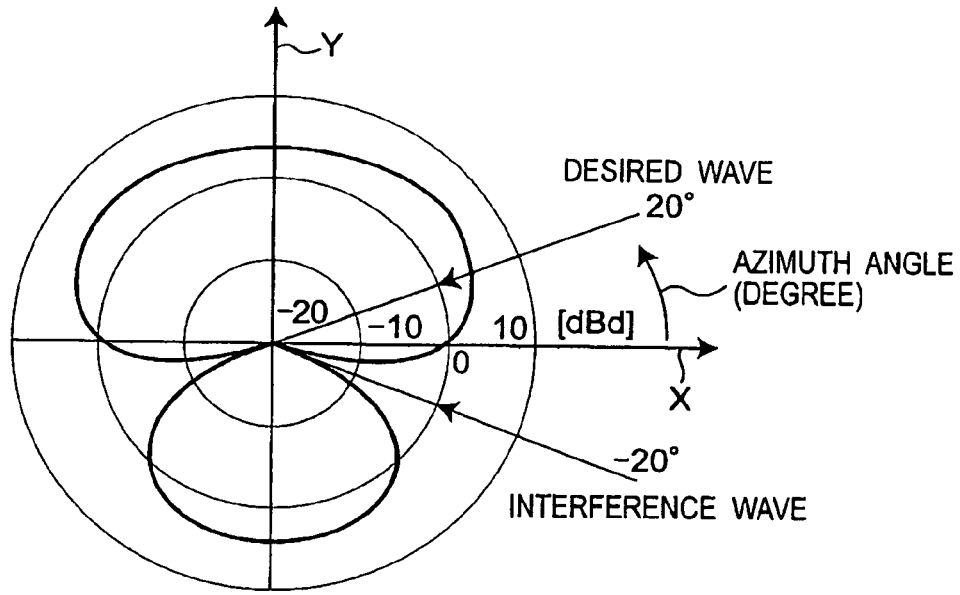
FIG. 49 is a diagram showing a simulation result according to the array antenna apparatus of FIG. 48 and showing an example of a radiation pattern in a horizontal-plane of the array antenna apparatus which is adaptively controlled when a desired wave with an azimuth angle of 20 degrees and an interference wave with an azimuth angle of –20 degrees are incoming to the array antenna apparatus.
Figure 50:
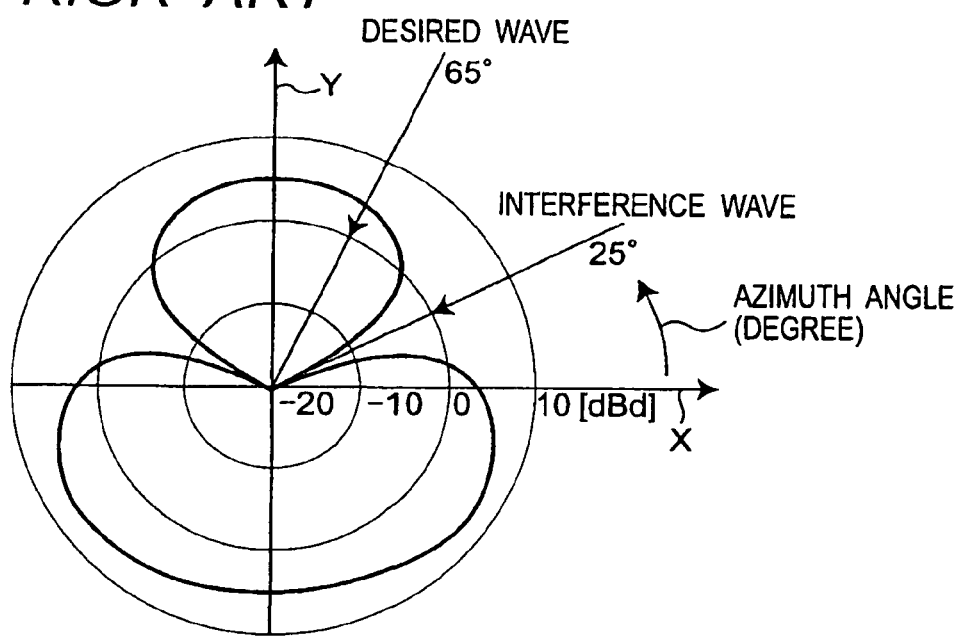
FIG. 50 is a diagram showing a simulation result according to the array antenna apparatus of FIG. 48 and showing an example of a radiation pattern in a horizontal-plane of the array antenna apparatus which is adaptively controlled when a desired wave with an azimuth angle of 65 degrees and an interference wave with an azimuth angle of 25 degrees are incoming to the array antenna apparatus.

FIG. 45 is a perspective view showing an appearance of a laptop computer 110-15 in an open state, equipped with an adaptive antenna apparatus according to a fifteenth preferred embodiment of the present invention. FIGS. 46 and 47 respectively show a top view and a side view of the laptop computer 110-15 of FIG. 45 in a closed state. The present preferred embodiment is a modified preferred embodiment of the laptop computer 110-11 according to the eleventh preferred embodiment. The laptop computer 110-15 includes antenna elements 1802 and 1803 in an upper housing 1102 and antenna elements 1804 and 1805 in a lower housing 1103, in place of the antenna elements 1402, 1403, 1404 and 1405 of FIGS. 33 to 35.

As shown in FIG. 46, the antenna elements 1802, 1803, 1804 and 1805 are provided so as to be juxtaposed at the right ends of the upper housing 1102 and the lower housing 1103, in such an order of the antenna elements 1803, 1804, 1802 and 1805, in ascending order of distance from the hinge portion 1104 when the laptop computer 110-15 is in a closed state. The antenna elements 1802, 1803, 1804 and 1805 have feeding points Q131, Q132, Q133 and Q134, respectively, at certain locations in the antenna elements. Further, as shown in FIG. 47, when the laptop computer 110-15 is in a closed state, the antenna elements 1803 and 1804 are positioned to have a distance d1 in a horizontal direction, the antenna elements 1804 and 1802 are positioned to have a distance d2 in the horizontal direction, and similarly, the antenna elements 1802 and 1805 are positioned to have a distance d3 in the horizontal direction. The distances d1, d2 and d3 are set to a value preferably from $0.2\lambda$ to $0.5\lambda$.

Thus, the laptop computer 110-15 of the present preferred embodiment is provided with the antenna elements 1802, 1803, 1804 and 1805, and accordingly, as with the laptop computer 110-11 according to the eleventh preferred embodiment, six sets of partial array antennas are constituted each including any two of the antenna elements 1802, 1803, 1804 and 1805, and the partial array antennas are disposed such that straight lines A131, A132, A133, A134, A135 and A136 each passing through feeding points of the antenna elements included in each one of the six sets of partial array antennas have different directions from one another. Thus, in the present preferred embodiment, the plurality of sets of partial array antennas are configured so as to be disposed in different directions, and accordingly, even if an interference wave with a certain angle of arrival cannot be sufficiently suppressed by one partial array antenna, the present preferred embodiment can suppress the interference wave by using another partial array antenna, and thus, can perform adaptive control for receiving an incoming wave in an arbitrary direction and suppressing interference wave(s).

Although the eighth to fifteenth preferred embodiments of the present invention describe laptop computers in a closed state, adaptive antenna apparatuses according to the preferred embodiments of the present invention may operate on laptop computers in an open state.

The application of radio communication apparatuses according to the preferred embodiments of the present invention is not limited to mobile phones, and laptop computers having radio communication functionality, and the radio communication apparatuses can also be applied to arbitrary mobile radio communication apparatuses, including a notebook personal computer or a handheld device having radio communication functionality.

As described in detail above, according to the present invention, it is possible to provide an adaptive antenna apparatus capable of forming a beam on an incoming wave with an arbitrary azimuth angle and forming nulls on interference waves with arbitrary azimuth angles, by adaptively changing the amplitudes and phases of received signals and adaptively connecting antenna elements included in any one of a plurality of sets of partial array antennas to their corresponding receiving circuit portions in the subsequent stage, and also provide a radio communication apparatus using such adaptive antenna apparatus.

According to the preferred embodiments described in the specification, for example, even if a user's finger touches a particular antenna element, an adaptive operation can be achieved using other antenna elements and thus degradation of signal quality can be avoided. This is particularly effective when, for example, part of a human body such as a user's finger or head or an obstacle such as a bag comes close to an antenna element. Particularly, since radiation characteristics vary in time when using the adaptive antenna apparatus, the effect of improvement in C/(N+I) by adaptive control would also vary. In this case, degradation of signal quality can be avoided by preparing a plurality of choices and selecting the one providing the highest signal quality.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An adaptive antenna apparatus for receiving a radio frequency signal, said adaptive antenna apparatus comprising:
   a plurality of receiving circuits, said plurality of receiving circuits being M in number, each of said plurality of receiving circuits configured to adjust at least one of an amplitude and a phase of a received signal and to output an adjusted received signal;
   a plurality of antenna elements configured to receive a radio frequency signal, said plurality of antenna elements being N in number, the number N being greater than the number M, said plurality of antenna elements constituting a plurality of sets of partial array antennas, each set of partial array antennas including M antenna elements of said plurality of antenna elements;
   an antenna switching circuit configured to connect M antenna elements of said plurality of antenna elements to respective receiving circuits of said plurality of receiving circuits;
   a combiner configured to combine M adjusted received signals outputted from respective receiving circuits of said plurality of receiving circuits into a combined received signal;
   a signal quality determination circuit configured to determine signal quality including a CNR (Carrier to Noise Ratio) of the combined received signal; and
   a controller configured to control said antenna switching circuit, configured to adaptively control said plurality of receiving circuits so as to form a radiation pattern with a beam in a direction of a desired wave and nulls in directions of interference waves, and configured to cause said antenna switching circuit to connect M antenna elements of said plurality of antenna elements included in one set of partial array antennas of said plurality of sets of partial array antennas to respective receiving circuits of said plurality of receiving circuits,
   wherein said plurality of antenna elements is disposed so that for any first set of partial array antennas of said plurality of sets of partial array antennas, and for any second set of partial array antennas of said plurality of sets of partial array antennas different from said first set of partial array antennas, there is a first line defined by feeding points of two antenna elements of said first set of partial array antennas and a second line defined by feeding points of two antenna elements of said second set of partial array antennas such that the first line and the second line are not parallel,
   wherein said controller is further configured to cause, when the CNR is equal to or larger than a predetermined threshold value, a signal from one receiving circuit of said plurality of receiving circuits to be outputted directly to said signal quality determination circuit, and the adjusted received signals from other receiving circuits of said plurality of receiving circuits to be attenuated, and
   wherein said controller is further configured to control said antenna switching circuit, when the CNR is smaller than the predetermined threshold value and based on signal strengths of the adjusted received signals, to connect M antenna elements of said plurality of antenna elements included in one set of partial array antennas of said plurality of sets of partial array antennas to respective receiving circuits of said plurality of receiving circuits so as to improve the signal quality.

2. The adaptive antenna apparatus as claimed in claim 1, wherein said plurality sets of partial array antennas are linear array antennas, and
   wherein said linear array antennas are disposed such that a straight line passing through feeding points of antenna elements included in any one of said linear array antennas intersects with another straight line passing through feeding points of antenna elements included in any other one of said linear array antennas.

3. The adaptive antenna apparatus as claimed in claim 1, wherein said controller is further configured to cause said signal quality determination circuit to determine signal qualities of the combined received signals obtained when connecting antenna elements included in each set of partial array antennas of said plurality of sets of partial array antennas to respective receiving circuits of said plurality of receiving circuits and adaptively controlling said plurality of receiving circuits, to compare the signal qualities for the respective sets of partial array antennas, and cause the antenna switching circuit to connect antenna elements included in a partial array antenna that achieves a best signal quality to said plurality of receiving circuits.

4. The adaptive antenna apparatus as claimed in claim 1,
wherein said controller is further configured to measure a signal strength of radio frequency signals received by each of said plurality of antenna elements, and
wherein said controller is further configured to cause said antenna switching circuit to connect a first antenna element of said plurality of antenna elements in place of a second antenna element of said plurality of antenna elements connected to a receiving circuit of said plurality of receiving circuits when a signal strength of a radio frequency signal received by said second antenna element is smaller than a predetermined threshold value.

5. The adaptive antenna apparatus as claimed in claim 1,
wherein said plurality of antenna elements comprises three antenna elements,
wherein said plurality of receiving circuits comprises two receiving circuits, and
wherein said plurality of sets of partial array antennas comprises three sets of partial array antennas.

6. A radio communication apparatus comprising:
an adaptive antenna apparatus; and
a radio communication circuit that transmits and receives a radio signal through said adaptive antenna apparatus,
said adaptive antenna apparatus comprising:
 a plurality of receiving circuits, said plurality of receiving circuits being M in number, each of said plurality of receiving circuits configured to adjust at least one of an amplitude and a phase of a received signal and to output an adjusted received signal;
 a plurality of antenna elements configured to receive a radio frequency signal, said plurality of antenna elements being N in number, the number N being greater than the number M, said plurality of antenna elements constituting a plurality of sets of partial array antennas, each set of partial array antennas including M antenna elements of said plurality of antenna elements;
 an antenna switching circuit configured to connect M antenna elements of said plurality of antenna elements to respective receiving circuits of said plurality of receiving circuits;
 a combiner configured to combine M adjusted received signals outputted from respective receiving circuits of said plurality of receiving circuits into a combined received signal;
 a signal quality determination circuit configured to determine signal quality including a CNR (Carrier to Noise Ratio) of the combined received signal; and
 a controller configured to control said antenna switching circuit, configured to adaptively control said plurality of receiving circuits so as to form a radiation pattern with a beam in a direction of a desired wave and nulls in directions of interference waves, and configured to cause said antenna switching circuit to connect M antenna elements of said plurality of antenna elements included in one set of partial array antennas of said plurality of sets of partial array antennas to respective receiving circuits of said plurality of receiving circuits,
wherein said plurality of antenna elements is disposed so that for any first set of partial array antennas of said plurality of sets of partial array antennas, and for any second set of partial array antennas of said plurality of sets of partial array antennas different from said first set of partial array antennas, there is a first line defined by feeding points of two antenna elements of said first set of partial array antennas and a second line defined by feeding points of two antenna elements of said second set of partial array antennas such that the first line and the second line are not parallel,
wherein the controller is further configured to cause, when the CNR is equal to or larger than a predetermined threshold value, a signal from one receiving circuit of said plurality of receiving circuits to be outputted directly to said signal quality determination circuit, and the adjusted received signals from other receiving circuits of said plurality of receiving circuits to be attenuated, and
wherein the controller is further configured to control the antenna switching circuit, when the CNR is smaller than the predetermined threshold value and based on signal strengths of the adjusted received signals, to connect M antenna elements of said plurality of antenna elements included in one set of partial array antennas of said plurality of sets of partial array antennas to respective receiving circuits of said plurality of receiving circuits so as to improve the signal quality.

7. The radio communication apparatus as claimed in claim 6,
wherein said radio communication apparatus is a mobile phone.

8. The radio communication apparatus as claimed in claim 6,
wherein said radio communication apparatus is a laptop computer having radio communication functionality.

* * * * *